(12) United States Patent
Nakano et al.

(10) Patent No.: US 7,373,503 B2
(45) Date of Patent: May 13, 2008

(54) PUBLIC KEY CERTIFICATE REVOCATION LIST GENERATION APPARATUS, REVOCATION JUDGEMENT APPARATUS, AND AUTHENTICATION SYSTEM

(75) Inventors: Toshihisa Nakano, Neyagawa (JP); Motoji Ohmori, Hirakata (JP); Makoto Tatebayashi, Takarazuka (JP); Hideshi Ishihara, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 540 days.

(21) Appl. No.: 10/419,251

(22) Filed: Apr. 21, 2003

(65) Prior Publication Data
US 2003/0217265 A1    Nov. 20, 2003

(30) Foreign Application Priority Data
May 9, 2002    (JP)    ............. 2002-134647

(51) Int. Cl.
H04L 9/00    (2006.01)

(52) U.S. Cl. .................................... 713/158

(58) Field of Classification Search ............... 713/158, 713/156, 157
See application file for complete search history.

(56) References Cited

U.S. PATENT DOCUMENTS

| | | | | |
|---|---|---|---|---|
| 4,309,569 | A * | 1/1982 | Merkle ..................... | 713/177 |
| 6,226,743 | B1 * | 5/2001 | Naor et al. ................. | 713/177 |
| 6,301,659 | B1 * | 10/2001 | Micali ...................... | 713/158 |
| 6,397,329 | B1 | 5/2002 | Aiello et al. | |
| 6,850,914 | B1 | 2/2005 | Harada et al. | |
| 6,901,509 | B1 * | 5/2005 | Kocher ...................... | 713/158 |
| 6,950,934 | B2 * | 9/2005 | Kang et al. ................. | 713/158 |
| 2002/0076204 | A1 | 6/2002 | Nakano et al. | |
| 2003/0081786 | A1 | 5/2003 | Nakano et al. | |
| 2003/0081792 | A1 | 5/2003 | Nakano et al. | |
| 2003/0221097 | A1 | 11/2003 | Nakano et al. | |
| 2004/0010688 | A1 | 1/2004 | Matsuzaki et al. | |
| 2005/0021985 | A1 | 1/2005 | Ono et al. | |

FOREIGN PATENT DOCUMENTS

EP    0 932 109    7/1999

OTHER PUBLICATIONS

H. Kikuchi et al., "Performance Evaluation of Public-key Certificate Revocation System with Balanced Hash Tree", Parallel Processing, 1999, Proceedings. 1999 International Workshops on Aizu-Wakamatsu, Japan Sep. 21-24, 1999, Los Alamitos, CA, USA, IEEE, US, Sep. 21, 1999, pp. 204-209.

Ford, Warwick and Michael S. Baum, *Secure Electronic Commerce: Building the Infrastructure for Digital Signatures and Encryption*, "X.509 Certificate Revocation List", Section 6.7, pp. 239-241, no date.

Knuth, Donald E., *The Art of Computer Programming*, vol. 1, Fundamental Algorithms, Third Edition, Sections 2.3,2.3.1 and 2.3.3, pp. 308-318, pp. 318-334 and 348-362, no date.

* cited by examiner

*Primary Examiner*—Ellen Tran
(74) *Attorney, Agent, or Firm*—Wenderoth, Lind & Ponack, LLP

(57) ABSTRACT

An authentication system is provided having a revocation list generation apparatus that constructs and stores a revocation list in a tree structure, the revocation list generation apparatus being used in combination with a revocation judgment apparatus. The authentication system improves upon conventional authentication systems because the memory capacity to store a Certificate Revocation List (CRL) in order to identify revoked certificates is reduced. The tree structure corresponds to public key certificate, which are identified by leaf identifies, and nodes from a leaf that corresponds to a revoked public key certificate.

24 Claims, 63 Drawing Sheets

FIG.3 tree structure table     D100

| node information | | |
|---|---|---|
| node name | device key | revocation flag |
| root | KeyA | 1 |
| 0 | KeyB | 1 |
| 1 | KeyC | 1 |
| 00 | KeyD | 1 |
| 01 | KeyE | 0 |
| 10 | KeyF | 1 |
| 11 | KeyG | 0 |
| 000 | KeyH | 1 |
| 001 | KeyI | 0 |
| 010 | KeyJ | 0 |
| ⋮ | ⋮ | ⋮ |
| 111 | KeyO | 0 |
| 0000 | IK1 | 1 |
| 0001 | IK2 | 0 |
| 0010 | IK3 | 0 |
| 0011 | IK4 | 0 |
| ⋮ | ⋮ | ⋮ |
| 1111 | IK16 | 0 |

FIG.20 key structure table   D400

| node name | device key | revocation flag | node revocation pattern |
|---|---|---|---|
| root | KeyA | 1 | {011} |
| 0 | KeyB | 1 | {111} |
| 1 | KeyC | 1 | {010} |
| 00 | KeyD | 1 | ~~{111}~~ |
| 01 | KeyE | 1 | ~~{111}~~ |
| 10 | KeyF | 1 | {001} |
| 11 | KeyG | 0 | |
| 000 | KeyH | 1 | ~~{111}~~ |
| 001 | KeyI | 1 | ~~{111}~~ |
| 010 | KeyJ | 1 | ~~{111}~~ |
| ⋮ | ⋮ | ⋮ | |
| 111 | KeyO | 0 | |
| 0000 | IK1 | 1 | ~~{111}~~ |
| 0001 | IK2 | 1 | ~~{111}~~ |
| 0010 | IK3 | 1 | ~~{111}~~ |
| 0011 | IK4 | 1 | ~~{111}~~ |
| ⋮ | ⋮ | ⋮ | |
| 1111 | IK16 | 0 | |

FIG.21

| header information | layer 0 | layer 1 | layer 2 | layer 3 |
|---|---|---|---|---|
| | {011} | {111} | {010} | {001} | {001} |

D500

(position) 0··· 1··· 2··· 3··· 4···

FIG.29

| (position) | header information | D700 |
|---|---|---|
| 0 ··· | {11} | layer 0 |
| 1 ··· | {00} | layer 1 |
| 2 ··· | {10} | |
| 3 ··· | {01} | layer 2 |
| 4 ··· | {01} | layer 3 |

FIG.37 tree structure table D1000

| node information ||| node information |||
|---|---|---|---|---|---|
| node name | device key | revocation flag | node name | device key | revocation flag |
| (blank) | KeyA |  | 1 | KeyC |  |
| 0 | KeyB |  | 10 | KeyF |  |
| 00 | KeyD |  | 100 | KeyL |  |
| 000 | KeyH |  | 1000 | IK9 |  |
| 0000 | IK1 |  | 1001 | IK10 |  |
| 0001 | IK2 |  | 101 | KeyM |  |
| 001 | KeyI |  | 1010 | IK11 |  |
| 0010 | IK3 |  | 1011 | IK12 |  |
| 0011 | IK4 |  | 11 | KeyG |  |
| 01 | KeyE |  | 110 | KeyN |  |
| 010 | KeyJ |  | 1100 | IK13 |  |
| 0100 | IK5 |  | 1101 | IK14 |  |
| 0101 | IK6 |  | 111 | KeyO |  |
| 011 | KeyK |  | 1110 | IK15 |  |
| 0110 | IK7 |  | 1111 | IK16 |  |
| 0111 | IK8 |  |  |  |  |

FIG.38

D900 header information

| position | value |
|---|---|
| 0 | {11} |
| 1 | {11} |
| 2 | {11} |
| 3 | {10} |
| 4 | {01} |
| 5 | {11} |
| 6 | {10} |
| 7 | {10} |
| 8 | {10} |
| 9 | {01} |
| 10 | {11} |

PUBLIC KEY CERTIFICATE REVOCATION LIST GENERATION APPARATUS, REVOCATION JUDGEMENT APPARATUS, AND AUTHENTICATION SYSTEM

BACKGROUND OF THE INVENTION (1) Field of the Invention

The present invention relates to an authentication technique that uses a public key encryption technique, and in particular to a technique for specifying a revoked public key certificate.

(2) Description of the Related Art

Systems that use the Internet as a communication infrastructure have increased with the rapid spread of Internet usage in recent years. One example is electronic transactions for buying and selling goods via the Internet.

In such a system that uses the Internet as a communication infrastructure, it is essential to confirm that a party with which communication is performed (hereinafter referred to as an "opposite party") is a legal participant. Such confirmation is called authentication. In the following, the term "device" is used to refer to both cases in which the opposite party is a device that is operated by a person, and the opposite party is a device that performs processing according to determined procedures. Authentication of the opposite party is called device authentication. Note that "certify" denotes showing that a device is legal, in other words that the device is a legal participant in the system, and "validate" denotes confirming the legality of the opposite party. The concept of authentication includes both certification and validation.

An encryption technique is usually used in device authentication. Specifically, the certifying party has secret data showing that it is a legal participant in the system, and certifies its legality by showing the validating party that it (the certifying party) has the secret data. On the other hand, the validating party validates the legitimacy of the certifying party by confirming that the certifying party has the secret data. In a communication path, such as the Internet, where anyone can obtain communication data, it is imperative that secret data (authentication data) used in the above-described authentication is not leaked to a third party that is not associated with the authentication. This is because if the secret data is leaked to a third party, the device that has obtained the secret data can masquerade as the original device. For this reason, authentication data is transmitted in an encrypted state, only to the verifying party.

Types of encryption techniques include a common key encryption technique and a public key encryption technique. In the common key encryption technique the key for encryption and the key for decryption have the same value. On the other hand, in the public key encryption technique the key for encryption and the key for decryption have different values.

The fact that the validating party has the same secret as the certifying party for authentication in the common key encryption technique means that there is a danger that the verifying party may masquerade as the certifying party. The so-called password method is equivalent to this technique. On the other hand, in authentication in the public key encryption technique the certifying party certifies using a public key encryption technique secret key, and the verifying party verifies using a public key that corresponds to the secret key. Since the secret key cannot be made from the public key, the verifying party is unable to masquerade as the certifying party after authentication has finished. Consequently, the public key encryption method is preferable for performing the above-described authentication.

Note that in authentication that uses the public key encryption method, "sign" denotes performing processing using the secret key, and "verify" denotes confirming legality of the signature using a public key that corresponds to the secret key.

The following is one example of opposite party authentication processing using the public key authentication technique. Specifically, a first device transmits random number data to a second device as challenge data, and the second device generates a signature text by signing the received random number data with its own secret key, and returns the signature text to the first device as response data. Lastly, the first device verifies the returned signature text using the second device's public key.

In the described authentication using the public key encryption method, it is a prerequisite that the public key be valid in the system.

For this reason, usually a "public key certificate" ("approval" to have a public key) showing that the public key is a legal public key corresponding to the device is issued by an organization, called a certificate authority, in the system. The public key certificate is data formed by concatenating an ID, a validity period, a public key, and so on, and attaching the electronic signature of the certificate authority to the concatenated data. A device that receives the public key certificate confirms that the electronic signature of the certificate authority is correct in regard to the data, and then confirms the content of the public key certificate from the ID of the opposite device, the present time, and so on, before confirming that the public key is correct.

In addition, the certificate authority issues a certificate revocation list (hereinafter referred to as a "CRL"). The CRL is a list of information that specifies revoked public key certificates, in order to notify devices of public key certificates that were issued in the past that belong to devices that are not legal and that have been removed from the system. The electronic signature of the certificate authority is attached to the CRL.

In this way, trading with an illegal opposite device can be prevented by, when authenticating an opposite device using the opposite device's public key, first obtaining the opposite device's public key certificate and confirming that the obtained public key certificate is not registered in the CRL, in other words, by confirming that the public key certificate is not revoked, before performing the above-described authentication.

Note that since the format, actualization and so on of CRLs are commonly known techniques, details are not described here. One example is disclosed in Document 1, which describes a CRL format (data structure) defined by the X. 509 standard determined by ISO/IEC/ITU.

Document 2 and Document 3 disclose methods for linearly expressing a tree structure in a tree structure data storage method that is used as one data format for storing numerous public key certificate IDs that are to be revoked. In these methods the tree structure is expressed linearly by arranging the nodes in the tree structure following particular rules. For example, a method of arranging the nodes in order of levels is described in Document 3, p. 136. According to this method, levels (that correspond to layers in the tree structure) are arranged in ascending order, and within each level the nodes are arranged from left to right.

Arranging the nodes based on specific rules enables the tree structure to be constructed in the device from the linearly arranged information.

<Document 1>

W. Ford and M. Baum, *Digitaru Shomei to Ango Gijutsu* (*Digital Signatures and Encryption Techniques*), trans. S. Yamada, Pearson Education Japan, 2001.

<Document 2>

G. Salton, *Manipulation of Trees in Information Retrieval*, Communication of the ACM 5, 1962.

<Document 3>

Knuth, "*Kihon Sanhou/Jouhou Kouzou (Basic Algorithms/Information Structure)*", trans. Yoneda & Kakehi, Saiensu-sha, 1978.

As described above, before authenticating an opposite device using the opposite device's public key, a device obtains the CRL, stores the obtained CRL in an internal memory, confirms whether the opposite device's public key certificate ID is in the stored CRL, and when the public key certificate ID is not included, performs authentication. For this reason, it is necessary for the device to have sufficient memory capacity to store the CRL.

However, a conventional CRL includes the IDs of all revoked public key certificates, and is therefore proportional in size to the number of revoked public key certificates. Consequently, when the number of revoked public key certificates increases, the size of the CRL also increases.

For this reason, a problem arises that it is unrealistic to estimate the maximum size of the CRL and provide sufficient memory capacity in the device for storing the CRL.

For example, suppose that the total number of public key certificates in the system overall is $2^{30}$ (approximately 1 billion), 0.01%, in other words 100,000, of the certificates are revoked, and the size of each ID is 30 bits. In a conventional CRL that includes all the IDs, the size of the CRL will be 30 bits*100,000=approximately 375 KB. Consequently, approximately 375 KB of memory must be provided in the device for storing the CRL. However, if 0.02% of the certificates, in other words 200,000, are revoked, the size of the CRL will be 30 bits*200,000=approximately 750 KB, and approximately 750 KB of memory must be provided in the device. If the number of revoked certificates further increases, even more memory capacity must be provided.

SUMMARY OF THE INVENTION

In order to solve the above-described problems, the object of the present invention is to provide a revocation list generation apparatus, a revocation judgement apparatus, an authentication system, a revocation list generation method, a program, a revocation judgement method, and a recording medium that suppress the size of a CRL even if the number of public key certificates to be revoked increases.

In order to achieve the stated object, the present invention is an authentication system that uses public key encryption, and is composed of a terminal that has a public key encryption algorithm secret key and public key, and certifies its legality to an opposite party with use of the secret key; a public key certificate issuing apparatus that issues and distributes a public key certificate for data composed of at least the public key of the terminal; a revocation list generation apparatus that issues and distributes a public key revocation list that specifies the public key certificate issued by the public key certificate issuing apparatus to the terminal which is to be revoked; a revocation list usage apparatus that receives the public key certificate of an opposite party terminal to be verified and the public key certificate revocation list, and judges whether the public key certificate is registered in the public key certificate revocation list; and a verification apparatus that verifies the certification by the opposite party, with use of a public key judged by the revocation list usage apparatus to be valid.

The revocation list generation apparatus constructs and stores a tree structure composed of a plurality of levels, and allocates unique values that each identify a public key certificate of a different one of the terminals respectively to the leaves in the tree structure. Furthermore, when at least one descendant, which is a leaf, of a particular node in the stored tree corresponds to a unique value of a public key certificate to be revoked, the revocation list generation apparatus makes the node a revoked node, and allocates a node revocation pattern to the node that has at least one revoked child node. The node revocation pattern is generated by concatenating identifiers that each identify whether a different one of the child nodes is respectively revoked or not. The revocation list generation apparatus then generates a public key certificate revocation list in which all node revocation patterns in the tree structure are arranged based on a predetermined rule that traces all nodes in the tree structure.

The revocation list usage apparatus analyzes the public key revocation list based on the predetermined rule, and judges whether the public key certificate of the opposite party terminal to be verified is registered in the revocation list.

Furthermore, the present invention is a public key certificate issuing apparatus that issues and distributes a public key certificate for data that is composed of a public key of a terminal; and a revocation list generation apparatus that issues and distributes a public key certificate revocation list that specifies the public key certificate issued by the public key certificate issuing apparatus to the terminal which is revoked.

The revocation list generation apparatus constructs and stores a tree structure composed of a plurality of levels, and allocates unique values that each identify a public key certificate of a different one of the terminals respectively to the leaves in the tree structure. Furthermore, when at least one descendant, which is a leaf, of a particular node in the stored tree corresponds to a unique value of a public key certificate to be revoked, the revocation list generation apparatus makes the node a revoked node, and allocates a node revocation pattern to the node that has at least one revoked child node. The node revocation pattern is generated by concatenating identifiers that each identify whether a different one of the child nodes is respectively revoked or not. The revocation list generation apparatus then generates a public key certificate revocation list in which all node revocation patterns in the tree structure are arranged based on a predetermined rule that traces all nodes in the tree structure.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 3 is an example of the data structure of a tree structure table D100;

FIG. 8 is a block diagram showing the structure of a recording medium apparatus 300a;

FIG. 9 is a block diagram showing the structure of a reproduction apparatus 400a;

FIG. 20 shows an example of the data structure of a tree structure table D400;

FIG. 21 shows an example of the data structure of header information D500;

FIG. 29 shows an example of the data structure of header information D700;

FIG. 37 shows an example of the data structure of a tree structure table D1000;

FIG. 38 shows an example of the data structure of header information D900;

DESCRIPTION OF THE PREFERRED EMBODIMENTS

1. First Embodiment

The following describes a digital work protection system 10 as a first embodiment of the present invention.

1.1 Structure of the Digital Work Protection System

Figure 1:
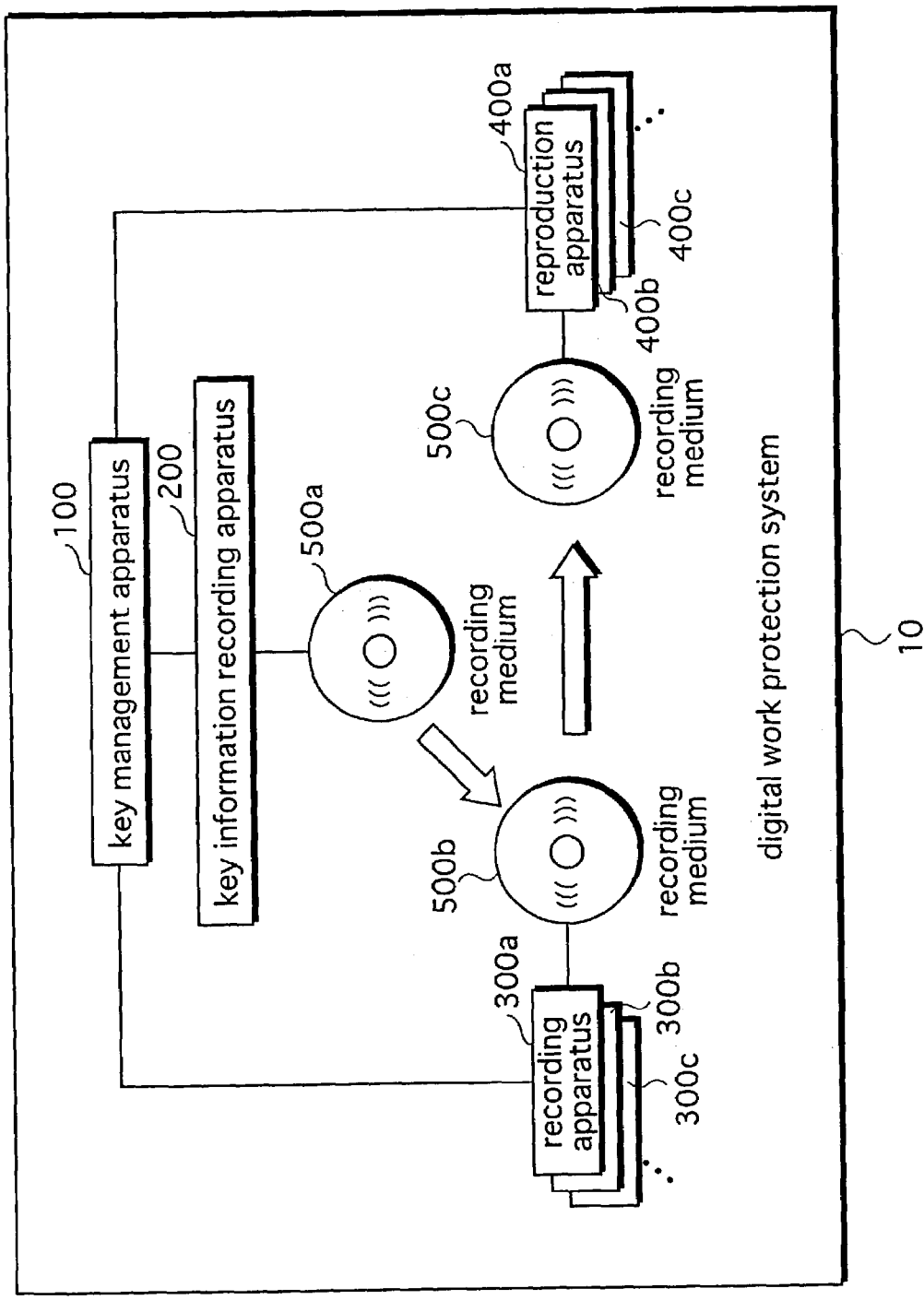
FIG. 1 is a block diagram of the structure of a digital work protection system 10.

The digital work protection system 10, as shown in FIG. 1, is composed of a key management apparatus 100, a key information recording apparatus 200, recording apparatuses 300a, 300b, 300c, . . . (hereinafter referred to as "recording apparatuses 300a etc."), and reproduction apparatuses 400a, 400b, 400c, . . . (hereinafter referred to as "reproduction apparatuses 400a etc.").

The key management apparatus 100 has key information pre-recorded onto a recording medium 500a by the key information recording apparatus 200, resulting in a recording medium 500b on which the key information has been recorded being generated in advance. Note that the recording medium 500a is a recordable medium such as a. DVD-RAM (Digital Versatile Disk Random Access Memory), onto which no information has been recorded. Furthermore, the key management apparatus 100 assigns device keys for decrypting key information respectively to each recording apparatus 300a etc. and each reproduction apparatus 400a etc., and distributes in advance the assigned device keys, device key identification information that identifies the device keys, and ID information that identifies the particular recording apparatus or reproduction apparatus, to each of the recording apparatuses 300a etc. and reproduction apparatuses 400a etc.

The recording apparatus 300a encrypts digitized content to generate encrypted content, and records the generated encrypted content on the recording medium 500b, resulting in a recording medium 500c being generated. The reproduction apparatus 400a reads the encrypted content from the recording medium 500c, and decrypts the read encrypted content to obtain the original content. The recording apparatuses 300b etc. operate in an identical manner to the recording apparatus 300a, and the reproduction apparatuses 400b etc. operate in an identical manner to the reproduction apparatus 400a.

Note that hereinafter "user apparatus" is used to refer to the recording apparatuses 300b etc. and the reproduction apparatuses 400b etc.

1.1.1 Key Management Apparatus 100

Figure 2:
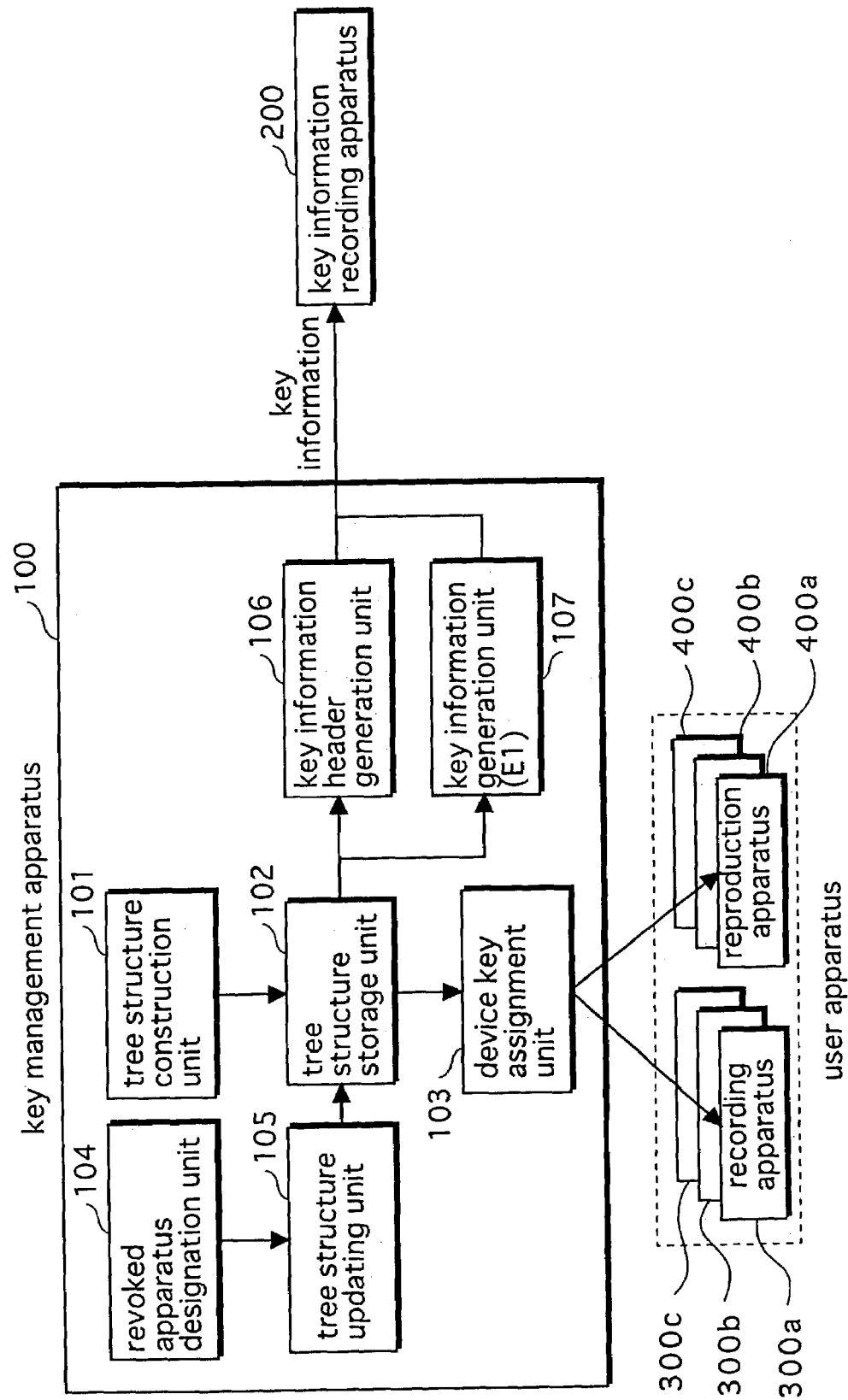
FIG. 2 is a block diagram of the structure of a key management apparatus 100.

The key management apparatus 100, as shown in FIG. 2, is composed of a tree structure construction unit 101, a tree structure storage unit 102, a device key assignment unit 103, a revoked apparatus designation unit 104, a key structure updating unit 105, a key information header generation unit 106, and a key information generation unit 107.

Specifically, the key management apparatus 100 is a computer system that includes a microprocessor, a ROM (Read Only Memory), a RAM (Random Access Memory), a hard disk unit, a display unit, a keyboard, and a mouse. Computer programs are stored in the RAM or the hard disk unit. The key management apparatus 100 achieves its functions by the microprocessor operating in accordance with the computer programs.

(1) Tree Structure Storage Unit 102

Specifically, the tree structure storage unit 102 is composed of a hard disk unit, and, as shown in FIG. 3, has a tree structure table D100.

Figure 4:
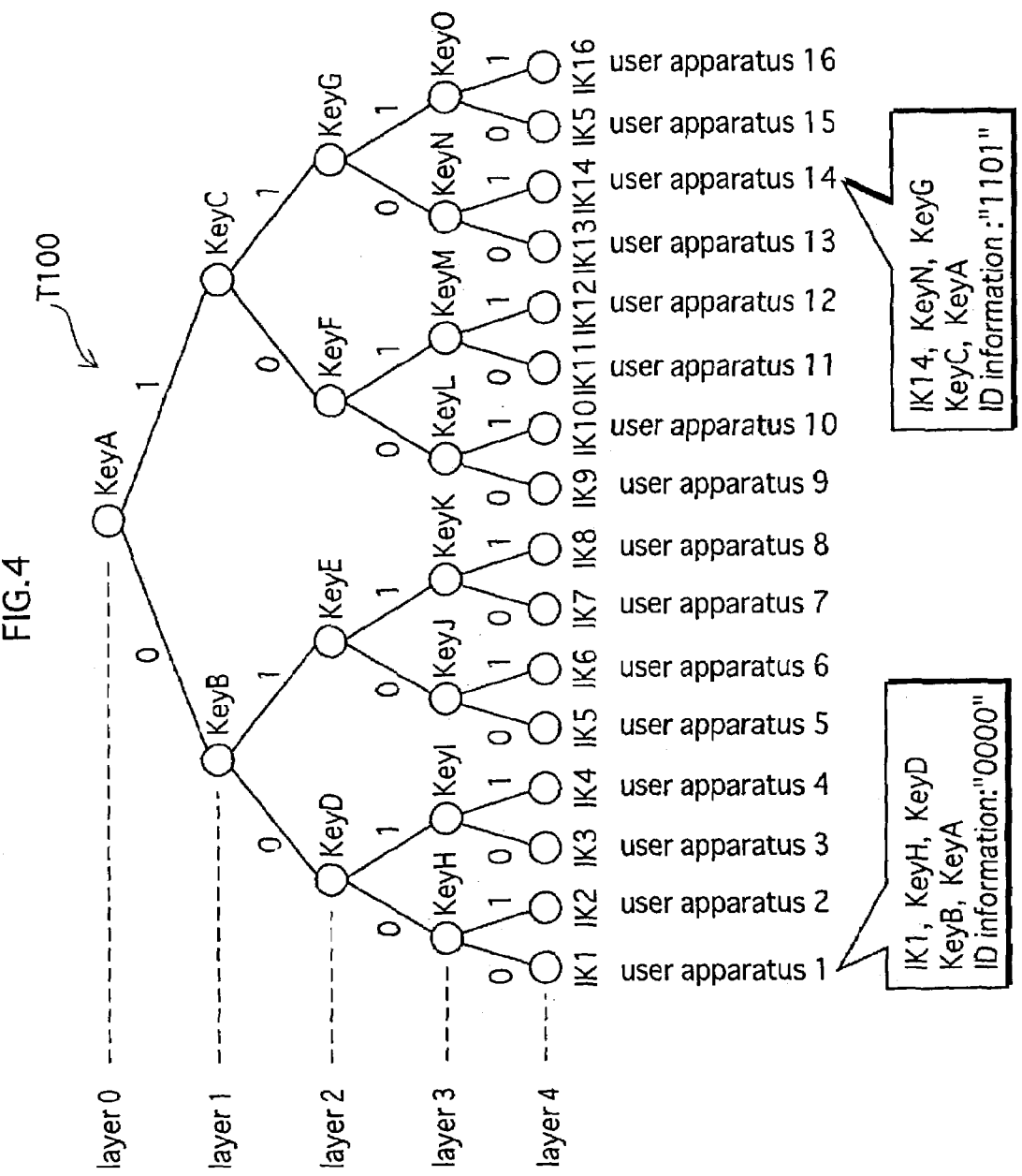
FIG. 4 is a conceptual diagram of a tree structure T100.

The tree structure table D100 corresponds to a tree structure T100 shown in FIG. 4 as one example of a tree structure, and shows a data structure for expressing the tree structure T100. As is described later, the data structure for expressing the tree structure T100 is generated by the tree structure construction unit 101 as the tree structure table D100, and stored in the tree structure storage unit 102.

<Tree Structure T100>

The tree structure T100, as shown in FIG. 4, is a binary tree that has five layers: layer 0 through to layer 4. Since the tree structure T100 is a binary tree, each node (excluding leaves) in the tree structure T100 is connected to two nodes on the lower side of the node via two paths. One node, which is the root, is included in layer 0, two nodes are included in layer 1, four nodes are included in layer 2, eight nodes are included in layer 3, and 16 nodes, which are leaves, are included in layer 4. Note that "lower side" refers to the leaf side of the tree structure, while "upper side" refers to the root side of the tree structure.

Each of the two paths that connect a node (excluding leaves) in the tree structure T100 with its directly subordinate node is assigned a number, the left path being assigned "0" and the right path being assigned "1". Here, in FIG. 4 a path that branches downwards to the left of a node to connect left nodes is called a left path. A path that branches downwards to the right of a node to connect right nodes is called a right path.

A node name is assigned to each node. The name of the root node is "root". Each of the nodes in the layers from layer 1 downwards is given a character string as a node name. The number of characters in the character string is equal to the number of the layer, and is generated by arranging the numbers assigned to each node on the same path as the node from the root through to the node in this order. For example, the node names of the two nodes in layer 1 are "0" and "1" respectively. The node names of the four nodes in layer 2 are "00", "01", "10", and "11" respectively. The node names of the eight nodes in layer 3 are "000", "001", "010", "011", . . . , "101", "110" and "111" respectively. The node names of the eight nodes on layer 4 are "0000", "0001", "0010", "0011", . . . , "1100", "1101", "1110", and "1111" respectively.

<Tree Structure Table D100>

The tree structure table D100 includes pieces of node information equal in number to the nodes in the tree structure T100. Each piece of node information corresponds to one of the nodes in the tree structure T100.

Each piece of node information includes a device key and a revocation flag.

Each node name identifies the node to which a particular piece of node information corresponds.

Each device key is assigned to a node that corresponds to a piece of node information.

In addition, each revocation flag shows whether the device key corresponding to the piece of node information had been revoked or not. A revocation flag set to "0" shows that a device key is not revoked, while a revocation flag set to "1" shows that a device key is revoked.

Each piece of node information is stored in the tree structure table D100 in an order shown by the following Order Rule 1. The Order Rule 1 is also applied when the recording apparatuses 300a etc. and the reproduction apparatuses 400a etc. read node information sequentially from the tree structure table D100.

(a) Node information corresponding to the nodes in each layer is stored in the tree structure table D100 in ascending order of the layer numbers in the tree structure T100. Specifically, first one piece of node information corresponding to the one root in layer 0 is stored, then two pieces of node information corresponding to the two nodes in layer 1, followed by four pieces of node information corresponding to the four nodes in layer 2, and so on in the same manner.

(b) Within each layer, the pieces of node information corresponding to each node in the layer are stored in ascending order of node name.

Specifically, the pieces of node information are stored in the following order in the tree structure table D100 shown in FIG. 3:

"root", "0", "1", "00", "01", "10", "11", "000", "001", "010", "011", . . . , "101", "110", "111", "0000" "0001", "0010", "0011", . . . , "1100", "1101", "1110", "1111".

Here, the order in which the pieces of node information are stored is shown by the node name included in each piece of node information.

(2) Tree Structure Construction Unit 101

The tree structure construction unit 101, as described below, constructs an n-ary data structure for managing device keys, and stores the constructed tree structure in the tree structure storage unit 102. Here, n is an integer equal to or greater than 2. As an example, n=2.

The tree structure construction unit 101 first generates a piece of node information with "root" as the node name, and writes the generated piece of node information to the tree structure table in the tree structure storage unit 102.

Next, tree structure construction unit 101 generates node names "0" and "1" that identify the two nodes in layer 1, generates two pieces of node information that respectively include the generated node names "0" and "1", and writes the two generated pieces of node information in the stated order to the tree structure table in the tree structure storage unit 102.

Next, the tree structure construction unit 101 generates four node names "00", "01", "10" and "11" that identify the four nodes in layer 2, generates four pieces of node information that respectively include "00", "01", "10" and "11", and adds the four generated pieces of node information to the tree structure table in the stated order.

After this, the tree structure construction unit 101 generates node information for layer 3 and layer 4 in the stated order, and writes the generated node information to the tree structure table, in the same manner as described above.

Next, the tree structure construction unit 101 generates a device key with use of a random number, for each node in the tree structure, and writes the generated device keys to the tree structure in correspondence with the respective nodes.

(3) Device Key Assignment Unit 103

The device key assignment unit 103, as described below, selects a device key in correspondence with a leaf to which a user apparatus is not yet assigned and a user apparatus to which a device key is to be assigned, and outputs the selected device key to the user apparatus.

The device key assignment unit 103 has a variable ID that is four bits in length.

The device key assignment unit 103 performs below-described processing (a) to (f) sixteen times. Each time, the variable ID has one of the values "0000", "0001", "0010", . . . , "1110", and "1111". By performing the processing sixteen times, the device key assignment unit 103 assigns ID information and five device keys to each of the 16 user apparatuses.

(a) The device key assignment unit 103 obtains the piece of node information that includes the node name "root", from the tree structure table in the tree structure storage unit 102, and extracts the device key from the obtained node information. The extracted device key is the device key assigned to the root.

(b) The device key assignment unit 103 obtains the piece of node information that includes the node name that is the head bit of the variable ID, from the tree structure table in the tree structure storage unit 102, and extracts the device key from the obtained node information. Hereinafter, this device key is called device key A.

(c) The device key assignment unit 103 obtains the piece of node information that includes the node name that is the head two bits of the variable ID, from the tree structure table in the tree structure storage unit 102, and extracts the device key from the obtained node information. Hereinafter, this device key is called device key B.

(d) The device key assignment unit 103 obtains the piece of node information that includes the node name that is the head three bits of the variable ID, from the tree structure table in the tree structure storage unit 102, and extracts the device key from the obtained node information. Hereinafter, this device key is called device key C.

(e) The device key assignment unit 103 obtains the piece of node information that includes the node name that is the four bits of the variable ID, from the tree structure table in the tree structure storage unit 102, and extracts the device key from the obtained node information. Hereinafter, this device key is called device key D.

(f) The device key assignment unit 103 writes ID information, the device key assigned to the root, the device keys A, B, C, and D assigned to each node, and five pieces of device key identification information, to a key information storage unit in the user apparatus. Note that the ID information is the variable ID, and that the five pieces of device key of identification information respectively identify the five device keys.

Figure 8:
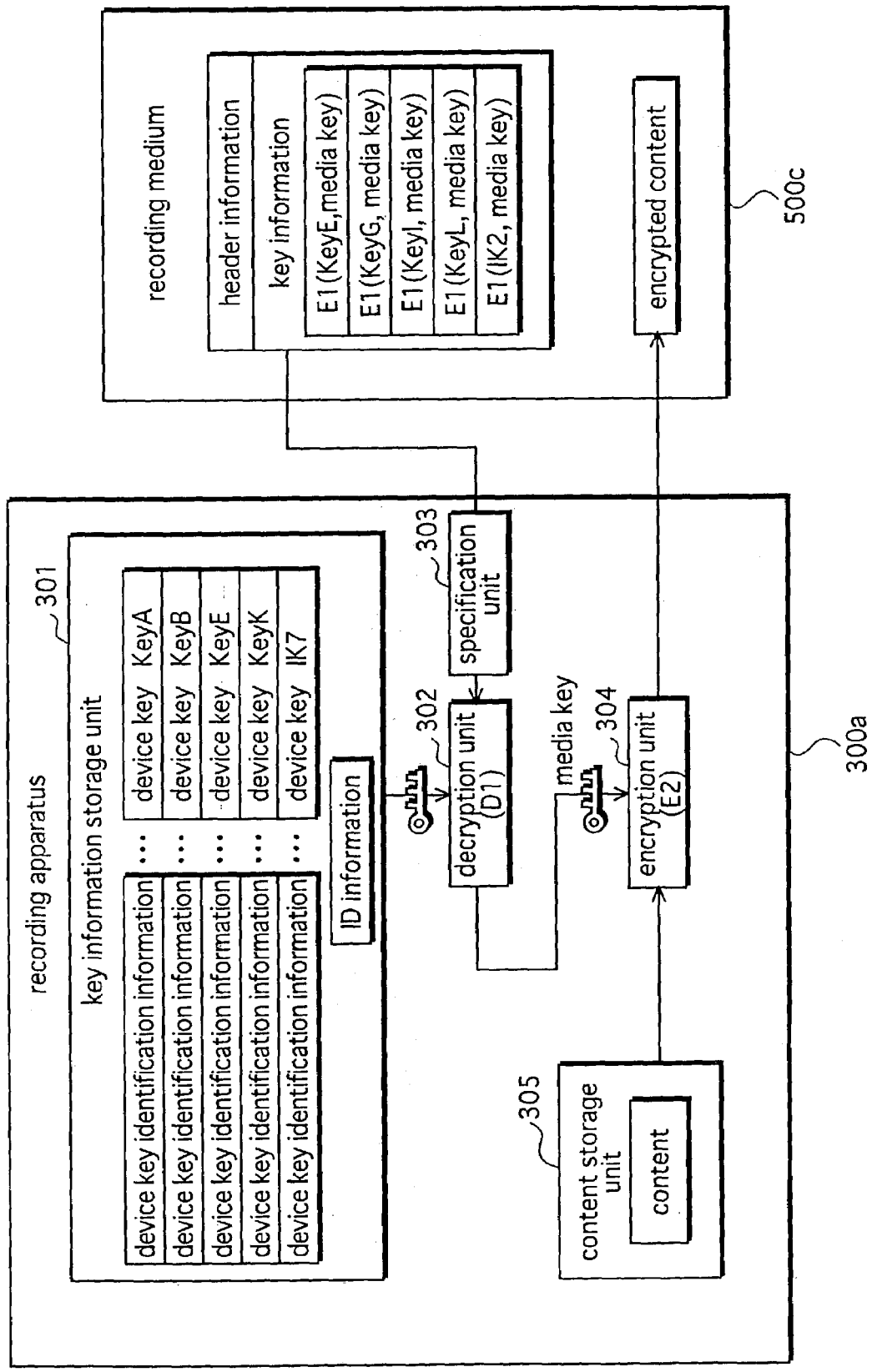

In this way, the key information storage unit in each user apparatus stores ID information, five pieces of device key identification information and five device keys, as shown in one example in FIG. 8. Here, the five pieces of device key identification information and the five device keys are stored in correspondence. Each piece of device key identification information is the number of the layer (layer number) to which the corresponding device key is assigned.

In this way, ID information and five device keys are assigned to each of the sixteen user apparatuses.

As one example, the tree structure T100 shown in FIG. 4 is, as described above, a binary tree with five layers, and includes sixteen leaves. Here, it is assumed that there are sixteen user apparatuses, each of which corresponds to one of the leaves. Each user apparatus is provided with the device keys assigned to the nodes on the path from the corresponding leaf through to the root. For example, a user apparatus 1 is provided with five device keys IK1, KeyH, KeyD, KeyB, and KeyA. The user apparatus 1 is further provided, for example, with ID information "0000", and the user apparatus 14 provided with ID information "1101".

(4) Revoked Apparatus Designation Unit 104

The revoked apparatus designation unit 104 receives at least one piece of ID information that identifies at least one user apparatus that is to be revoked, from the manager of the key management apparatus 100, and outputs the received ID information to the key structure updating unit 105.

(5) Key Structure Updating Unit 105

The key structure updating unit 105 receives the at least one piece of ID information from the revoked apparatus designation unit 104, and on receiving the ID information, performs the following processing (a) to (d) for each of the at least one piece of ID information.

(a) The key structure updating unit 105 obtains the piece of node information that includes the received ID information as the node name, from the tree structure table in the tree structure storage unit 102, attaches a revocation flag "1" to the obtained node information, and writes the node information to which the revocation flag "1" has been attached to the position in the tree structure table where the obtained node information is stored, thus overwriting the original piece of node information with the node information to which the revocation flag has been attached.

(b) The key structure updating unit 105 obtains the piece of node information that includes as the node name the head three bits of the received ID information, from the tree structure table in the tree structure storage unit 102, attaches a revocation flag "1" to the obtained piece of node information, and overwrites the original piece of node information in the tree structure table, in the same manner as described above.

(c) The key structure updating unit 105 obtains the piece of node information that includes as the node name the head two bits of the received ID information, from the tree structure table in the tree structure storage unit 102, attaches a revocation flag "1" to the obtained piece of node information, and overwrites the original piece of node information in the tree structure table, in the same manner as described above.

(d) The key structure updating unit 105 obtains the piece of node information that includes "root" as the node name, from the tree structure table in the tree structure storage unit 102, attaches a revocation flag "1" to the obtained piece of node information, and overwrites the original piece of node information in the tree structure table, in the same manner as described above.

As has been described, the key structure updating unit 105 revokes, based on the ID information received from the revoked apparatus designation unit 104, all nodes on the path from the leaf shown by the received information through to the root in the tree structure.

Figure 5:
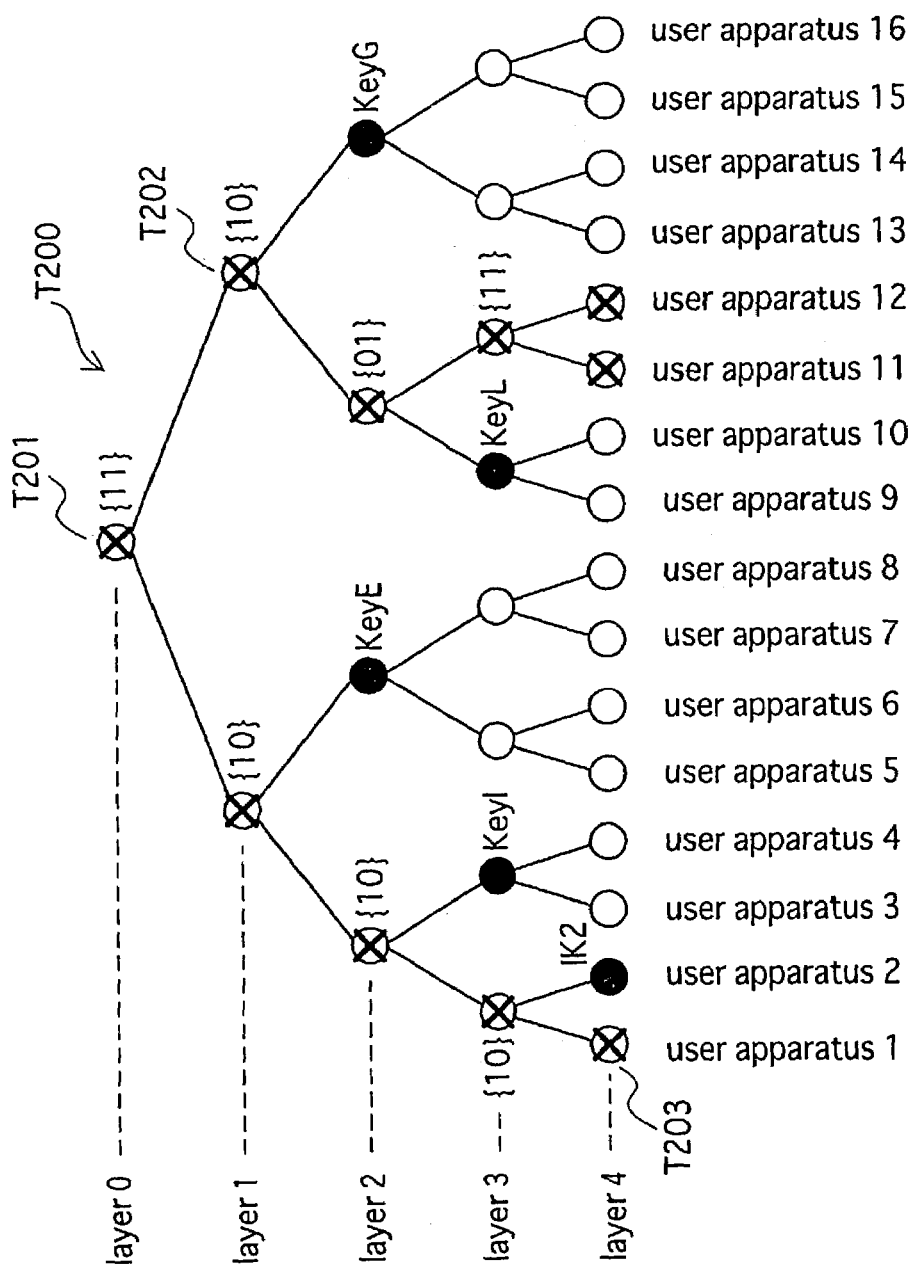
FIG. 5 is a conceptual diagram of a tree structure T200 that includes revoked nodes.

Assuming that user apparatuses shown by ID information "0000", "1010", and "1011" in the tree structure T100 showing FIG. 4 are to be revoked, the resulting tree structure T200 in which nodes have been revoked in the above-described manner is that shown in FIG. 5.

Furthermore, the tree structure table D100 has revocation flags that correspond to the tree structure T200.

In the tree structure T200, all nodes on the path to the root from the leaf corresponding to the user apparatus 1 shown by the ID information "0000", all nodes on the path to the root from the leaf corresponding to the user apparatus 11 shown by the ID information "1010", and all nodes on the path to the root from the leaf corresponding to the user apparatus 12 shown by the ID information "1011" are marked with a cross (X). Each cross shows a revoked node.

Each piece of node information in the tree structure table D100 that corresponds to one of the revoked nodes has a revocation flag attached.

(6) Key Information Header Generation Unit 106

The key information header generation unit 106 has a variable i that shows a number of a layer, and a variable j that shows the node name in the layer.

The key information header generation unit 106 performs processing (a) described below, for each layer in the tree structure. Each time the key information header generation unit 106 performs the processing, the variable i that shows the layer number has a value "0", "1", "2", or "3".

(a) The key information header generation unit 106 performs processing (a-1) to (a-3) for each node in the layer whose layer number is shown by the variable i. Here, the name of the node that is the target of processing (a-1) to (a-3) is shown by the variable j.

(a-1) The key information header generation unit 106 obtains from the tree structure table in the tree structure storage unit 102 the piece of node information that includes a node name that is obtained by joining the variable j and "0", and the piece of node information that includes a node name that is obtained by joining the variable j and "1".

The two pieces of node information obtained in this way correspond to the two nodes that are directly subordinate to (i.e., connected to and are directly below) the target node shown by the variable j.

(a-2) The key information header generation unit 106 checks whether the revocation flag included in each of the two obtained pieces of node information is "0". If both are not "0", the key information header generation unit 106 generates a node revocation pattern (hereinafter "NRP") by arranging the two revocation flags respectively included in the two obtained pieces of node information, in the order that the two pieces of node information are stored in the tree structure table.

Specifically, when the revocation flags in the two obtained pieces of node information are "0" and "0" respectively, the key information header generation unit 106 does not generate an NRP.

Furthermore, when the revocation flags in the two obtained pieces of node information are "1" and "0" respectively, the key information header generation unit 106 generates an NRP {10}.

When the revocation flags in the two obtained pieces of node information are "0" and "1" respectively, the key information header generation unit 106 generates an NRP {01}.

When the revocation flags in the two obtained pieces of node information are "1" and "1" respectively, the key information header generation unit 106 generates an NRP {1}.

(a-3) The key information header generation unit 106 outputs the generated NRP to the key information recording apparatus 200.

In the manner described, the key information header generation unit 106 checks for each node in the layer whether the two directly subordinate nodes of the target node are revoked or not, and when either or both of the two lower nodes is revoked, generates a revocation pattern as described above. In the tree structure T200 shown in FIG. 5, each generated NRP is shown near the corresponding node that is marked with a cross.

Figure 6:
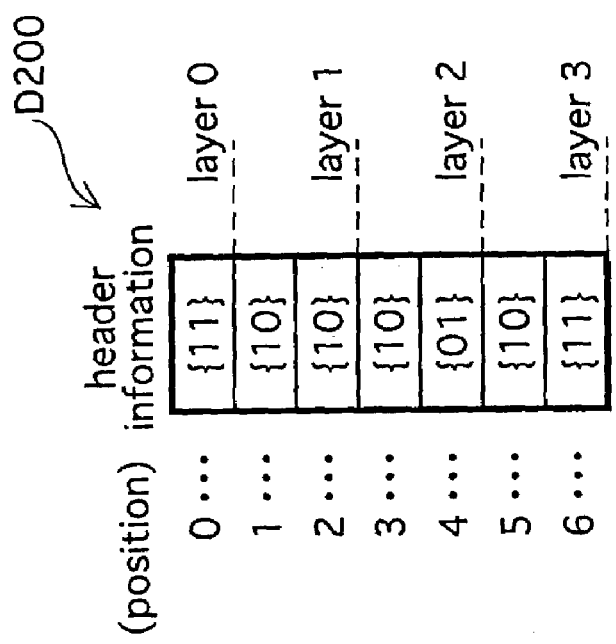
FIG. 6 is a data structure diagram showing an example of node revocation patterns.

Furthermore, since the key information header generation unit 106 outputs NRPs in the above-described processing, in the case shown in FIG. 5, a plurality of NRPs shown as one example in FIG. 6 are generated and output. The key information header generation unit 106 outputs these NRPs as header information.

In the tree structure T200 shown in FIG. 5, the user apparatus 1, the user apparatus 11 and the user apparatus 12 are revoked. Here, nodes that are on a path from the leaf corresponding to each user apparatus to be revoked through to the root (in other words, the nodes marked with a cross in FIG. 5) are called revoked nodes. Furthermore, an NRP is made by combining in order from left to right the state of the two child nodes of a node. Here, "1" is used to express a revoked child node, while "0" is used to express a child node that is not revoked. For an n-ary tree, each revocation pattern is information that is n bits in length. Both the child nodes of a root T201 in the tree structure T200 are revoked, therefore the revocation pattern of the root T201 is expressed {11}. The revocation pattern of a node T202 is expressed {10}. A node T203 is a revoked node, but since it is a leaf and therefore does not have any child nodes, it does not have a revocation pattern.

As shown in FIG. 6 as one example, header information D200 is composed of NRPs {11}, {10}, {10}, {10}, {01}, {10}, and {11}, which are included in the header information D200 the stated order.

Note that the positions in the header information D200 in which the node information patterns are arranged are set. The positions are set according to the above-described repeated processing. As shown in FIG. 6, the NRPs {11}, {10}, {10}, {10}, {01}, {10}, and {11{ are arranged respectively in positions defined by "0", "1", "2", "3", "4", "5", and "6".

As has been described, the key information header generation unit 106 extracts the NRP of at least one revoked node, and outputs the extracted at least one NRP as header information of the key information, to the key information recording apparatus 200. Here, the key information header generation unit 106 arranges in level order. In other words, the key information header generation unit 106 arranges the plurality of NRPs in order from the top layer through to the bottom layer, and arranges NRPs of the same layer in order from left to right. Note it is sufficient for the NRPs to be arranged based on some kind of rule. For example, NRPs in the same layer may be arranged from right to left.

(7) Key Information Generation Unit 107

The key information generation unit 107 has a variable i that shows the layer number, and a variable j that shows the node name in the layer, the same as the key information header generation unit 106.

The key information generation unit 107 performs the following processing (a) for each layer excluding the layer 0. In performing the processing (a) for each layer, the variable i showing the layer number holds a value "1", "2", or "3".

(a) The key information generation unit 107 performs processing (a-1) to (a-3) for each node in the layer whose layer number is shown by the variable i. Here, the name of the node that is the target of processing (a-1) to (a-3) is shown by the variable j.

(a-1) The key information generation unit 107 obtains the piece of node information that includes the variable j as the node name, from the tree structure table in the tree structure storage unit 102, and judges whether the revocation flag in the obtained node information is "1" or "0".

(a-2) When the revocation flag is "0", the key information generation unit 107 further judges whether encryption has been performed using the device key that corresponds to the node connected directly above the target node.

(a-3) When the encryption has not been performed using the device key that corresponds to the node connected directly above the target node, the key information generation unit 107 extracts the device key from the obtained piece of node information, and encrypts the generated media key with use of the extracted device key, by applying an encryption algorithm E1, to generate an encrypted media key.

Encrypted media key=$E1$(device key, media key)

Here, E (A, B) shows that data B is encrypted with use of a key A by applying the encryption algorithm E.

One example of the encryption algorithm E1 is DES (Data Encryption Standard).

Next, the key information generation unit 107 outputs the generated encrypted media key to the key information recording apparatus 200.

Note that when the revocation flag is "1", or when encryption has been performed, the key information generation unit 107 does not perform the processing (a-3).

Figure 7:
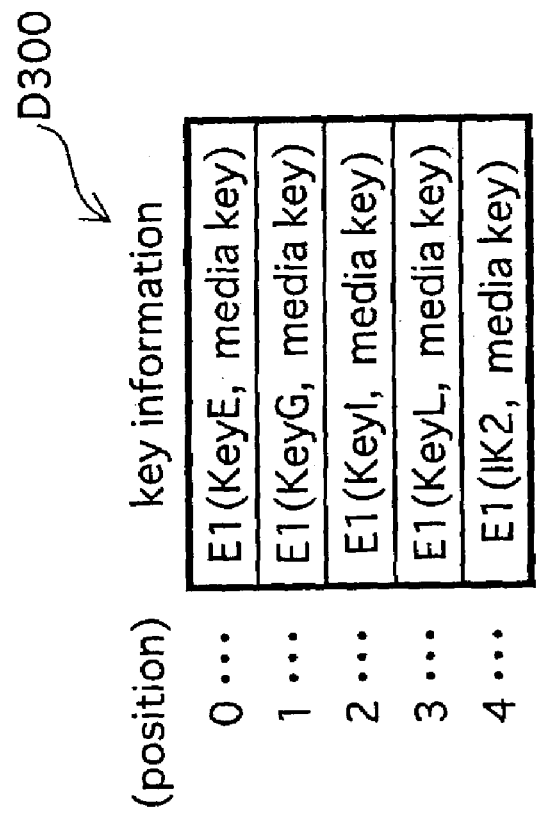
FIG. 7 is a data structure diagram showing an example of key information that includes a plurality of encrypted media keys.

Since the key information generation unit 107 performs the above-described processing repeatedly as described, in the case shown in FIG. 5, a plurality of encrypted media keys such as those shown in an example in FIG. 7 are generated and output. The key information generation unit 107 outputs the plurality of encrypted media keys as key information D300.

Note that the positions in which the media keys are stored in the key information D300 are set. These positions are set according to the above-described processing. As shown in FIG. 7, encrypted media keys E1 (keyE, media key), E1 (keyG, media key), E1 (keyI, media key), E1 (keyL, media key) and E1 (IK2, media key) are stored respectively in positions defined by "0", "1", "2", "3" and "4".

1.1.2 Key Information Recording Apparatus 200

The key information recording apparatus 200 receives header information from the key information header generation unit 106, receives key information from the key information generation unit 107, and writes the received header information and key information to the recording medium 500a.

1.1.3 Recording Mediums 500a, b, and c

The recording medium 500a is a recordable medium such as a DVD-RAM, and stores no information of any kind.

The recording medium 500b is the recording medium 500a to which key information that has header information attached thereto has been written by the key management apparatus 100 and the key information recording apparatus 200 in the manner described earlier.

The recording medium 500c is the recording medium 500b to which encrypted content has been written by any of the recording apparatuses 300a etc. in the manner described earlier.

As shown in FIG. 8, key information that has header information attached thereto and encrypted content are recorded on the recording medium 500c.

1.1.4 Recording apparatuses 300a etc.

The recording apparatus 300a, shown in FIG. 8, is composed of a key information storage unit 301, a decryption unit 302, specification unit 303, an encryption unit 304, and a content storage unit 305. Note that the recording apparatuses 300b etc. have an identical structure to the recording apparatuses 300a, and therefore descriptions thereof are omitted.

The recording apparatus 300a includes a microprocessor, a ROM, and a RAM. Computer programs are stored in the RAM. The recording apparatus 300a achieves its functions by the microprocessor operating in accordance with the computer programs.

The recording medium 500b is loaded into the recording apparatus 300a. The recording apparatus 300a analyzes header information stored on the recording medium 500b, based on the ID information stored by the recording apparatus 300a itself, to specify the positions of the encrypted media key that is to be decrypted and the device key that is to be used, and uses the specified device key to decrypt the encrypted media key and consequently obtain the media key. Next, the recording apparatus 300a encrypts digitized content with use of the obtained media key, and records the encrypted content on the recording medium 500b.

(1) Key Information Storage Unit 301

The key information storage unit 301 has an area for storing ID information, five device keys, and five pieces of device key identification for respectively identifying the five device keys.

(2) Specification Unit 303

The specification unit 303 operates under the assumption that the key information header generation unit 106 in the key management apparatus 100 has generated the header information of the key information following the Order Rule 1 described earlier.

The specification unit 303 reads the ID information from the key information storage unit 301. The specification unit 303 also reads the header information and the key information from the recording medium 500b. Next, the specification unit 303 specifies a position X of one encrypted media key in the key information, with use of the read ID information and the read header information, by checking the pieces of header information sequentially from the top, and specifies the piece of device key identification information that identifies the device key that is to be used in decrypting the encrypted media key. Note that details of the operations for specifying the position X of the encrypted media key and specifying the piece of device key identification information are described later.

Next, the specification unit 303 outputs the specified encrypted media key and the specified device identification information to the decryption unit 302.

(3) Decryption Unit 302

The decryption unit 302 receives the encrypted media key and the piece of device key identification information from the specification unit 303. On receiving the encrypted media key and the piece of device key identification information, the decryption unit 302 reads the device key identified by the received piece of device key identification information from the key information storage unit 301, and decrypts the received encrypted media key with use of the read device key by applying a decryption algorithm D1, to generate a media key.

media key=D1(device key, encrypted media key)

Here, D(A, B) denotes decrypting encrypted data B with use of a key A by applying a decryption algorithm D, to generate the original data.

Furthermore, the decryption algorithm D1 corresponds to the encryption algorithm E1, and is an algorithm for decrypting data that has been encrypted by applying the encryption algorithm E1.

Next, the decryption unit 302 outputs the generated media key to the key information updating unit 304.

Note that each block shown in FIG. 8 is connected to the block by connection lines, but some of the connection lines are omitted. Here, each connection line represents a path via which signals and information are transferred. Furthermore, of the connection lines that connect to the block representing the decryption unit 302, the line on which a key mark is depicted represents the path via which information is transferred to the decryption unit 302 as a key. This is the same for the key information updating unit 304, and also for other blocks in other drawings.

(4) Content Storage Unit 305

The content storage unit 305 stores content that is a digital work, such as digitized music.

(5) Encryption Unit 304

The encryption unit 304 receives the media key from the decryption unit 302, and reads the content from the content storage unit 305. Next, the encryption unit 304 encrypts the read content with use of the received media key by applying an encryption algorithm E2, to generate encrypted content.

Encrypted content=E2(media key, content)

Here, the encryption algorithm E2 is, for example, a DES encryption algorithm.

Next, the encryption unit 304 writes the generated encrypted content to the recording medium 500b. This results in the recording medium 500c to which the encrypted content has been written being generated.

1.1.5 Reproduction Apparatuses 400a, 440b, 400c . . .

Figure 9:
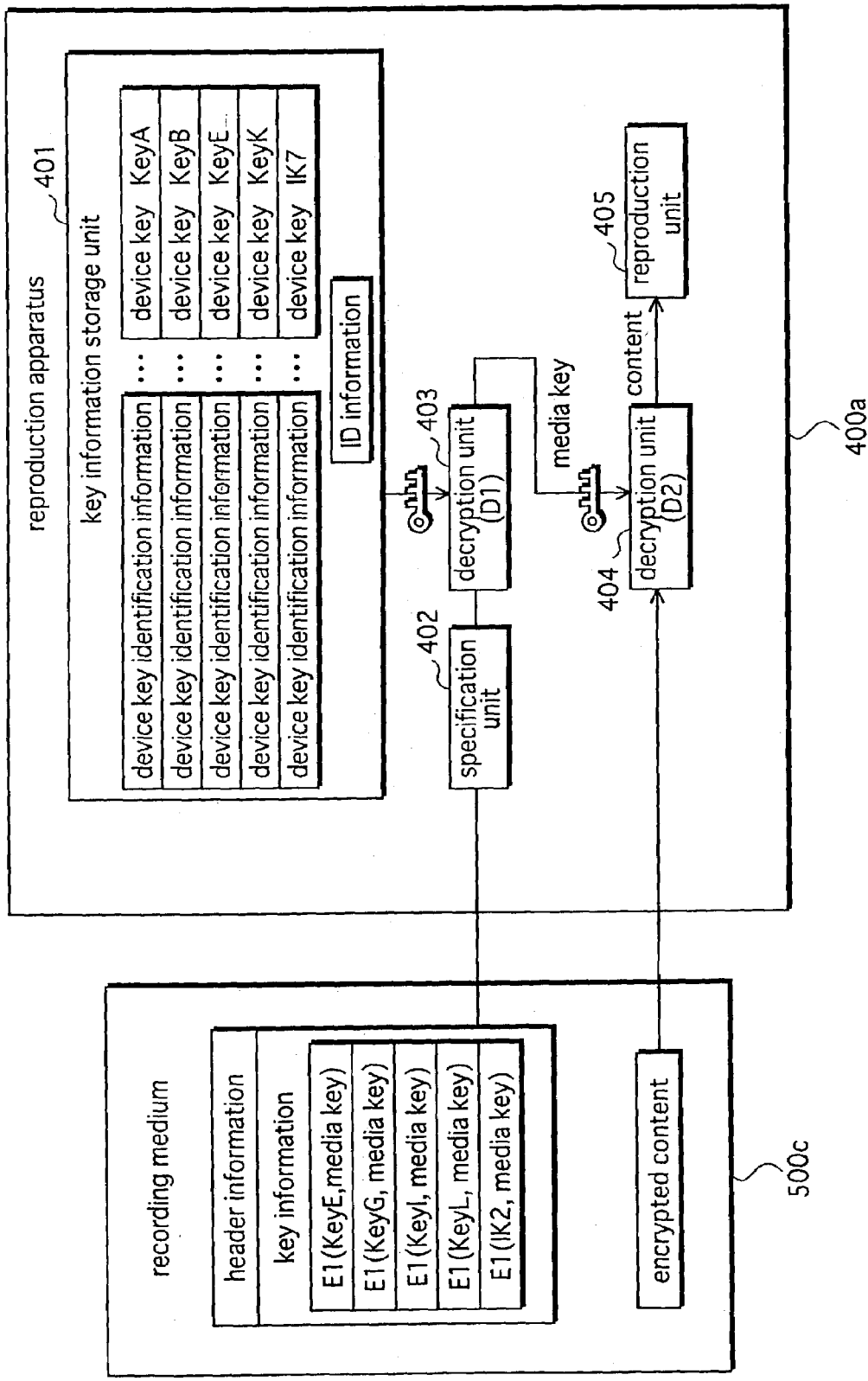

The reproduction apparatus 400a, as shown in FIG. 9, is composed of a key information storage unit 401, a specification unit 402, a decryption unit 403, a decryption unit 404 and a reproduction unit 405. Note that the reproduction apparatuses 400b etc. have the same structure as the reproduction apparatus 400a, and therefore a description thereof is omitted.

The reproduction apparatus 400a specifically includes a microprocessor, a ROM and a RAM. Computer programs are stored in the RAM. The reproduction apparatus 400a achieves its functions by the microprocessor operation according to the computer programs.

Here, the key information storage unit 401, the specification unit 402, and the decryption unit 403 have the same structures as the key information storage unit 301, specification unit 303, and the decryption unit 302 respectively, and therefore a description thereof is omitted.

The recording medium 500c is loaded into the reproduction apparatus 400a. The reproduction apparatus 400a, based on the ID information that the reproduction apparatus 400a itself stores, analyzes the header information stored in the recording medium 500c to specify the position of the encrypted media key to be decrypted and the device key to be used, and decrypts the specified encrypted media key with use of the specified device key, to obtain the media key. Next, the reproduction apparatus 400a decrypts the encrypted content stored on the recording medium 500c, with use of the obtained media key, to reproduce the content.

(1) Decryption Unit 404

The decryption unit 404 receives the media key from the decryption unit 403, reads the encrypted content from the recording medium 500c, decrypts the read encrypted content with use of the received media key, by applying a decryption algorithm D2, to generate content, and outputs the generated content to the reproduction unit 405.

Content=D2(media key, encrypted content)

Here, the decryption algorithm D2 corresponds to the encryption algorithm E2, and is an algorithm for decrypting data that has been encrypted by applying the encryption algorithm E2.

(2) Reproduction Unit 405

The reproduction unit 405 receives the content from the decryption unit 404, and reproduces the received content. For example, when the content is music, the reproduction unit 405 converts the content to audio, and outputs the audio.

1.2 Operations of the Digital Work Protection System

The following describes operations of the digital work protection system 10

Figure 10:
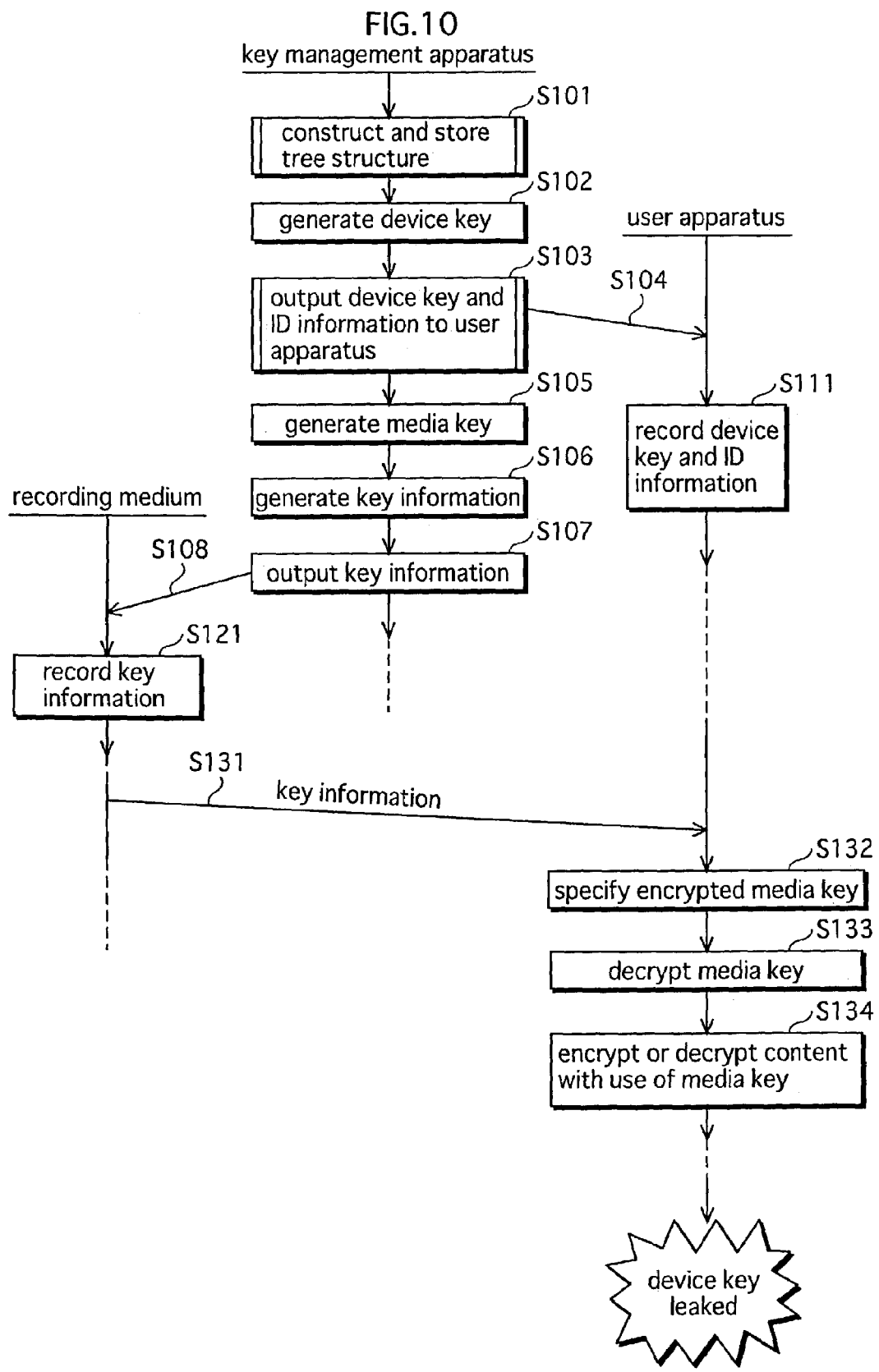
FIG. 10 is a flowchart showing operations for assigning a device key to a user apparatus, operations for generating key information and writing the key information to a recording apparatus, and operations for the user apparatus to encrypt or decrypt content; and in particular showing operations for each apparatus up to when a device key is exposed illegally by a third party.

1.2.1 Operations for Assigning Device Keys, Generating a Recording Medium, and Encrypting or Decrypting Content Here, the flowchart in FIG. 10 is used to describe operations for assigning device keys to each user apparatus, operations for generating key information and writing the key information to a recording medium, and operations by the user apparatus for encrypting or decrypting content. In particular, the operations are described for up until the device key is exposed illegally by a third party.

The tree structure construction unit 101 in the key management apparatus 100 generates a tree structure table that expresses a tree structure, and writes the generated tree structure table to the tree structure storage unit 102 (step S101). Next, the tree structure construction unit 101 generates a device key for each node of the tree structure, and writes each generated device key in correspondence with the respective node to the tree structure table (step S102). Next, the device key assignment unit 103 outputs device keys, device key information and ID information to the corresponding user apparatus (steps S103 to S104). The key information storage unit of the user apparatus receives the device keys, the device key identification information and the ID information (step S104), and records the received device keys, device key identification information and ID information (step S111).

In this way, user apparatuses in which device keys, device key identification information, and ID information are recorded are produced, and the produced user apparatuses are sold to users.

Next, the key information generation unit 107 generates a media key (step S105), generates key information (step S106), and outputs the generated key information to the recording medium 500a via the key information recording apparatus 200 (steps S107 to S108). The recording medium 500a stores the key information (step S121).

In this way, the recording medium 500b on which the key information is recorded is generated, and then distributed to the user by, for instance, being sold.

Next, the recording medium on which the key information is recorded is loaded into the user apparatus, and the user apparatus reads the key information from the recording medium (step S131), uses the read key information to specify the encrypted media key that is assigned to the user apparatus itself (step S132), and decrypts the media key (step S133). Then, the user apparatus either encrypts the content, using the decrypted media key, and writes the encrypted content to the recording medium 500b, or reads encrypted content recorded from the recording medium 500c, and decrypts the read encrypted content, using the media key, to generate content (step S134).

In this way, encrypted content is written to the recording medium 500b by the user apparatus, and encrypted content recorded on the recording medium 500c is read and decrypted by the user apparatus, and then reproduced.

Next, the third party illegally obtains the device key by some kind of means. The third party circulates the content illegally, and produces and sells illegal apparatuses that are imitations of a legal user apparatus.

The manager of the key management apparatus 100 or the copyright holder of the content discovers that the content is being circulated illegally, or that illegal apparatuses are circulating, and therefore knows that a device key has been leaked.

1.2.2 Operations After the Device Key has Been Exposed

Figure 11:
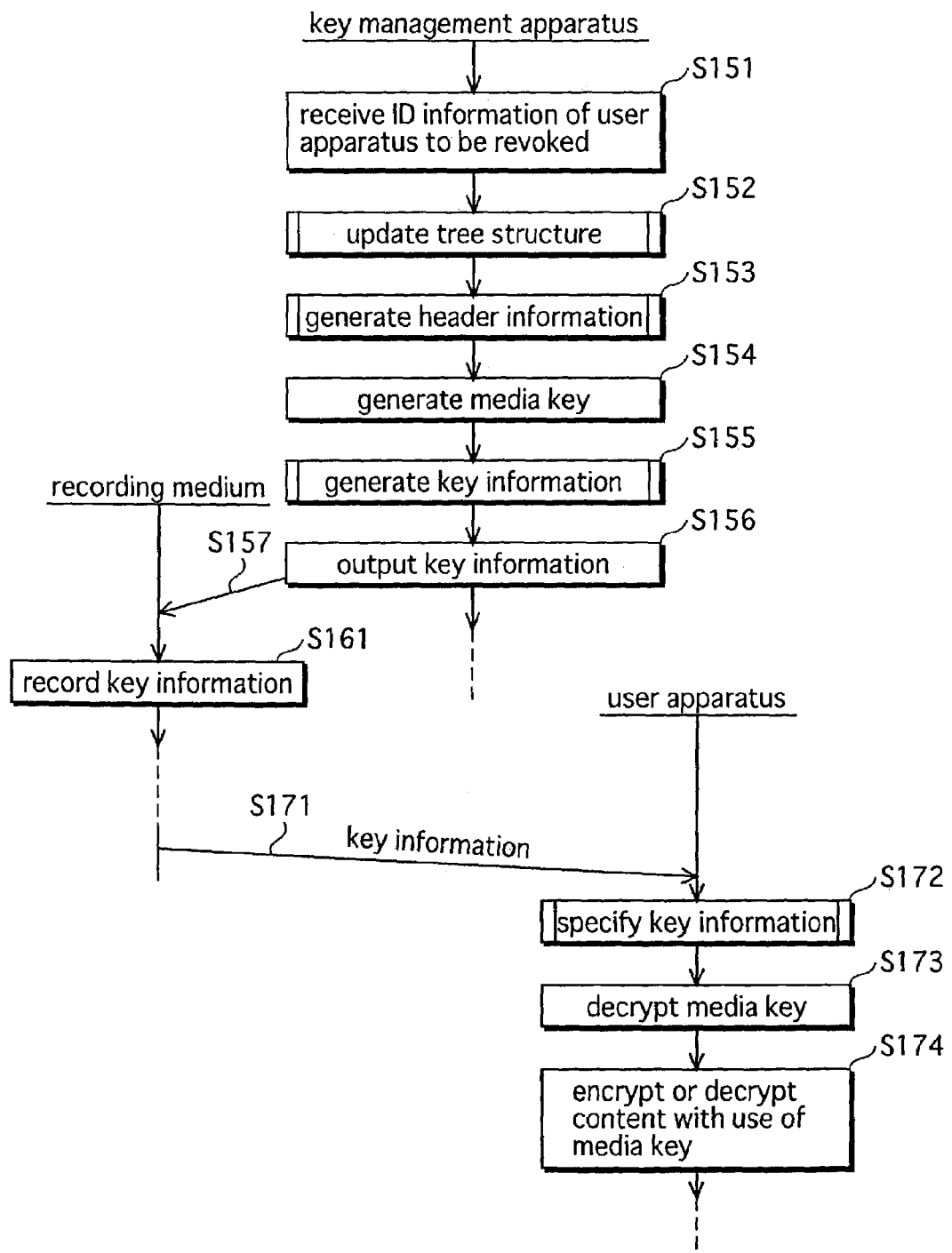
FIG. 11 is a flowchart showing, after the device key has been exposed illegally by a third party, operations for revoking the nodes in the tree structure to which the exposed device key corresponds, operations for generating new key information and writing the generated key information to a recording medium, and operations for the user apparatus to encrypt or decrypt content.

Here, the flowchart in FIG. 11 is used to describe operations for revoking nodes in the tree structure that correspond to the exposed device key, operations for generating new key information and writing the generated key information to a recording medium, and operations by the user apparatus for encrypting or decrypting content, after a device key has been exposed illegally by a third party.

The revoked apparatus designation unit 104 of the key management apparatus 100 receives at least one piece of ID information about at least one user apparatus to be revoked, and outputs the received ID information to the key structure updating unit 105 (step S151). Next, the key structure updating unit 105 receives the ID information, and updates the tree structure using the received ID information (step S152). The key information header generation unit 106 generates header information, and outputs the generated header information to the key information recording apparatus 200 (step S153). The key information generation unit 107 generates a media key (step S154), generates key information (step S155), and outputs the generated key information via the key information recording apparatus 200 (steps S156 to S157), which records the key information on to the recording medium 500a (step S161).

In this way, a recording medium 500b on which the key information is recorded is generated, and then distributed to the user by, for instance, being sold.

Next, the recording medium on which the key information is recorded is loaded in the user apparatus, and the user apparatus reads the key information from the recording medium (step S171), uses the read key information to specify the encrypted media key assigned to the user apparatus itself (step S172), and decrypts the media key (step S173). Then, the user apparatus either encrypts the content with use of the decrypted media key and writes the encrypted content to the recording medium 500b, or reads encrypted content recorded on the recording medium 500c and decrypts the read encrypted content with use of the media key, to generate content (step S174).

In this way, encrypted content is written to the recording medium 500b by the user apparatus, and encrypted content recorded on the recording medium 500c is read and decrypted by the user apparatus and then reproduced.

1.2.3 Operations for Constructing and Storing the Tree Structure

Figure 12:
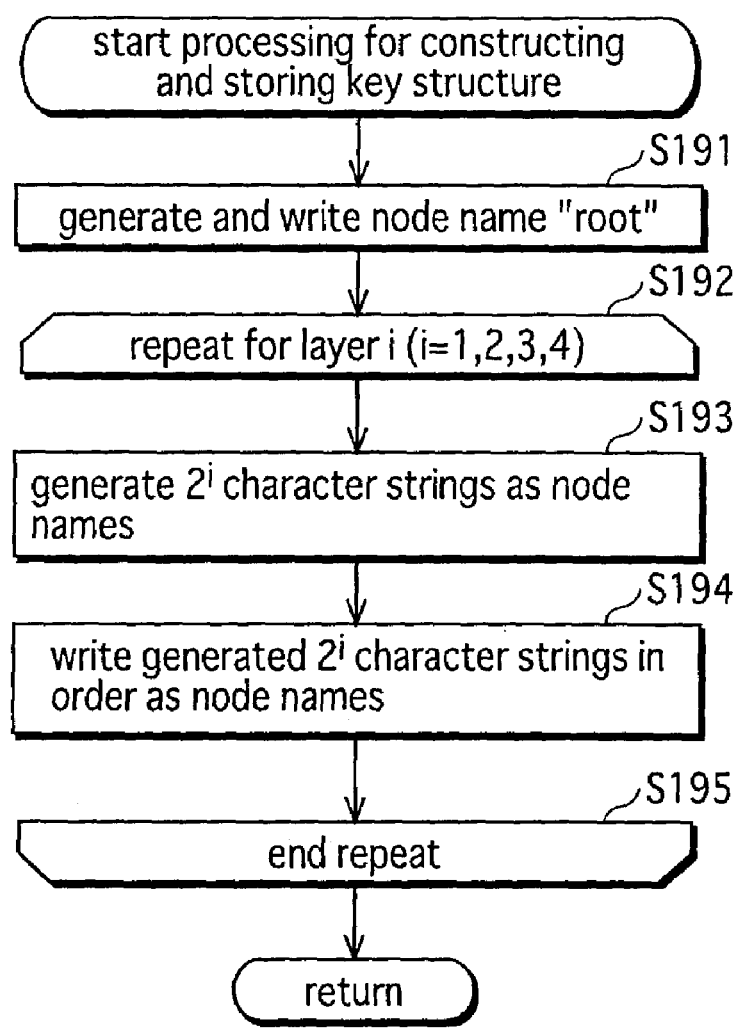
FIG. 12 is a flowchart showing operations by a key structure construction unit 101 for generating a tree structure table and writing the generated tree structure table to a tree structure storage unit 102.

Here, the flowchart in FIG. 12 is used to describe operations by the tree structure construction unit 101 for generating a tree structure table and writing the tree structure table to the tree structure storage unit 102. Note that the operations described here are details of step S101 in the flowchart in the FIG. 10.

The tree structure construction unit 101 generates node information that includes "root" as the node name, and writes the generated node information to the tree structure table in the tree structure storage unit 102 (step S191).

Next, the tree structure construction unit 101 repeats the following steps S193 to S194 for layer i (i=1,2,3,4).

The tree structure construction unit 101 generates a string of $2^i$ characters as the node name (step S193), and writes node information that includes the string of $2^i$ characters as the node name in order to the tree structure table (step S194).

Figure 13:
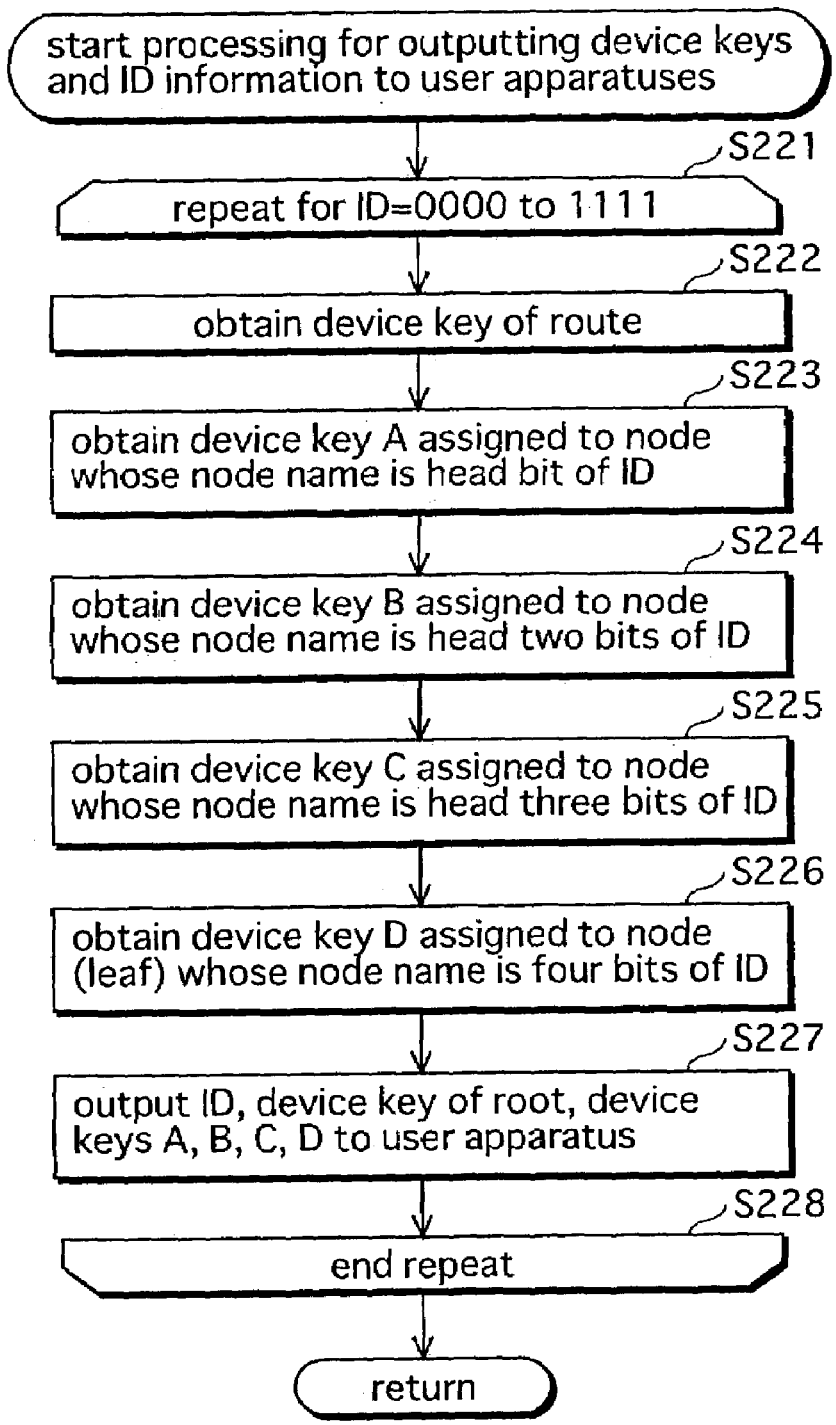
FIG. 13 is a flowchart showing operations by a device key assignment unit 103 for outputting device keys and ID information to each user apparatus.

1.2.4 Operations for Outputting Device Keys and ID Information to the User Apparatuses Here, the flowchart in FIG. 13 is used to describe operations by the device key assignment unit 103 for outputting device keys and ID information to the user apparatuses. Note that the operations described here are details of step S103 in the flowchart in FIG. 10.

The device key assignment unit 103 varies the variable ID to be "0000", "0001", "0010", . . . , "1110", and "1111", and repeats the following steps S222 to S227 for each variable ID.

The device key assignment unit 103 obtains the device key assigned to the root (step S222), obtains the device key A assigned to the node whose node name is the head bit of the variable ID (step S223), obtains a device key B assigned to the node whose node name is the head two bits of the variable ID (step S224), obtains a device key C assigned to the node whose node name is the head three bits of the variable ID (step S225), obtains a device key D assigned to the node whose node name is the head four bits of the variable ID (step S226), and outputs the device keys A, B, C, and D assigned to each node to the user apparatus (step S227).

1.2.5 Operations for Updating the Tree Structure

Figure 14:
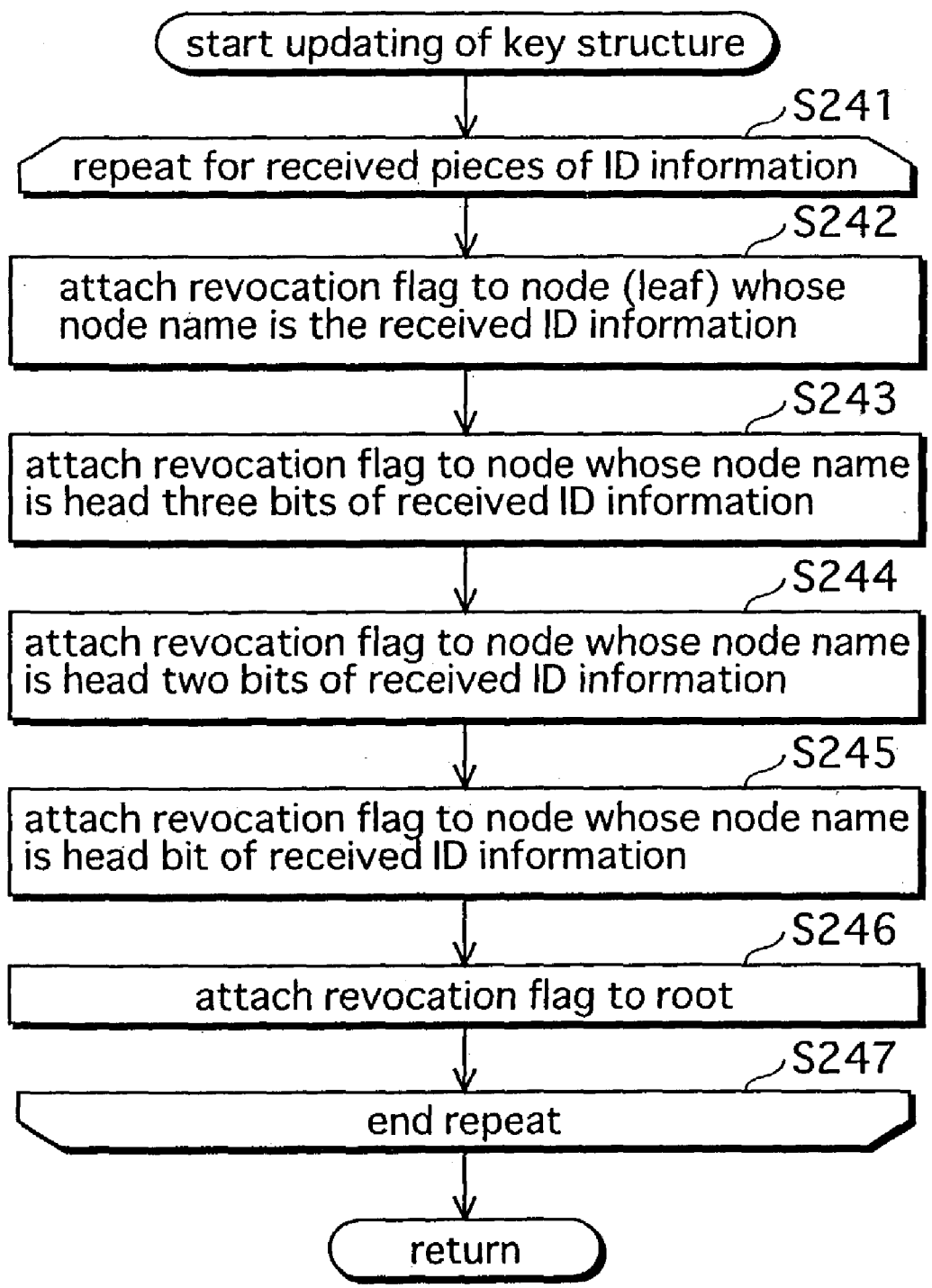
FIG. 14 is a flowchart showing operations by a tree structure updating unit 105 for updating the tree structure.

Here, the flowchart in FIG. 14 is used to describe operations by the key structure updating unit 105 for updating the tree structure. Note that the operations described here are details of step S152 in the flowchart in the FIG. 11.

The key structure updating unit 105 performs the following steps S242 to S246 for each of the at least one pieces of ID information received from the revoked apparatus designation unit 104.

The key structure updating unit 105 obtains the piece of node information that includes the received piece of ID information as the node name, and attaches a revocation flag "1" to the obtained node information (step S242).

Next, the key structure updating unit 105 obtains the piece of node information that includes the head three bits of the received piece of ID information as the node name, and attaches a revocation flag "1" to the obtained node information (step S243).

Next, the key structure updating unit 105 obtains the pieces of node information that includes the head two bits of the received piece of ID information as the node name, and attaches a revocation flag "1" to the obtained node information (step S244).

Next, the key structure updating unit 105 obtains the piece of node information that includes the head bit of the received ID information as the node name, and attaches a revocation flag "1" to the obtained piece of node information (step S245).

Next, the key structure updating unit 105 obtains the piece of node information that includes "root" as the node name, and attaches a revocation flag "1" to the obtained piece of node information (step S246).

1.2.6 Operations for Generating Header Information

Figure 15:
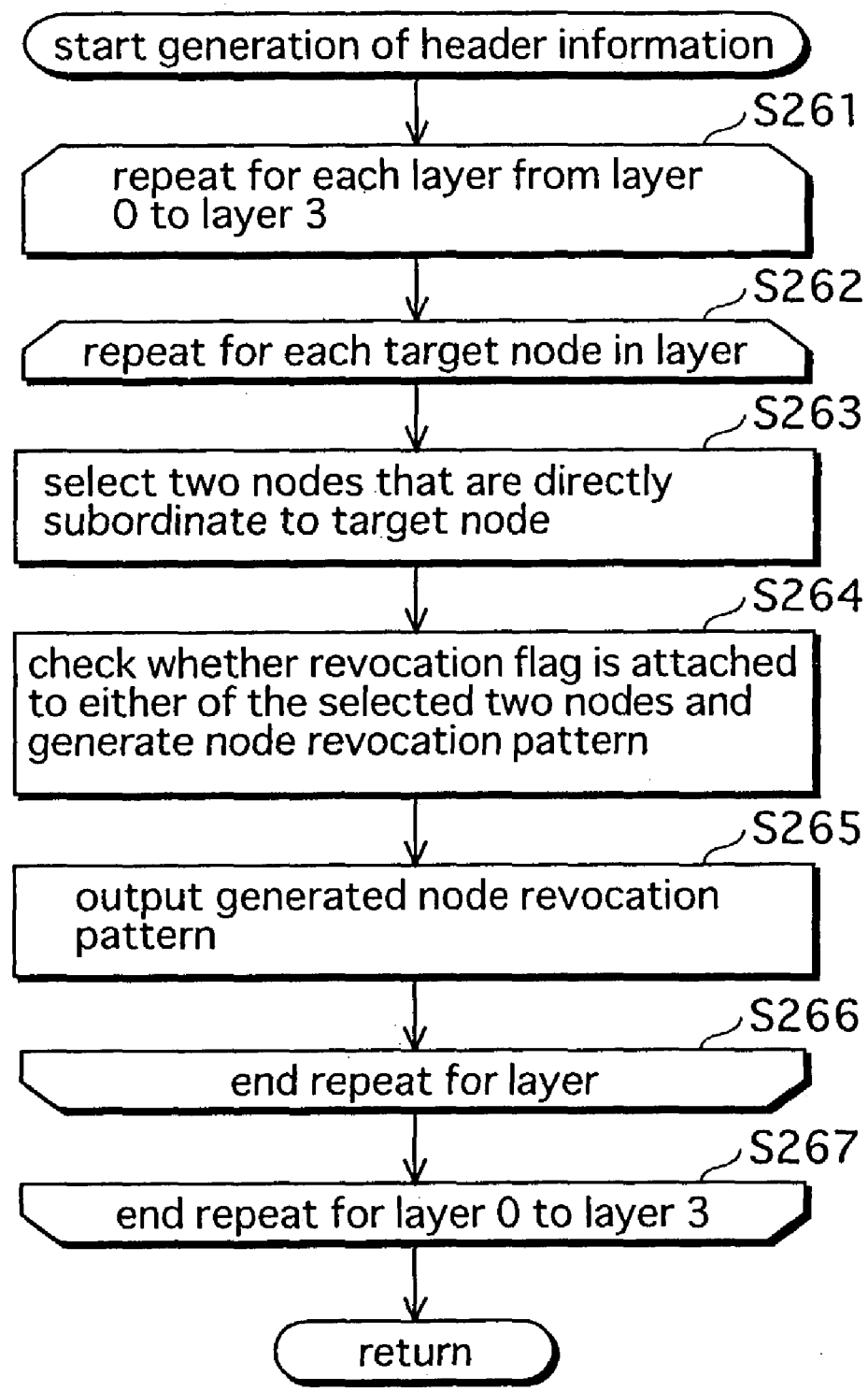
FIG. 15 is a flowchart showing operations by a key information header generation unit 106 for generating header information.

Here, the flowchart in FIG. 15 is used to describe operations by the key information header generation unit 106 for generating header information. Note that the operations described here are the details of step S153 in the flowchart in FIG. 11.

The key information header generation unit 106 performs steps S262 to S266 for each layer from layer 0 to layer 3, and further performs steps S263 to S265 for each target node in each layer.

The key information header generation unit 106 selects the two directly subordinate nodes of the target node (step S263), checks whether each of the two selected nodes have a revocation flag attached thereto or not, to generate an NRP (step S264), and outputs the generated revocation pattern (step S265).

1.2.7 Operations for Generating Key Information

Figure 16:
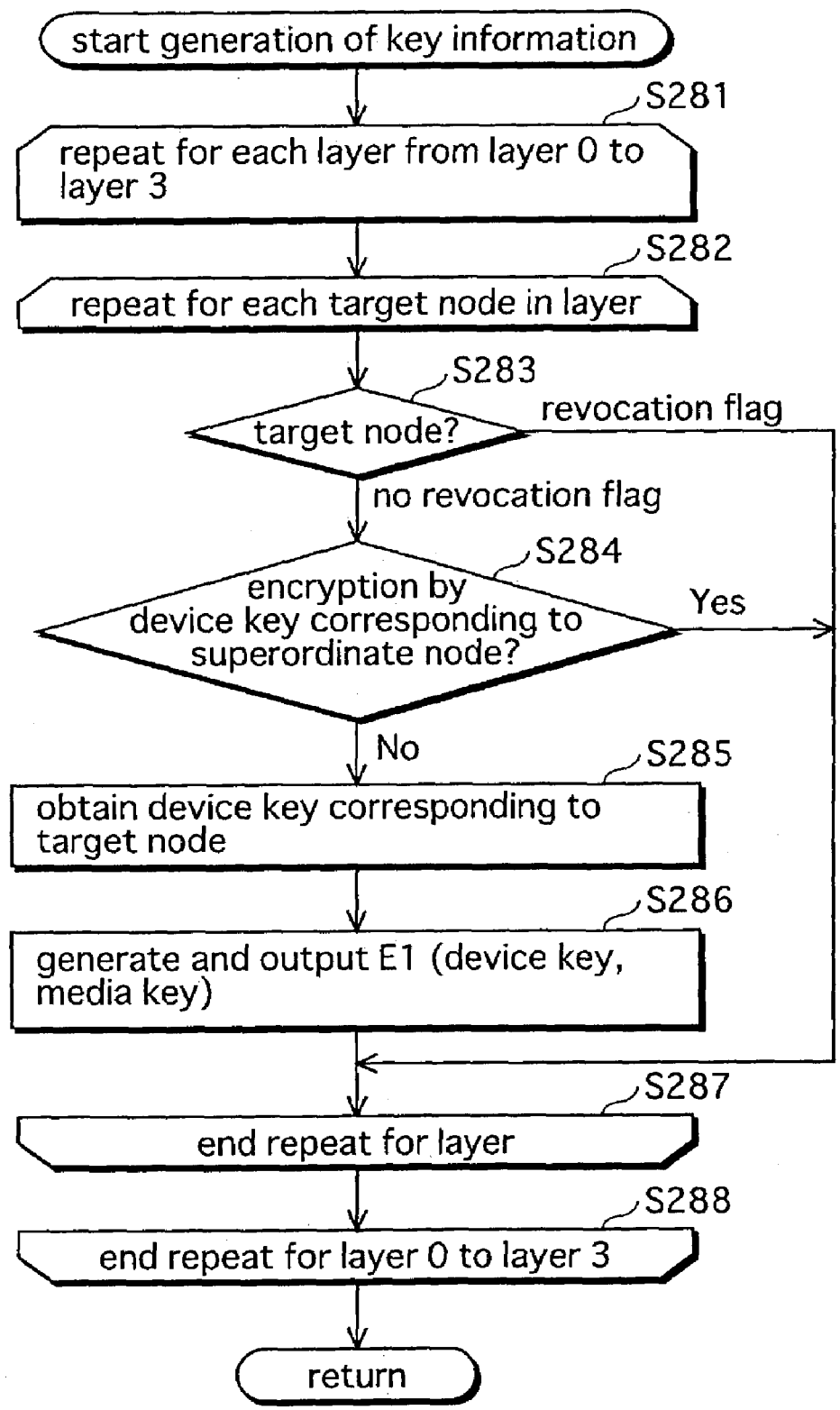
FIG. 16 is a flowchart showing operations by a key information generation unit 107 for generating key information.

Here, the flowchart in FIG. 16 is used to described operations by the key information generation unit 107 for generating key information. Note that the operations described here are the details of step S155 in the flowchart in FIG. 11.

The key information generation unit 107 performs steps S282 to S287 for each layer from layer 1 to layer 3, and further performs steps S283 to S286 for each target node in each layer.

The key information generation unit 107 judges whether a revocation flag "1" is attached to the target node. When a revocation flag "1" is not attached (step S283), the key information generation unit 107 further judges whether encryption has been performed using the device key corresponding to the superordinate node of the target node. When encryption has not been performed (step S284), the key information generation unit 107 obtains the device key corresponding to the target node from the tree structure table (step S285), encrypts the generated media key using the obtained device key, to generate an encrypted media key, and outputs the encrypted media key (step S286).

When a revocation flag "1" is attached to the target node (step S283), or when encryption has been performed (step S284), the key information generation unit 107 does not perform steps S285 to S286.

1.2.8 Operations for Specifying Key Information

Figure 17:
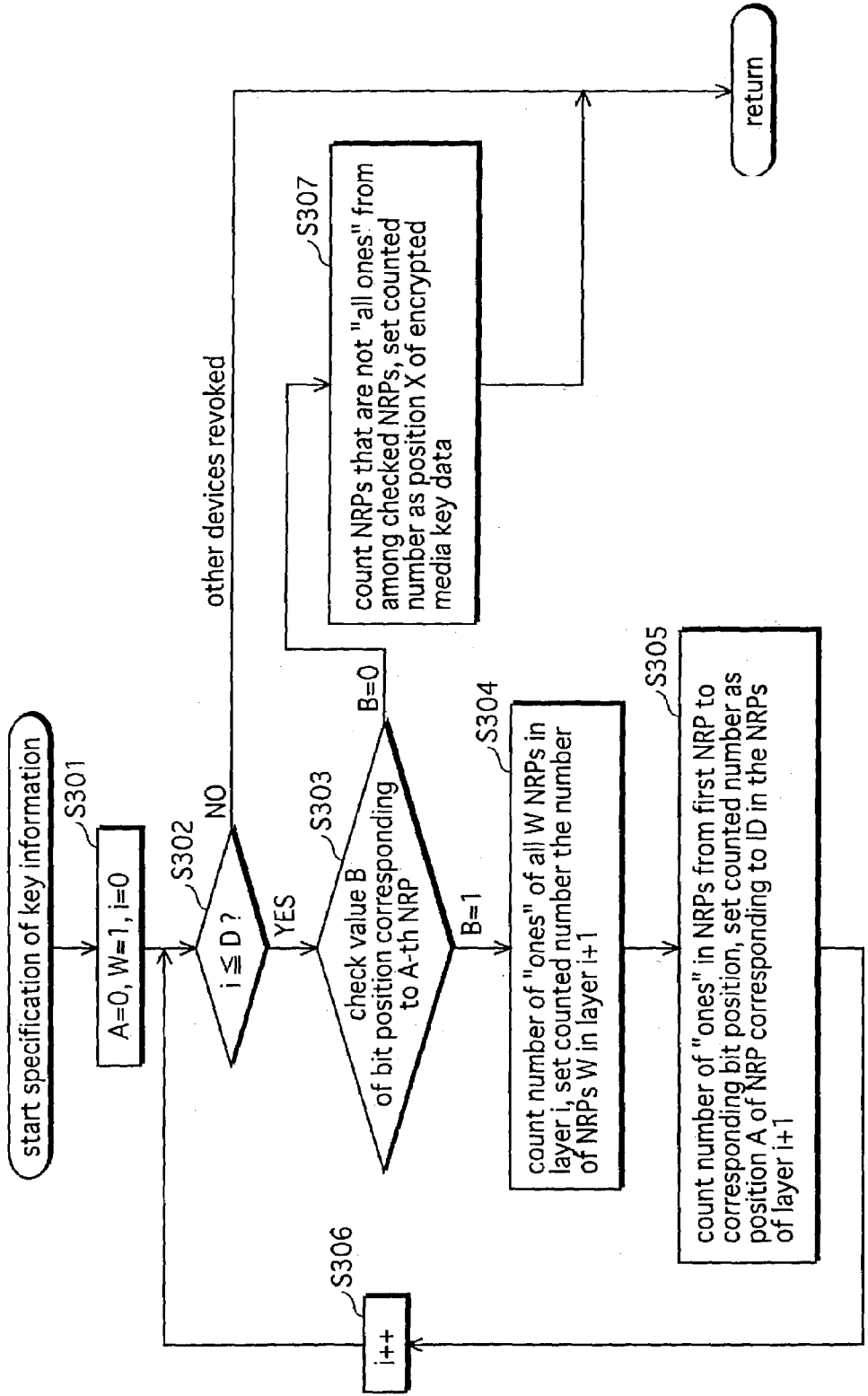
FIG. 17 is a flowchart showing operations by a specification unit 303 in the recording apparatus 300a for designating one encrypted media key from amongst key information stored in the recording medium 500b.

Here, the flowchart in FIG. 17 is used to describe operations by the specification unit 303 of the recording apparatus 300a for specifying an encrypted media key from key information stored on the recording medium 500b. Note that the operations described here are the details of step S172 in the flowchart in FIG. 11.

Note also that operations performed by the specification unit 402 of the reproduction apparatus 400a are the same as those by the specification unit 303, and therefore a description thereof is omitted.

The specification unit 303 has a variable X that shows the position of the encrypted media key, a variable A that shows the position of the NRP relating to the user apparatus itself, a variable W that shows the number of NRPs in a layer, and a value D that shows the number of layers in the tree structure. Here, an NRP relating to the user apparatus itself denotes an NRP of a node in the tree structure that is on the path from the leaf assigned to the user apparatus through to the root.

The specification unit 303 analyzes the layer i=0 through to the layer i=D−1 according to the following procedure.

The specification unit 303 sets variable A=0, variable W=1, and variable i=0 as initial values (step S301).

The specification unit 303 compares the variable i and the value D, and when the variable i is greater than the value D (step S302) the user apparatus is a revoked apparatus, therefore the specification unit 303 ends the processing.

When the variable i is less than or equal to the value D (step S302), the specification unit 303 checks whether a value B that is in the bit position corresponding to the value of the highest i-th bit of the ID information is "0" or "1", to determine which of the left bit and the right bit of the NRP the value B corresponds to (step S303) Here, since, as shown in FIG. 4, "0" is assigned to the left path in the tree structure and "1" is assigned to the right path, and the ID information is composed based on this rule, a value "0" of the highest i-th bit of the ID information corresponds to the left bit of the A-th NRP, while a value "1" of the right bit corresponds to the A-th NRP.

When value B=0 (step S303), the specification unit 303 counts the number of NRPS, from amongst the NRPs checked so far, whose bits do not all have the value "1", and sets the counted value as the variable X. The variable X obtained in this way shows the position of the encrypted media key. Furthermore, the variable i at this point is the device key identification information for identifying the device key (step S307). The specification unit 303 then ends the processing.

When value B=1 (step S303), the specification unit 303 counts the number of "ones" in all W NRPs in layer i, and sets the counted value in the variable W. The variable W obtained in this way shows the number of NRPs in the next layer i+1 (step S304).

Next, the specification unit 303 counts the number of "ones" starting from the first NRP in layer i through to the NRP of the corresponding bit position, and sets the counted value in the variable A. Here, the value of the corresponding bit position is not counted. The variable A obtained in this way shows the position of the NRP, from amongst the NRPs in the next layer i+1, relating to the user apparatus itself (step S305).

Next, the specification unit 303 calculates the variable i=i+1 (step S306), moves the control to step S302, and repeats the above-described processing.

1.2.9 Specific Example of Operations for Specifying Key Information

The following describes one specific example of operations by the non-revoked user apparatus 14 shown in FIG. 5 until specifying an encrypted media key with use of the header information and the key information shown in FIGS. 6 and 7. Here it is supposed that the user apparatus 14 has been assigned ID information "1101", and device keys "KeyA", "KeyC", "KeyG", "KeyN" and "IK14".

<Step 1> Since the value of the top bit of the ID information "1101" assigned to the user apparatus 14 is "1", the specification unit 303 checks the right bit of the first NRP {11} (step S303).

<Step 2> Since the value of right bit of the first NRP {11} is "1", the specification unit 303 continues analyzing (step S303, B=1).

<Step 3> The specification unit 303 counts the number of "ones" in the NRP {11} in layer 0. Since the counted value is "2", the specification unit 303 knows that there are two NRPs in the next layer 1 (step S304).

<Step 4> The specification unit 303 counts the number of "ones" in the NRPs up to the corresponding bit position. Note that the value of the corresponding bit position is not counted. Since the counted value is "1", the NRP corresponding to the next layer 1 is in position 1 in layer 1 (step S305).

<Step 5> Next, since the value of the second bit from the top of the ID information "1101" is "1", the specification unit 303 checks the right bit of the first NRP {10} in layer 1 (step S303).

<Step 6> Here, since the value of the right bit of the first NRP {10} in layer 1 is "0", the specification unit 303 ends analyzing (step S303, B=0).

<Step 7> The specification unit 303 counts the number of NRPs whose bits do not all have the value "1", from amongst the NRPs analyzed so far. Note that the NRP that was checked last is not counted. Since the counted value is "1", the encrypted media key is in position 1 in the key information (step S307).

<Step 8> As shown in FIG. 7, the encrypted media key stored in position 1 in the key information is E1 (KeyG, media key).

The user apparatus 14 has the KeyG. Accordingly, the user apparatus 14 is able to obtain the media key by decrypting the encrypted media key using the KeyG.

1.3 Conclusion

As has been described, according to the first embodiment, the plurality of NRPs are arranged in level order in the header information of the key information stored in advance on the recording medium, resulting in key information that is compact in size. Furthermore, the player is able to specify efficiently the encrypted media key to be decrypted.

2. Second Embodiment

Here, a second embodiment is described as a modification of the first embodiment.

Figure 18:
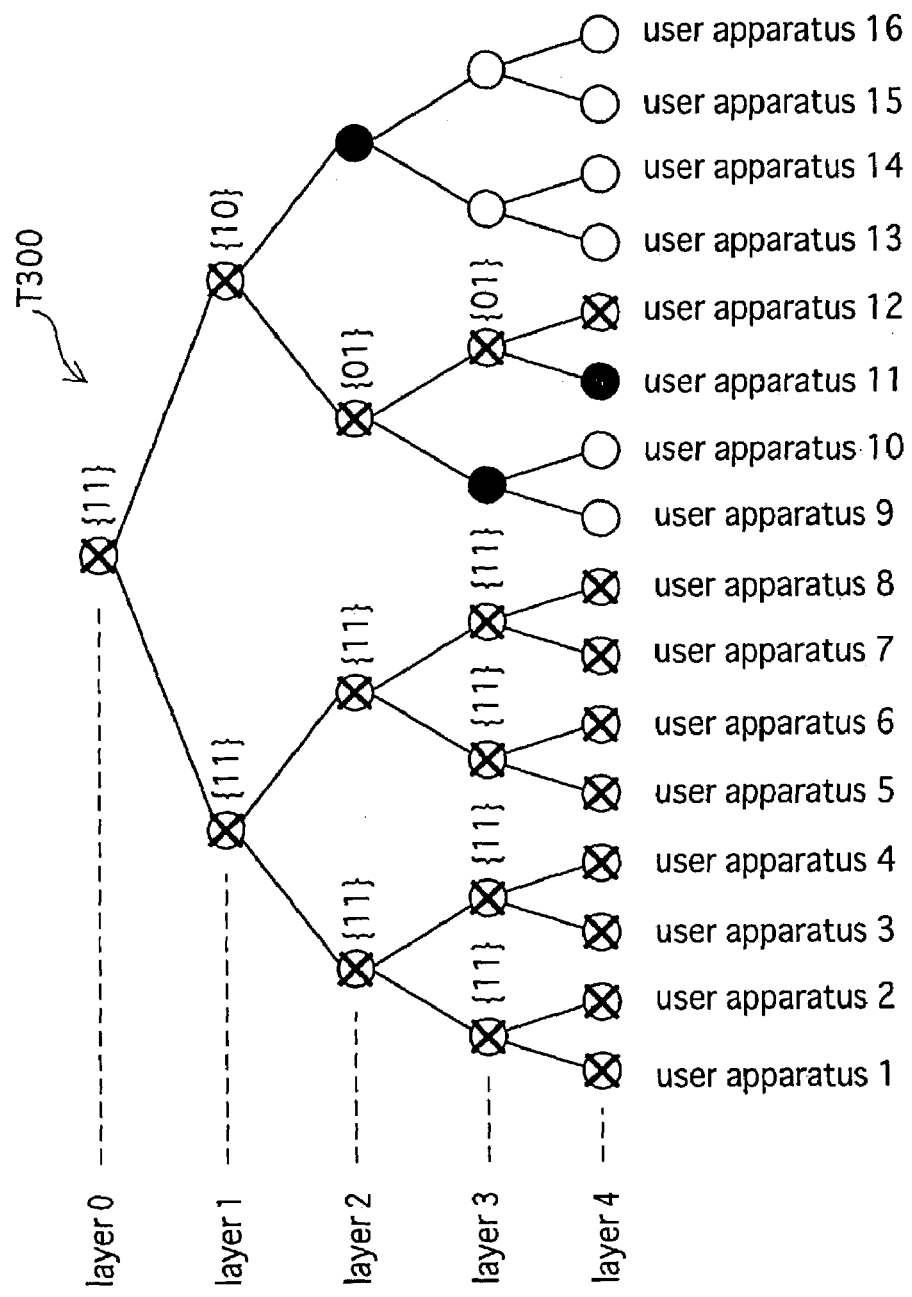
FIG. 18 shows an example of a tree structure in a first embodiment in an example of a case in which there is a possibility that revoked user apparatuses occur one-sidedly around a particular leaf in the tree structure.

In the first embodiment, as shown as one example in FIG. 18, it is possible that revoked user apparatuses occur around a particular leaf in the tree structure. In this case, there are numerous NRPs that are {11} in the header information of the key information that the key management apparatus 100 writes to the recording medium. In the example shown in FIG. 18, the leaves on the left half of a tree structure T300 all correspond to revoked apparatuses, therefore eight of the eleven NRPs included in the header information in the key information are {11}.

In the example shown in FIG. 18, since all the apparatuses on the left side of the tree structure T300 are revoked, it is not necessary to record NRPs that correspond to each of the nodes in the left half as header information if it is expressed that the left node of layer 1 and all its subordinate nodes are revoked nodes.

For this purpose, in the second embodiment a digital work protection system 10b (not illustrated) is able to reduce the data size of the header information in cases in which revoked apparatuses occur one-sidedly around a particular leaf.

Figure 19:
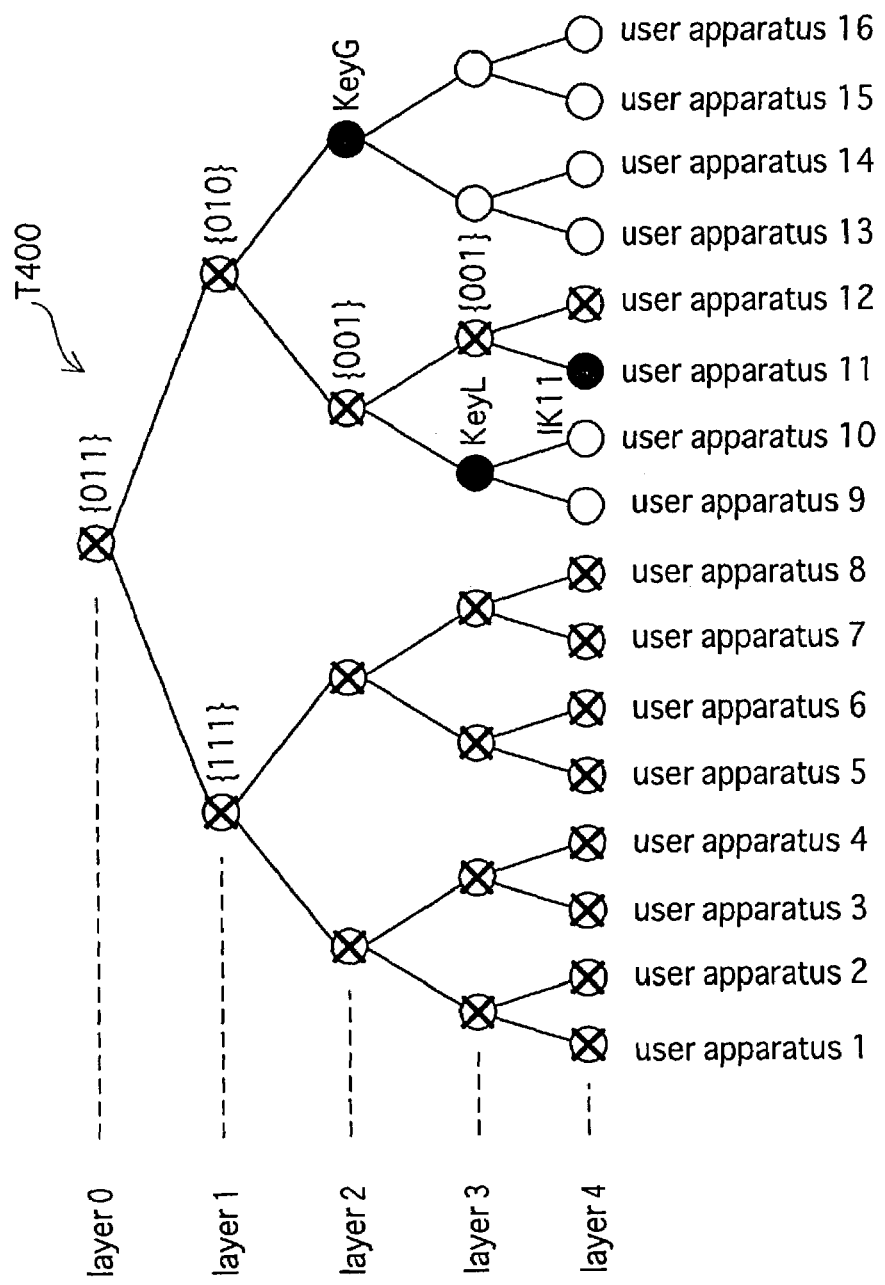
FIG. 19 is a tree structure showing a special NRP in a case in which revoked user apparatuses occur one-sidedly around a specific leaf in the tree structure, in a second embodiment.

The key management apparatus 100 generates NRPs as header information of the key information, as described in the first embodiment. Here, one bit is added to the head of NRPS. An added bit "1" means that all the user apparatuses assigned to the descendant nodes of the particular node are revoked apparatuses. In FIG. 19, not all the apparatuses assigned to the descendant nodes of a node T401 and a node T402 are revoked, therefore the head bit is "0", and the NRPs of the nodes T401 and T402 are expressed as {011} and {010} respectively. Since all the apparatuses assigned to the descendant nodes of a node T403 are revoked, the NRP for the node T403 is expressed as {111}. The key management apparatus 100 does not write any NRPs about the descendant nodes of the node T403 to the recording medium.

2.1 Structure of the Digital Work Protection System 10b

The digital work protection system 10b has a similar structure to the digital work protection system 10. Here the features of the digital work protection system 10b that differ from the digital work protection system 10 are described.

In the second embodiment, as shown in FIG. 19, user apparatuses 1 to 8 and user apparatus 12 are revoked.

2.1.1 Key Management Apparatus 100

The key management apparatus 100 of the digital work protection system 10b has a similar structure to that described in the first embodiment. Here the features of the key management apparatus 100 in the second embodiment that differ from the key management apparatus 100 in the first embodiment are described.

(1) Tree Structure Storage Unit 102

The tree structure storage unit 102 has, as one example, a tree structure table D400 shown in FIG. 20 instead of the tree structure table D100.

The tree structure table D400 corresponds to a tree structure T400 shown in FIG. 19 as one example, and is a data structure for expressing the tree structure T400.

The tree structure table D400 includes a number of pieces of node information that is equal to the number of nodes in the tree structure T400. The pieces of node information correspond respectively to the nodes in the tree structure T400.

Each piece of node information includes a node name, a device key, a revocation flag and an NRP.

The node names, device keys and revocation flags are as described in the first embodiment, therefore descriptions thereof are omitted here.

The NRP is composed of three bits. The highest bit shows, as described above, that all the user apparatuses assigned to the descendant nodes shown by the corresponding node name are revoked apparatuses. The content of the lower two bits is the same as the NRPs described in the first embodiment.

(2) Key Information Header Generation Unit 106

When the head bit of the NRP is "1", the key information header generation unit 106 generates an NRP that shows that all the user apparatuses assigned to the descendant nodes of the node are revoked apparatuses, and outputs the generated NRP to the key information recording apparatus 200. Note that generation of the NRP is described in detail later.

The key information header generation unit 106 generates, as one example, header information D500 shown in FIG. 21. The header information D500 is composed of NRPs {011}, {111}, {010}, {001} and ∴001}, which are included in the header information D500 in the stated order. Furthermore, as shown in FIG. 21, the NRPs {011}, {111}, {010}, {001} and {001} are arranged respectively in positions defined by "0", "1", "2", "3" and "4".

(3) Key Information Generation Unit 107

Figure 22:
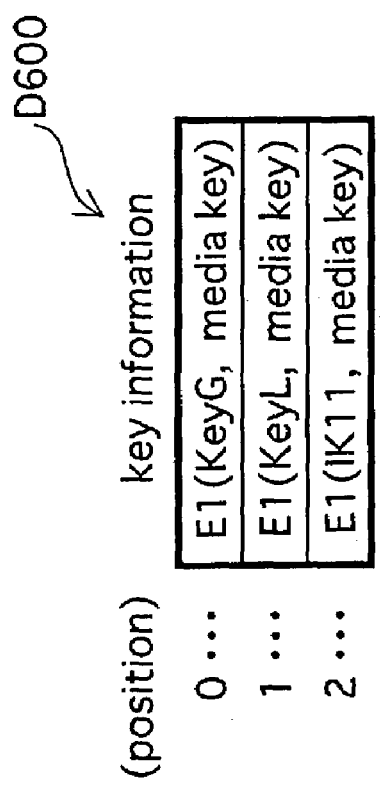
FIG. 22 shows an example of the data structure of key information D600.
Figure 23:
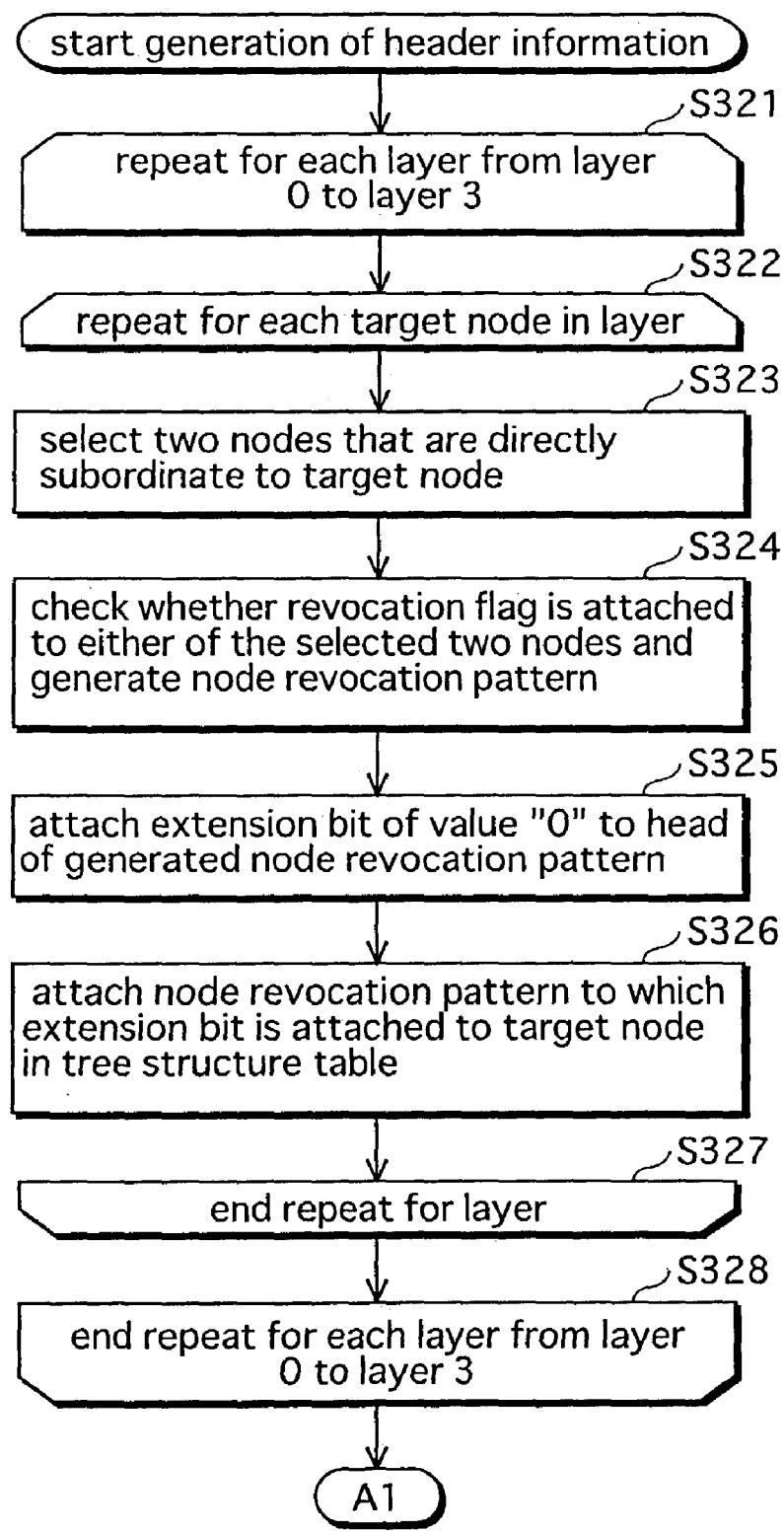
FIG. 23 is a flowchart, which continues in FIG. 24, showing operations by the key information header generation unit 106 for generating header information.
Figure 24:
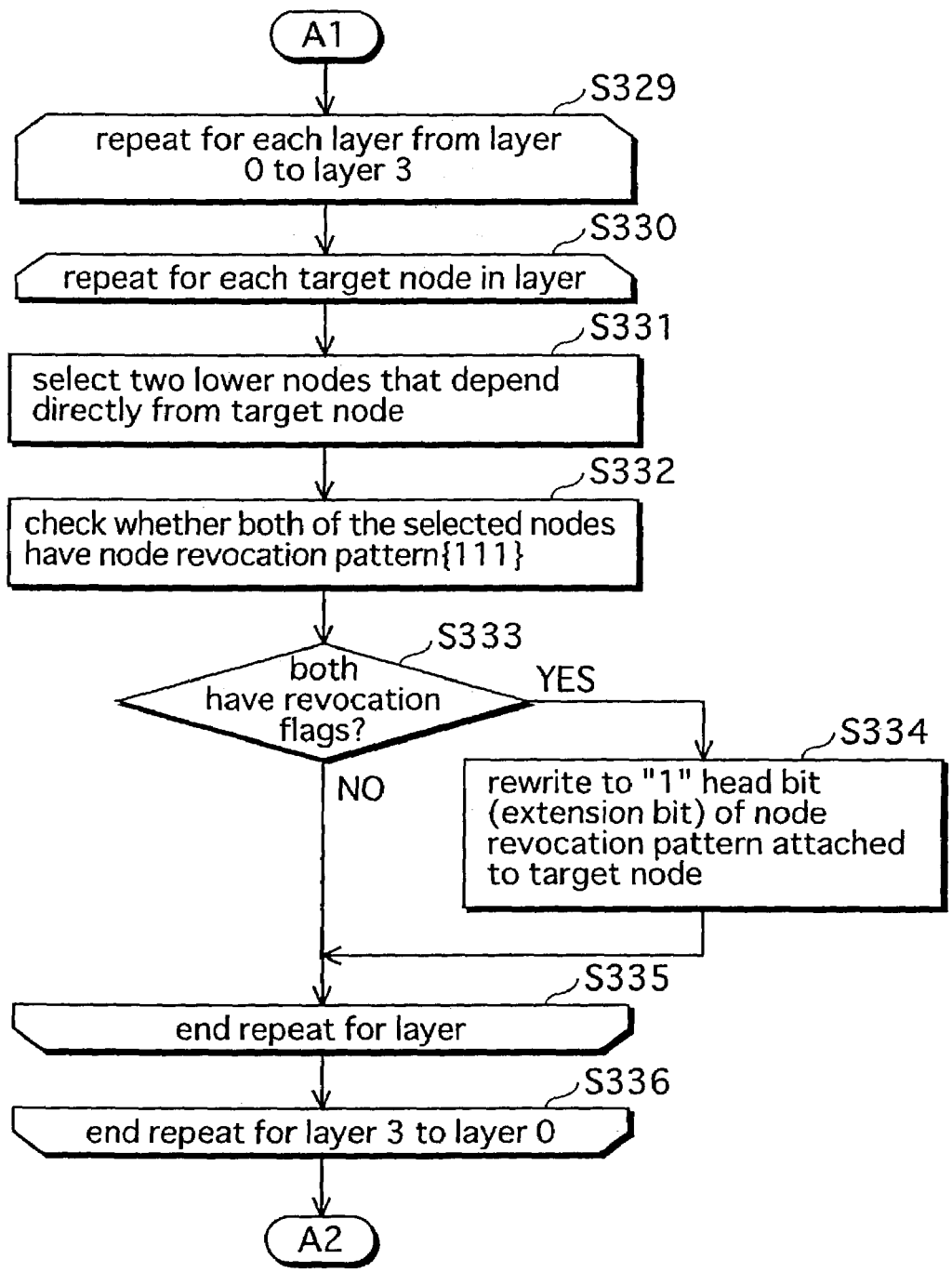
FIG. 24 is a flowchart, which continues in FIG. 25, showing operations by the key information header generation unit 106 for generating header information.
Figure 25:
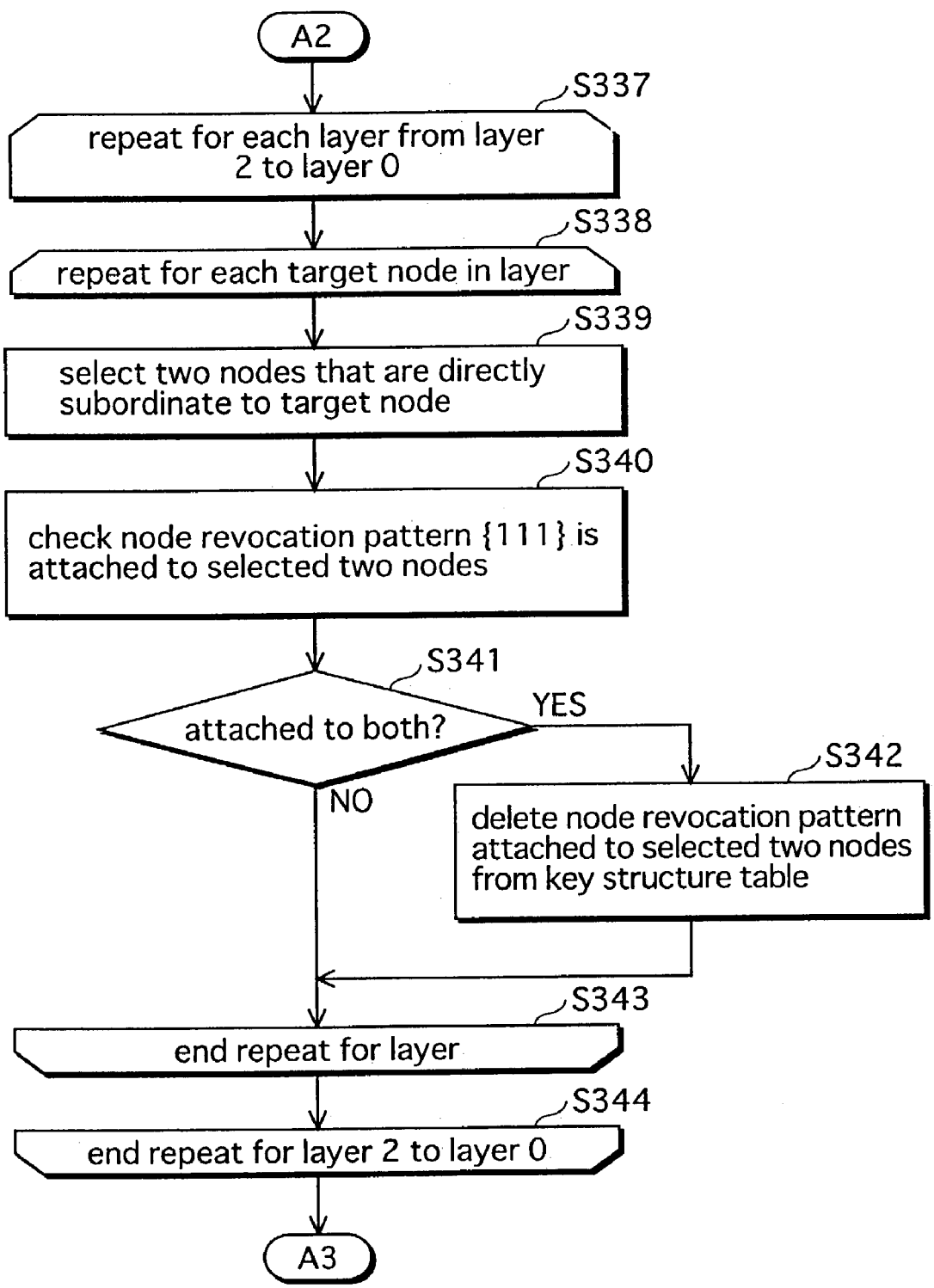
FIG. 25 is a flowchart, which continues in FIG. 26, showing operations by the key information header generation unit 106 for generating header information.
Figure 26:
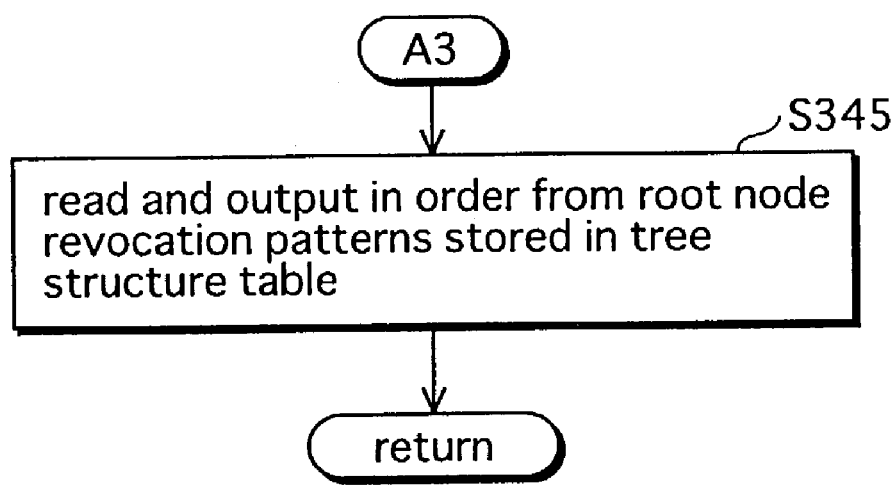
FIG. 26 is a flowchart, which continues from FIG. 25, showing operations by the key information header generation unit 106 for generating header information.

The key information generation unit 107 generates, as one example, key information D600 shown in FIG. 22. The key information D600 includes three encrypted media keys. The encrypted media keys are generated by encrypting the media key with use of device keys KeyG, KeyL, and IK11 respectively.

The position in which each of the plurality of encrypted media keys is stored in the key information D600 is set. As shown in FIG. 22, the encrypted media keys E1 (Key G, media key), E1 (Key L, media key) and E1 (IK11, media key) are arranged respectively in positions defined by "0", "1" and "2" in the key information D600.

2.1.2 Recording Apparatus 300a

The recording apparatus 300a has a similar structure to the recording apparatus 300 described in the first embodiment. Here, the features of the recording apparatus 300a that differ from the recording apparatus 300 are described.

(1) Specification Unit 303

The specification unit 303 specifies the position X of one encrypted media key in the key information by checking the pieces of header information sequentially from the top, with use of the read ID information and the read header information. Note that details of the operations for specifying the position X of the encrypted media key are described later.

2.2 Operations of the Digital Work Protection System 10b

The following description focuses on the features of the operations of the digital work protection system 10b that differ from the digital work protection system 10.

2.1.1 Operations for Generating Header Information

Here, the flowcharts shown in FIG. 23 to FIG. 26 are used to describe operations by the key information header generation unit 106 for generating header information. Note that the operations described here are details of step S153 in the flowchart in FIG. 11.

The key information header generation unit 106 performs steps S322 to S327 for each layer from layer 0 to layer 3, and further performs steps S323 to S326 for each target node in each layer.

The key information header generation unit 106 selects the two directly subordinate nodes of the target node (step S323), checks whether each of the two selected nodes had a revocation flag attached thereto or not, to generate an NRP (step S324), attaches an extension bit having a value "0" to the head of the generated NRP (step S325), and attaches the NRP to which the extension bit has been attached to the node information that corresponds to the target node in the tree structure table (step S326).

In this way, after repetition of steps S321 to S328 has ended, an NRP is attached to each piece of node information in the same way as described in the first embodiment. Here, a value "0" (one bit) is attached to the head of each NRP.

Next, the key information header generation unit 106 performs steps S330 to S335 for each layer from layer 3 to layer 0, and further performs steps S331 to S334 for each target node in each layer.

The key information header generation unit 106 selects the two nodes that are directly below and connected to the target node (step S331), and checks whether each of the two selected nodes has a revocation flag {111} attached thereto or not. When the two selected nodes are leaves, the key information header generation unit 106 checks whether a revocation flag is attached to both the selected nodes (step S332).

Only when both the selected subordinate nodes have NRPs {111} attached thereto, or in the case of the two selected nodes being leaves only when the both of the two selected subordinate nodes have a revocation flag attached thereto (step S333), the key information header generation unit 106 rewrites the head bit of the NRP attached to the target node to "1" (step S334).

In this way, after the key information header generation unit 106 has finished repeating the steps S329 to S336, {111} is attached to the superordinate node of the two subordinate nodes having the NRP {111}.

Next, the key information header generation unit 106 performs steps S338 to S343 for each layer from layer 2 to layer 0, and further performs steps S339 to S342 for each target node in each layer.

The key information header generation unit 106 selects the two directly subordinate nodes of the target node (step S339), and checks whether each of the two selected nodes have a revocation pattern {111} attached thereto or not (step S340).

Only when both the selected lower nodes have revocation patterns {111} attached thereto (step S341), the key information header generation unit 106 deletes the respective NRPs attached to the selected two lower nodes from the tree structure table (step S342).

Next, the key information header generation unit 106 reads and outputs the NRPs stored in the tree structure table in order (step S345).

In this way, when the head bit of an NRP is "1", an NRP is generated that shows that all the user apparatuses assigned to the descendant nodes of the node are revoked apparatuses.

2.2.2 Operations for Specifying Key Information

Figure 27:
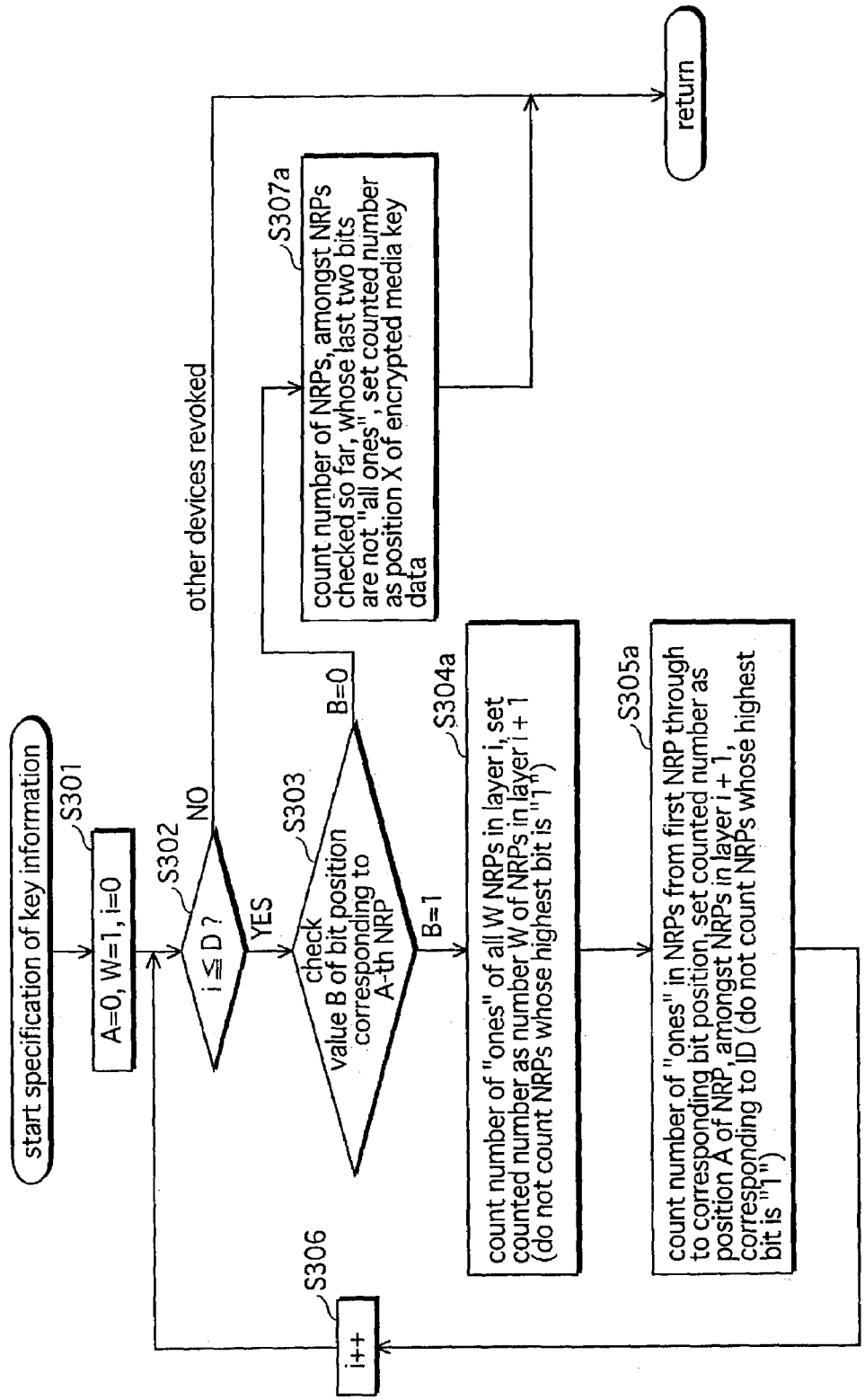
FIG. 27 is a flowchart showing operations by the specification unit 303 in the recording apparatus 300a for designating one encrypted media key from amongst key information stored in the recording medium 500b.

Here, the flowchart shown in FIG. 27 is used to describe operations by the specification unit 303 in the recording apparatus 300a for specifying one encrypted media key from the key information stored on the recording medium 500b. Note that the operations described here are the details of step S172 in the flowchart shown in FIG. 11.

Note that the operations by the specification unit 303 for specifying an encrypted media key are similar to those described in the first embodiment, therefore following description centers on the features of the specification unit 303 that differ to that of the first embodiment.

When value B=0 (step S303), the specification unit 303 counts the number of NRPs, amongst the NRPs checked so far, whose lower two bits do not all have the value "1", and sets the counted value in the variable X. The variable X obtained in this way shows the position of the encrypted media key (step S307a). The specification unit 303 then ends the processing.

When value B=1 (step S303), the specification unit 303 counts all the "ones" in the W NRPs in the layer i. However, NRPs whose highest bit is "1" are not counted. The counted value is set in the variable W. The variable W obtained in this manner shows the number of NRPs in the next layer i+1 (step S304a).

Next, the specification unit 303 counts the number of "ones" starting from the first NRP through to the NRP of the corresponding bit position, and sets the counted value in the variable A. Here, the value of the corresponding bit position is not counted. The variable A obtained in this way shows the position of the NRP, from amongst the NRPs in the next layer i+1, relating to the user apparatus itself (step S305a).

2.2.3 Specific Example of Pperations for Specifying Key Information

The following describes one specific example of operations by the non-revoked user apparatus 10 shown in FIG. 19 up to specifying an encrypted media key with use of the header information and the key information shown in FIGS. 21 and 22. Here it is supposed that the user apparatus 10 has been assigned ID information "1001", and device keys "KeyA", "KeyC", "KeyF", "KeyL" and "IK10".

<Step 1> Since the value of the top bit of the ID information "1001" assigned to the user apparatus 10 is "1", the specification unit 303 checks the right bit of the two lower bits of the first NRP {011} (step S303).

<Step 2> Since the value of right bit of the two lower bits of the first NRP {011} is "1", the specification unit 303 continues analyzing (step S303, B=1).

<Step 3> The specification unit 303 counts the number of "ones" in the two lower bits of the NRP {011} in layer 0. Since the counted value is "2", the specification unit 303 knows that there are two NRPs in the next layer 1 (step S304a).

<Step 4> The specification unit 303 counts the number of "ones" in two lower bits of the NRP {011} up to the corresponding bit position. Note that the value of the corresponding bit position is not counted. Since the counted value is "1", the NRP corresponding to the next layer 1 is in position 1 in layer 1 (step S305).

<Step 5> Next, since the value of the second bit from the top of the ID information "1001" is "0", the specification unit 303 checks the left bit of the two lower bits of the first NRP {010} in layer 1 (step S303).

<Step 6> Here, since the value of the left bit of the two lower bits of the first NRP {010} in layer 1 is "1", the specification unit 303 continues analyzing (step S303, B=1).

<Step 7> The specification unit 303 counts the number of "ones" in the two lower bits of the two NRPs [111] and {010} in layer 1. Note that NRPs whose highest bit is "1" are not counted. Since the counted value is "1", the specification unit 303 knows that there is one NRP in the next layer 2 (step S304a).

<Step 8> The specification unit 303 counts the number of "ones" in the NRP up to the corresponding bit position. Note that the value of the corresponding bit position is not counted. Since the counted value is "0", the position of the corresponding NRP in the next layer 2 is position 0 in layer 2 (step S305a).

<Step 9> Since the value of third bit of the ID information "1001" is "0", the specification unit 303 checks the left bit of the two lower bits of the 0-th NRP {001} in layer 2 (step S303).

<Step 10> Here, since the value of the left bit of the lower two bits of the 0-th NRP in layer 2 is "0", the specification unit 303 ends analyzing (step S303, B=0).

<Step 11> The specification unit 303 counts the number of NRPs whose bits are not all "1", from amongst the NRPs analyzed so far. Note that the NRP that was last checked is not counted. Since the counted value is "1", the position of the encrypted media key is position 1 in the key information (step S307a).

<Step 12> As shown in FIG. 22, the encrypted media key stored in position 1 in the key information is E1 (KeyL, media key).

The user apparatus 10 has the KeyL. Accordingly, the user apparatus 10 is able to obtain the media key by decrypting the encrypted media key using the KeyL.

Note that in the above-described second embodiment, when all the user apparatuses of descendant nodes of a particular node are revoked, the bit that is added is "1". However, in the case of a tree structure in which the layer number of the leaves vary, the added bit "1" may also be used as a flag to show the terminal.

3. Third Embodiment

In the second embodiment a method was shown that further reduces the size of the header information when revoked terminals occur one-sidedly around a particular leaf, by adding a bit to the head of the NRP of a node to show that the descendants are all revoked terminals.

In the third embodiment, instead of adding a bit to the NRP, an NRP having a specific pattern {00} is used to judge whether all the descendants of a node are revoked terminals. {00} is used here because it is not otherwise used in any of the layers except for the layer 0. The following describes a digital work protection system 10c (not illustrated) that is accordingly able to further reduce the size of header information compared to the second embodiment.

Figure 28:
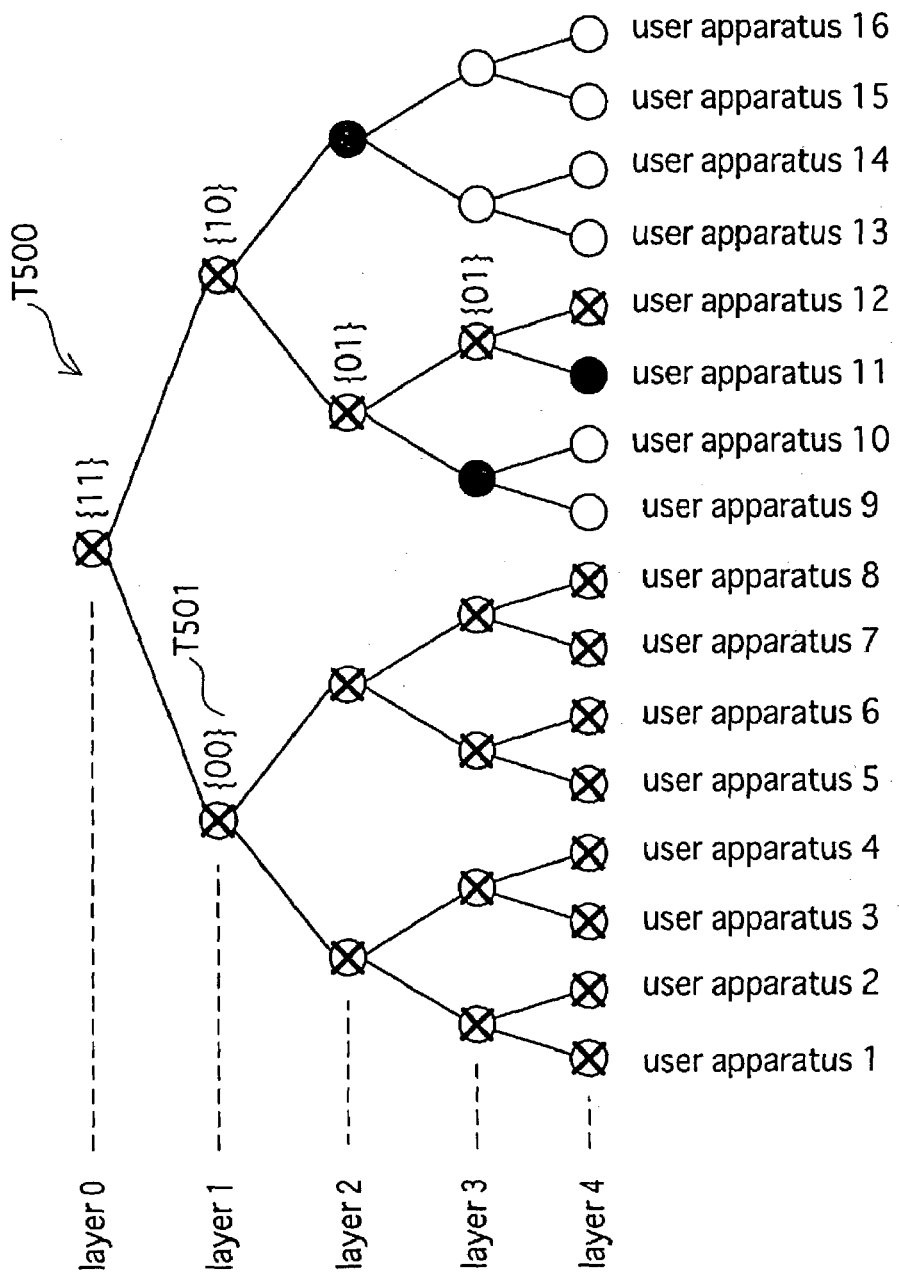
FIG. 28 is a tree structure showing a special NRP, in a third embodiment.

Here, as shown in FIG. 28, user apparatus 1 to user apparatus 8, and user apparatus 12 are revoked. In the third embodiment the NRPs are as shown in the first embodiment, but when all the user apparatuses of descendants of a particular node are revoked apparatuses, the NRP of the node is expressed as {00}. Since the descendants of a node T501 in FIG. 28 are all revoked apparatuses, the NRP of the node T501 is expressed as {00}.

3.1 Structure of Digital Work Protection System 10c

The digital work protection system 10c has a similar structure to the digital work protection system 10. Here, the features of the digital work protection system 10c that differ to the digital work protection system 10 are described.

3.1.1 Key Management Apparatus 100

The key management apparatus 100 of the digital work protection system 10c has a similar structure to the key management apparatus 100 described in the first embodiment. Here the features of the key management apparatus 100 in the third embodiment that differ from the key management apparatus 100 in the first embodiment are described.

(1) Key Information Header Generation Unit 106

When the NRP is {00}, the key information header generation unit 106 generates an NRP that shows that all the user apparatuses assigned to the descendant nodes of the node are revoked apparatuses, and outputs the generated NRP to the key information recording apparatus 200. Note that the generated NRP is described in detail later.

The key information header generation unit 106 generates, as one example, header information D700 shown in FIG. 29. The header information D700 is composed of NRPs {11}, {00}, {10}, {01}, and {01}, which are included in the header information D700 in the stated order. Furthermore, as shown in FIG. 29, the NRPs {11}, {00}, {10}, {01} and {01} are positioned respectively in positions defined by "0", "1", "2", "3" and "4".

(2) Key Information Generation Unit 107

Figure 30:
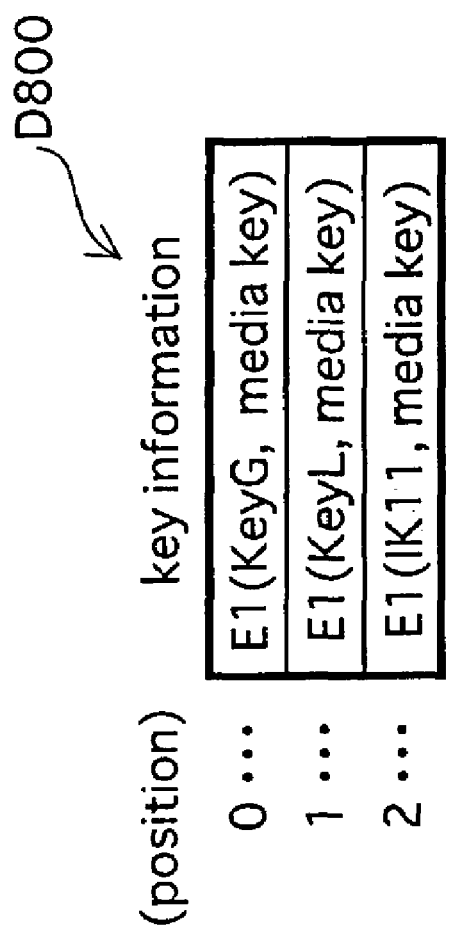
FIG. 30 shows an example of the data structure of key information D800.
Figure 31:
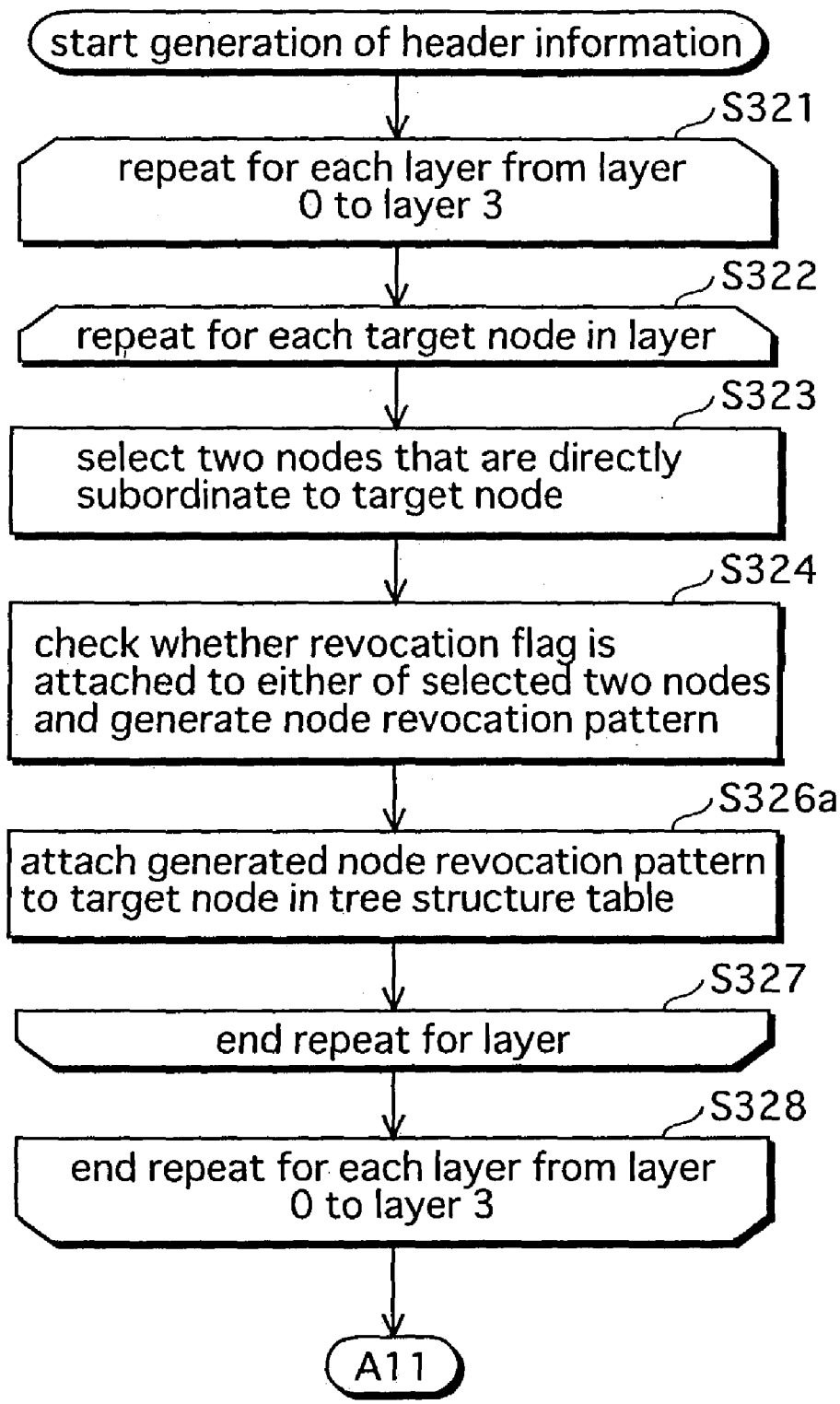
FIG. 31 is a flowchart, which continues in FIG. 32, of operations for generating header information.
Figure 32:
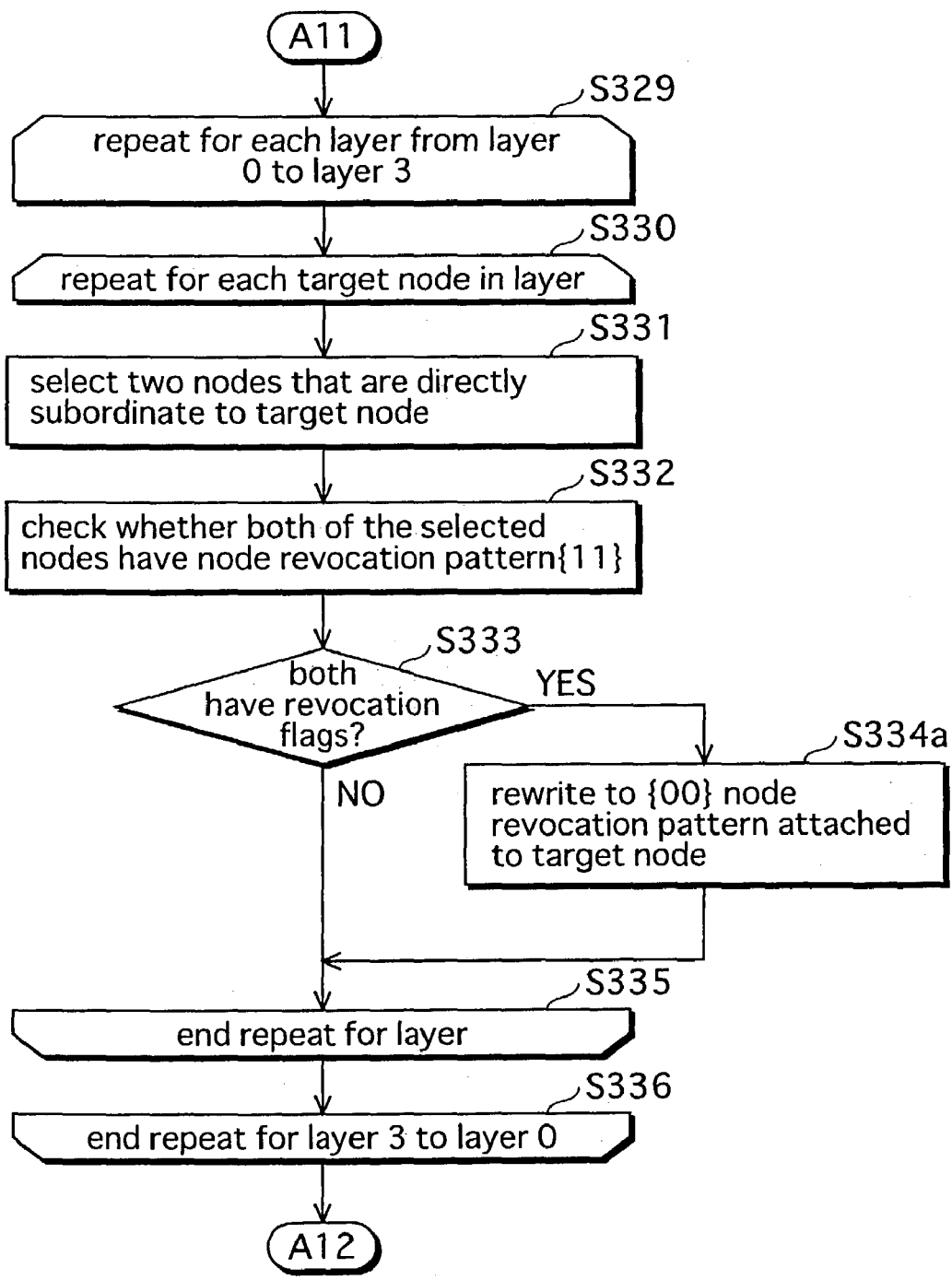
FIG. 32 is a flowchart, which continues in FIG. 33, of operations for generating header information.
Figure 33:
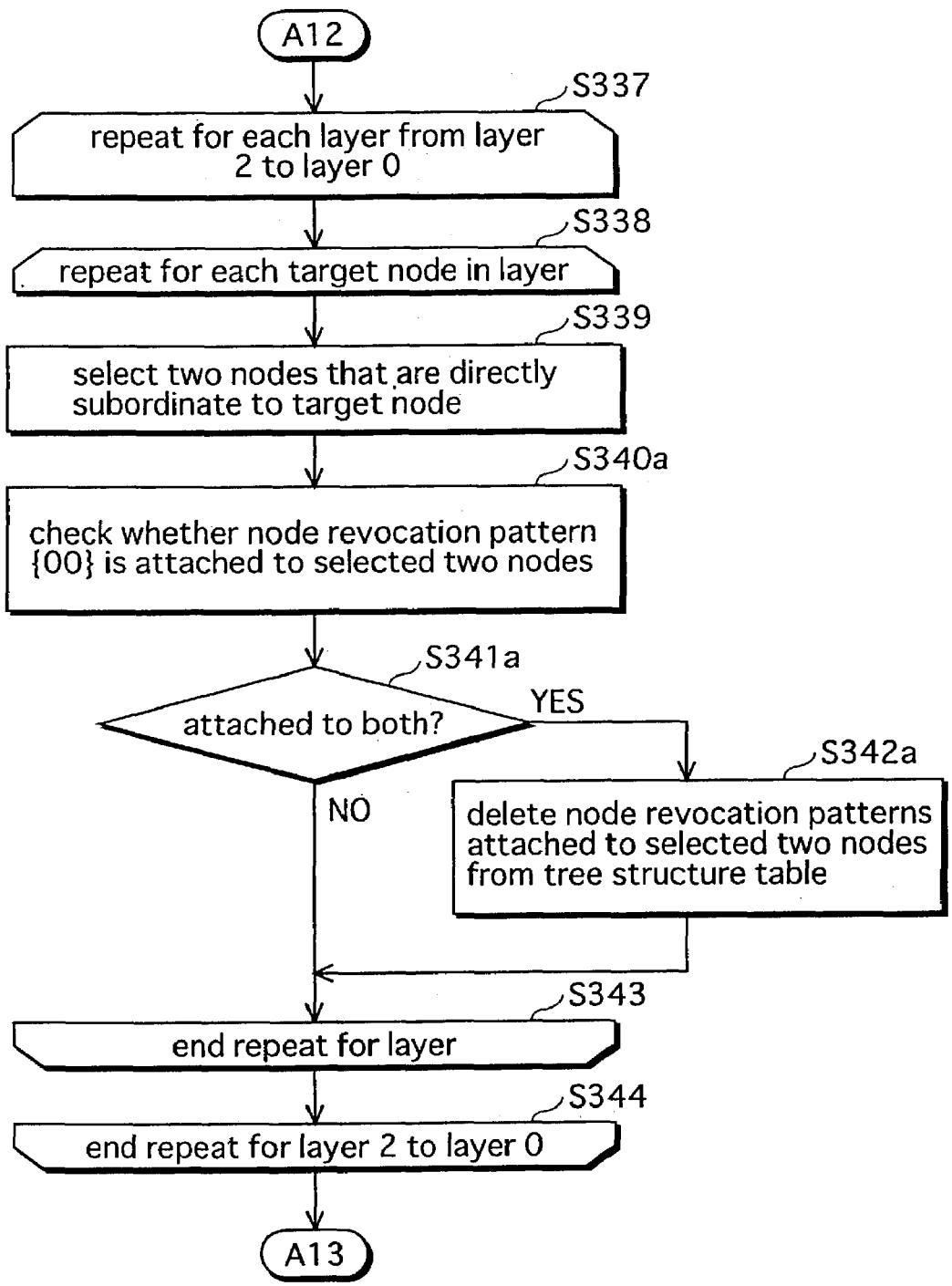
FIG. 33 is a flowchart, which continues in FIG. 34, of operations for generating header information.
Figure 34:
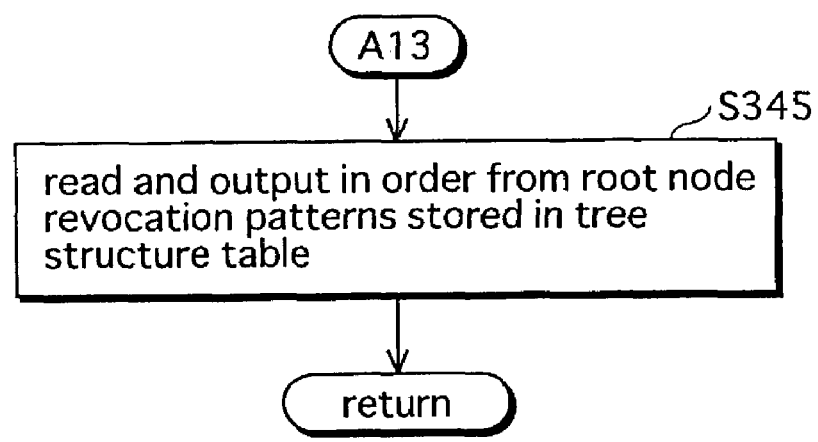
FIG. 34 is a flowchart, which continues from FIG. 33, of operations for generating header information.

The key information generation unit 107 generates, as one example, key information D800 shown in FIG. 30. The key information D800 includes three encrypted media keys. The encrypted media keys are generated by encrypting the media key with use of device keys KeyG, KeyL, and IK11 respectively.

The position in which each of the plurality of encrypted media keys is stored in the key information D800 is set. As shown in FIG. 30, the encrypted media keys E1 (Key G, media key), E1 (Key L, media key) and E1 (IK11, media key) are arranged respectively in positions defined by "0", "1" and "2" in the key information D800.

3.1.2 Recording Apparatus 300a

The recording apparatus 300a in the digital work protection system 10c has a similar structure to the recording apparatus 300 described in the first embodiment. Here, the features of the recording apparatus 300a that differ from the recording apparatus 300 are described.

(1) Specification Unit 303

The specification unit 303 specifies the position X of one encrypted media key in the key information, by checking the pieces of header information sequentially from the top, with use of the ID information and the header information. Note that details of the operations for specifying the position X of the encrypted media key are described later.

3.2 Operations of the Digital Work Protection System 10c

The following description focuses on the features of the operations of the digital work protection system 10c that differ from the digital work protection system 10.

3.2.1 Operations for Generating Header Information

Here, the flowcharts shown in FIG. 31 to FIG. 34 are used to describe operations by the key information header generation unit 106 for generating header information. Note that the operations described here are details of step S153 in the flowchart in FIG. 11.

The key information header generation unit 106 performs steps S322 to S327 for each layer from layer 0 to layer 3, and further performs steps S323 to S326a for each target node in each layer.

The key information header generation unit 106 selects the two directly subordinate nodes of the target node (step S323), checks whether each of the two selected nodes has a revocation flag attached thereto or not, to generate an NRP (step S324), and attaches the NRP to which the extension bit has been attached to the node information in the tree structure table that corresponds to the target node (step S326a).

In this way, after repetition of steps S321 to S328 has ended, an NRP has been attached to each piece of node information in the same way as described in the first embodiment.

Next, the key information header generation unit 106 performs steps S330 to S335 for each layer from layer 3 to layer 0, and further performs steps S331 to S334a for each target node in each layer.

The key information header generation unit 106 selects the two subordinate nodes of the target node (step S331), and checks whether each of the two selected nodes has an NRP {11} attached thereto or not. Note that when the selected two nodes are leaves, the key information header generation unit 106 checks whether both the selected nodes have revocation flags attached thereto (step S332). Only when both the selected subordinate nodes have NRPs {11} attached thereto, or in the case of the two selected subordinate nodes being leaves, only when both the selected subordinate nodes have revocation flags attached thereto (step S333), the key information header generation unit 106 rewrites the NRP attached to the target node to {00} (step S334a).

When the key information header generation unit 106 has finished repeating the steps S329 to S336 in this way, {00} is attached to the superordinate node of the two subordinate nodes having NRPs {11}.

Next, the key information header generation unit 106 performs steps S338 to S343 for each layer from layer 2 to layer 0, and further performs steps S339 to S342a for each target node in each layer.

The key information header generation unit 106 selects the two subordinate nodes of the target node (step S339), and checks whether each of the two selected nodes have a revocation pattern {00} attached thereto or not (step S340a).

Only when both the selected subordinate nodes have revocation patterns {00} attached thereto (step S341a) the key information header generation unit 106 deletes the respective NRPs attached to the selected two subordinate nodes from the tree structure table (step S342a).

Next, the key information header generation unit 106 reads and outputs the NRPs stored in the tree structure table in order (step S345).

In this way, when an NRP is {00}, an NRP is generated that shows that all the user apparatuses assigned to the descendant nodes of the node are revoked apparatuses.

3.2.2 Operations for Specifying Key Information

Figure 35:
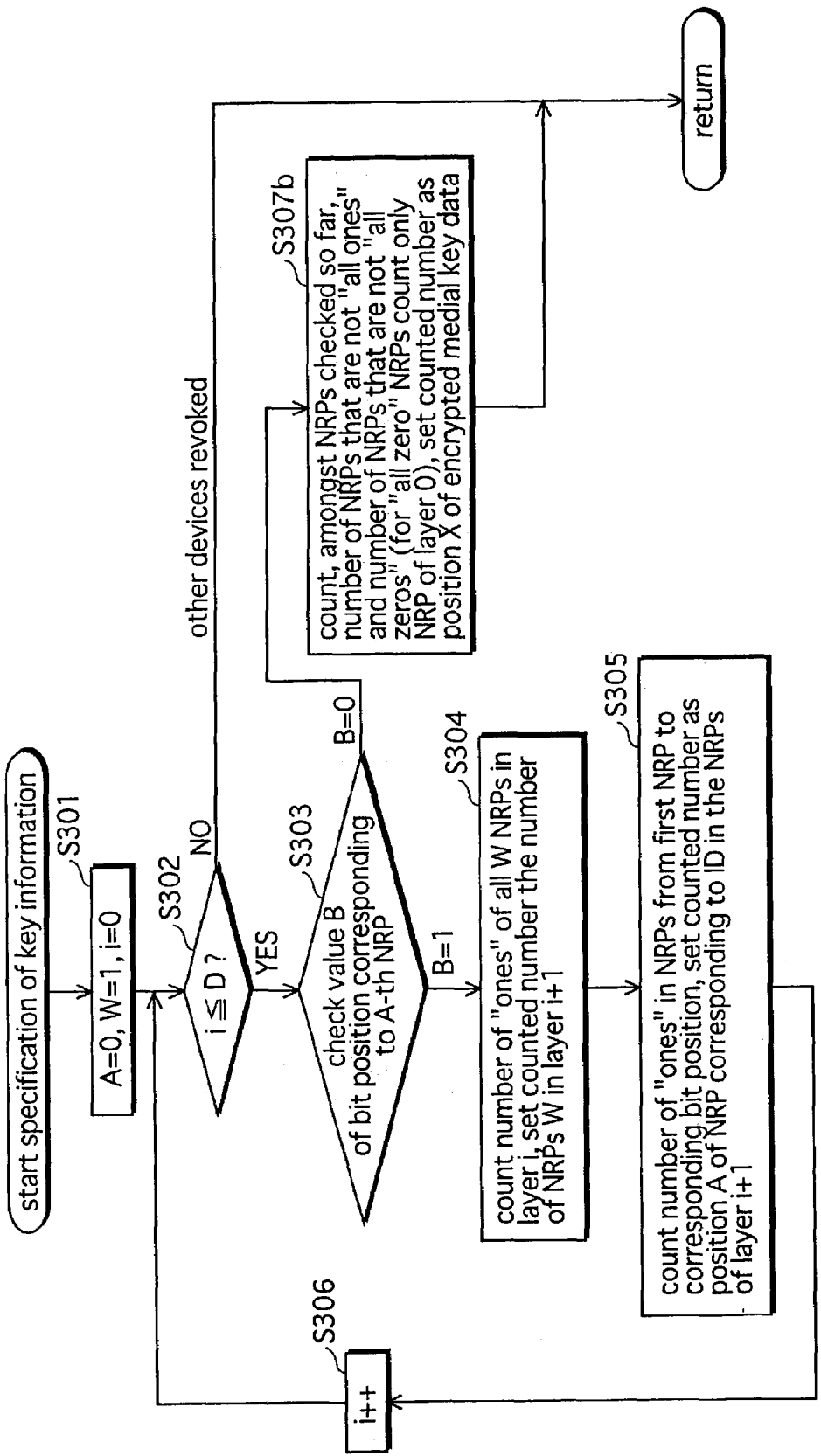
FIG. 35 is a flowchart showing operations by the specification unit 303 in the recording apparatus 300a for designating one encrypted media key from amongst key information stored in the recording medium 500b.

Here, the flowchart shown in FIG. 35 is used to describe operations by the specification unit 303 in the recording apparatus 300*a* for specifying one encrypted media key from the key information stored on the recording medium 500*b*. Note that the operations described here are the details of step S172 in the flowchart shown in FIG. 11.

Note that the operations by the specification unit 303 for specifying an encrypted media key are similar to those described in the first embodiment, therefore following description centers on the features of the operations that differ to the first embodiment.

When value B=0 (step S303), the specification unit 303 counts the number of NRPs, amongst the NRP checked so far, whose bits so not all have the value "1" and do not all have the value "0". Note that the number of NRPs whose bits are all "0" are counted for layer 0 only. The specification unit 303 sets the counted value in the variable X. The variable X obtained in this way shows the position of the encrypted media key. Furthermore, the variable i at this point is the piece of device key identification information that identifies the device key (step S307*b*). The specification unit 303 then ends the processing.

3.2.3 Specific Example of Operations for Specifying Key Information

The following describes one specific example of operations by the non-revoked user apparatus 10 shown in FIG. 28 up to specifying an encrypted media key with use of the header information and the key information shown in FIGS. 29 and 30. Here it is supposed that the user apparatus 10 has been assigned ID information "1001", and device keys "KeyA", "KeyC", "KeyF", "KeyL" and "IK10".

<Step 1> Since the value of the top bit of the ID information "1001" assigned to the user apparatus 10 is "1", the specification unit 303 checks the right bit of the first NRP {11} (step S303).

<Step 2> Since the value of right bit of the first NRP {11} is "1", the specification unit 303 continues analyzing (step S303, B=1).

<Step 3> The specification unit 303 counts the number of "ones" in the NRP {11} in layer 0. Since the counted value is "2", the specification unit 303 knows that there are two NRPs in the next layer 1 (step S304).

<Step 4> The specification unit 303 counts the number of "ones" in the NRPs up to the corresponding bit position. Note that the value of the corresponding bit position is not counted. Since the counted value is "1", the corresponding NRP in the next layer 1 is in position 1 in layer 1 (step S305).

<Step 5> Next, since the value of the second highest bit of the ID information "1001" is "1", the specification unit 303 checks the right bit of the first NRP {10} in layer 1 (step S303).

<Step 6> Here, since the value of the right bit of the first NRP {10} in layer 1 is "0", the specification unit 303 ends analyzing (step S303, B=1).

<Step 7> The specification unit 303 counts the number of "ones" in the two NRPs in layer 1. Note that the NRP {00} is not counted. Since the counted value is "1", the specification unit 303 knows that there is one NRP in the next layer 2 (step S304).

<Step 8> The specification unit 303 counts the number of "ones" in the NRP up to the corresponding bit position. Note that the value of the corresponding bit position is not counted. Since the counted value is "0", the position of the corresponding NRP in the next layer 2 is position 0 in layer 2 (step S305).

<Step 9> Since the value of third bit of the ID information "1001" is "0", the specification unit 303 checks the left bit of the two lower bits of the NRP {001} in the position 0 in layer 2 (step S303).

<Step 10> Here, since the value of the left bit of the lower two bits of the 0-th NRP {01} in layer 2 is "0", the specification unit 303 ends analyzing (step S303, B=0).

<Step 11> The specification unit 303 counts the number of NRPs whose bits do not all have the value "1", from amongst the NRPs analyzed so far. Note that the NRP that was checked last is not counted. Since the counted value is "1", the position of the encrypted media key is position 1 in the key information.

<Step 12> As shown in FIG. 30, the encrypted media key stored in position 1 in the key information is E1 (KeyL, media key).

The user apparatus 10 has the KeyL. Accordingly, the user apparatus 10 is able to obtain the media key by decrypting the encrypted media key using the KeyL.

4. Fourth Embodiment

In the first embodiment NRPs are arranged in order from the top layer to the bottom layer, and NRPs of the same layer are arranged in order from left to right.

In the fourth embodiment a description is given of a digital work protection system 10*d* (not illustrated) that outputs NRPs in another order.

4.1 Structure of Digital Work Protection System 10*d*

The digital work protection system 10*d* has a similar structure to the digital work protection system 10. Here the features of the digital work protection system 10*d* that differ from the digital work protection system 10 are described.

4.1.1 Key Management Apparatus 100

The key management apparatus 100 of the digital work protection system 10*d* has a similar structure to that described in the first embodiment. Here the features of the key management apparatus 100 in the second embodiment that differ from the key management apparatus 100 in the first embodiment are described.

(1) Tree Structure Storage Unit 102

Specifically, the tree structure storage unit 102 is composed of a hard disk unit, and, as shown in FIG. 37, has a tree structure table D1000 shown in FIG. 37 as one example.

Figure 36:
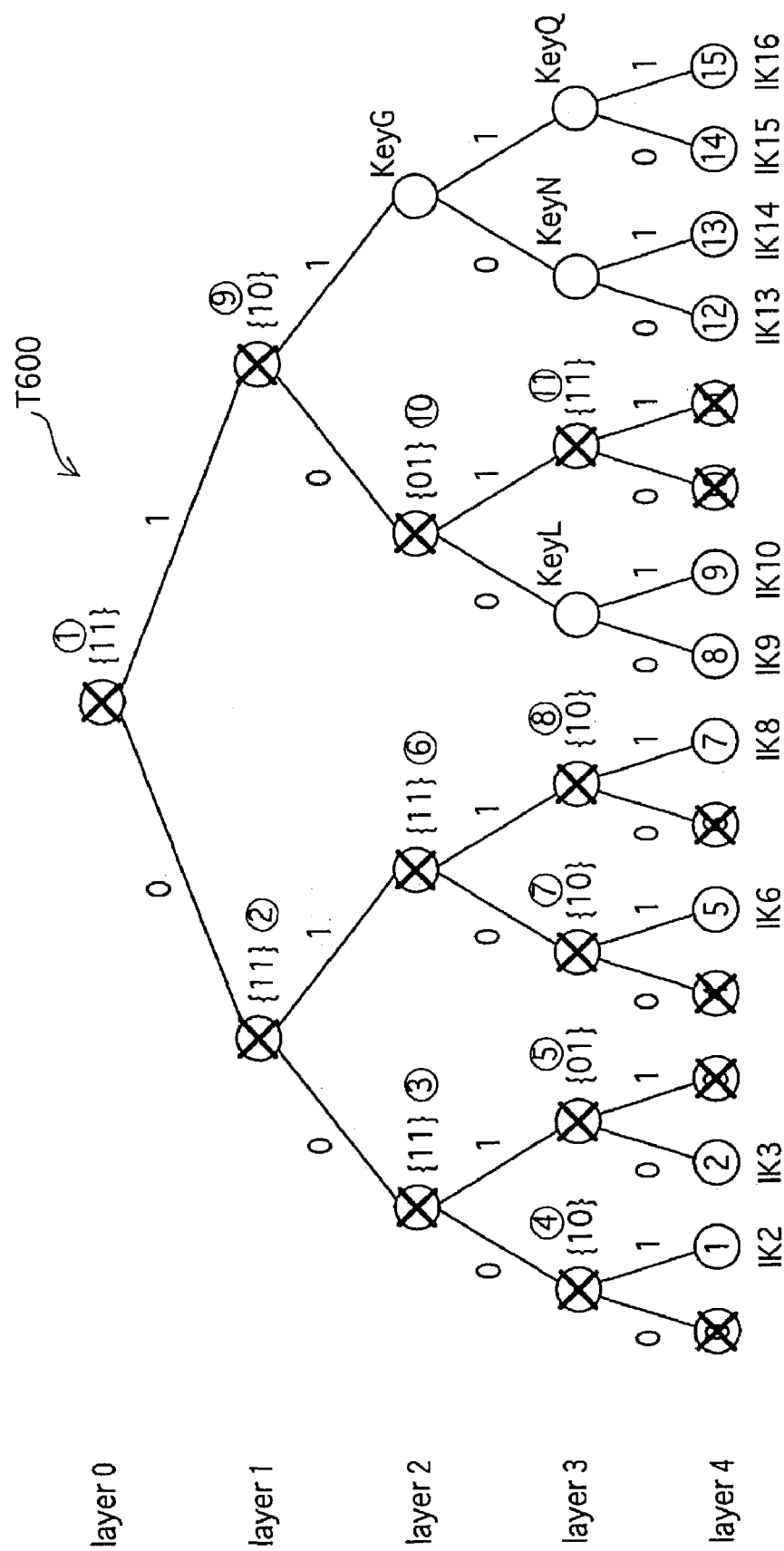
FIG. 36 is a tree structure showing how a plurality of NRPs are arranged in a fourth embodiment.

The tree structure table D1000 corresponds to a tree structure T600 shown in FIG. 36 as one example, and is a data structure for expressing the tree structure T600. As is described later, the data structure for expressing the tree structure T600 is generated by the tree structure construction unit 101 as the tree structure table D1000, and written to the tree structure storage unit 102.

<Tree Structure T600>

The tree structure T600, as shown in FIG. 36, is a binary tree that has five layers: layer 0 through to layer 4.

The number of nodes included in each layer is the same as the tree structure T100. Furthermore, the numbers assigned to the paths from the node on the upper side through to the nodes on the lower side are the same as in the tree structure T100. Nodes marked with a cross (X) are revoked nodes.

The node name of the node that is the root of the tree structure T600 is blank. The node names of the other nodes are the same as in the tree structure T100.

Each node name is a four-digit expression. The node name of the node that is the root is four blanks. A node name "0" is specifically the character "0"+one blank+one blank+one blank. A node name "00" is the character "0"+the character "0"+one blank+one blank. A node name "101" is the character "1"+the character "0"+the character "1"+one blank. The node name "1111" is the character "1"+the character "1"+the character "1"+the character "1". The other node names are formed similarly.

In the tree structure T600, "{10}" and the like near each node show NRPs. Furthermore, numbers in circles near each node show the order in which the NRPs are output.

<Tree Structure Table D1000>

The tree structure table D1000 includes a number of pieces of node information equal to the number of nodes in the tree structure T1000. Each piece of node information corresponds to one of the nodes in the tree structure T1000.

Each piece of node information includes a device key and a revocation flag. Node names, device keys and revocation flags are the same as in the tree structure table D1000, therefore a description thereof is omitted here.

Each piece of node information is stored in the tree structure table D1000 in an order shown by the following Order Rule 2. This Order Rule 2 is applied when node information is read sequentially from the tree structure table D1000 by the recording apparatuses 300*a* etc. and the reproduction apparatuses 400*a* etc.

(a) The piece of node information corresponding to the node that is the root is stored at the top of the tree structure table D1000.

(b) After a piece of node information corresponding to a particular node is stored in the tree structure table D1000, when the node has two subordinate nodes, the node information is arranged in the following manner. Pieces of node information that respectively correspond to each of the left node of the two subordinate nodes and all the further subordinate left nodes on the same path are stored. Then, pieces of node information that respectively correspond to the right node of the two subordinate nodes and all the further right nodes subordinate to the right node are stored.

(c) Within (b), (b) is Re-Applied.

Specifically, the pieces of node information in the tree structure table D1000 shown in FIG. 37 are stored in the following order:

blank (showing the root), "0", "00", "000", "0000", "0001", "001", "0010", "0011", "01", "010", . . . , "11", "110", "1100", "1101", "111", "1110", and "1111".

(2) Tree Structure Construction Unit 101

The tree structure construction unit 101, as described below, constructs an n-ary data structure for managing device keys, and stores the constructed tree structure in the tree structure storage unit 102. Here, n is an integer equal to or greater than 2. As an example, n=2.

Details of operations by the tree structure construction unit 101 for constructing the tree structure and storing the constructed tree structure to the tree structure storage unit 102 are described later.

The tree structure construction unit 101 generates a device key for each node in the tree structure with use of a random number, and writes each generated device key in correspondence with the respective node to the tree structure table.

(3) Key Information Header Generation Unit 106

The key information header generation unit 106 generates a plurality of NRPs, and outputs the generated NRPs to the key information recording apparatus 200 as header information. Details of operations for generating the NRPs are described later.

One example of the header information generated by the key information header generation unit 106 is shown in FIG. 38. Header information D900 shown in FIG. 38 is composed of NRPs {11}, {11}, {11}, {10}, {01}, {11}, {10}, {10}, {10}, {01}, {11}, which are included in the header information D900 is the stated order.

Note that the position in the header information D900 in which each of the node information patterns is positioned is set. As shown in FIG. 38, the NRPs {11}, {11}, {11}, {10}, {01}, {11}, {10}, {01}, {10}, {01}, {11} are arranged in positions defined by "0", "1", "2", "3", "4", "5", "6", "7", "8", "9" and "10" respectively in the header information D900.

(4) Key Information Generation Unit 107

The key information generation unit 107 generates encrypted media keys by encrypting the media key using each device key that corresponds to a non-revoked node, in the same order that the pieces of node information are stored in the above-described tree structure table, and outputs the generated encrypted media keys as key information.

The following shows one example of the key information generated and then output by the key information generation unit 107.

The key information is composed of encrypted media keys E1 (IK2, media key), E1 (IK3, media key), E1 (IK6, media key), E1 (IK8, media key), E1 (KeyL, media key) and E1 (KeyG, media key), which are generated by encrypting the media key with use of device keys "IK2", "IK3", "IK6", "IK8", "KeyL" and "KeyG" respectively. The encrypted media keys E1 (IK2, media key), E1 (IK3, media key), E1 (IK6, media key), E1 (K8, media key), E1 (KeyL, media key) and E1 (KeyG, media key) are arranged in the key information in positions defined by "0", "1", "2", "3", "4", "5" and "6" respectively.

4.1.2 Recording Apparatus 300*a*

The recording apparatus 300*a* of the digital work protection system 10*d* has a similar structure to that described in the first embodiment. Here the features of the recording apparatus 300*a* in the second embodiment that differ from the first embodiment are described.

(1) Specification Unit 303

The specification unit 303 specifies the position X in the key information of one encrypted media key by checking the pieces of header information sequentially from the top, with use of the read ID information and the read header information. Note that details of the operations for specifying the position X of the encrypted media key are described later.

4.2 Operations of the Digital Work Protection System 10*d*

The following description focuses on the features of the operations of the digital work protection system 10*d* that differ from the digital work protection system 10.

4.2.1 Operations for Constructing and Storing the Tree Structure

Figure 39:
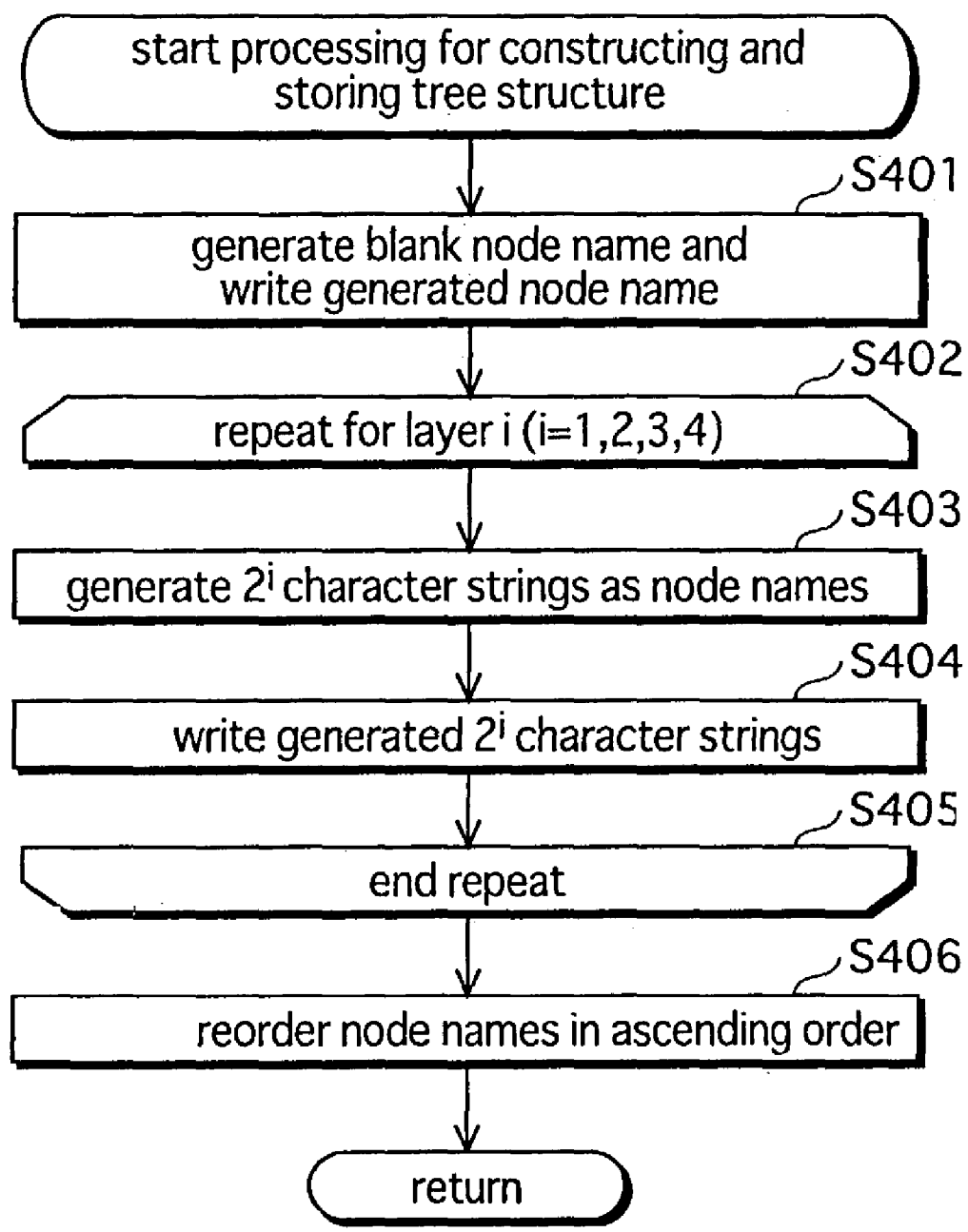
FIG. 39 is a flowchart showing operations by the tree structure construction unit 101 for generating a tree structure table, and writing the generated tree structure table to the tree structure storage unit 102.

Here, the flowchart in FIG. 39 is used to describe operations by the tree structure construction unit 101 for generating the tree structure table and writing the tree structure table to the tree structure storage unit 102. Note that the operations described here are details of step S101 in the flowchart in the FIG. 10.

The tree structure construction unit 101 generates a piece of node information that includes a blank node name, and writes the generated piece of node information to the tree structure data table (step S401).

Next, the tree structure construction unit 101 repeats the following steps S403 to S404 for layer i (i=1, 2, 3, 4).

The tree structure construction unit 101 generates $2^i$ character strings as a node names. Specifically, when i=1, the tree structure construction unit 101 generates $2^{1}=2$ character strings "0" and "1". When i=2, the tree structure construction unit 101 generates $2^2=4$ character strings "00", "01", "10" and "11". When i=3, the tree structure construction unit 101 generates $2^3=8$ character strings "000", "001", "010", . . . and "111". When i=4, the tree structure construction unit 101 generates $2^4=16$ character strings "0000", "0001", "0010", "0011" and "1111" (step S403). Next, the tree structure construction unit 101 writes pieces of node information, each of which includes one of the generated node names, to the tree structure table (step S404).

Next, the tree structure construction unit 101 rearranges the pieces of node information in the tree structure table in ascending order of node name, and overwrites pieces of node information in the tree structure table with the newly arranged pieces of node information (step S406).

In this way, a tree structure table is generated such as the example shown in FIG. 37. The generated tree structure table D1000 includes the pieces of node information in the above described Order Rule 2. Note that at this stage device keys have not yet been recorded in the tree structure table D1000.

4.2.2 Operations for Generating Header Information

Figure 40:
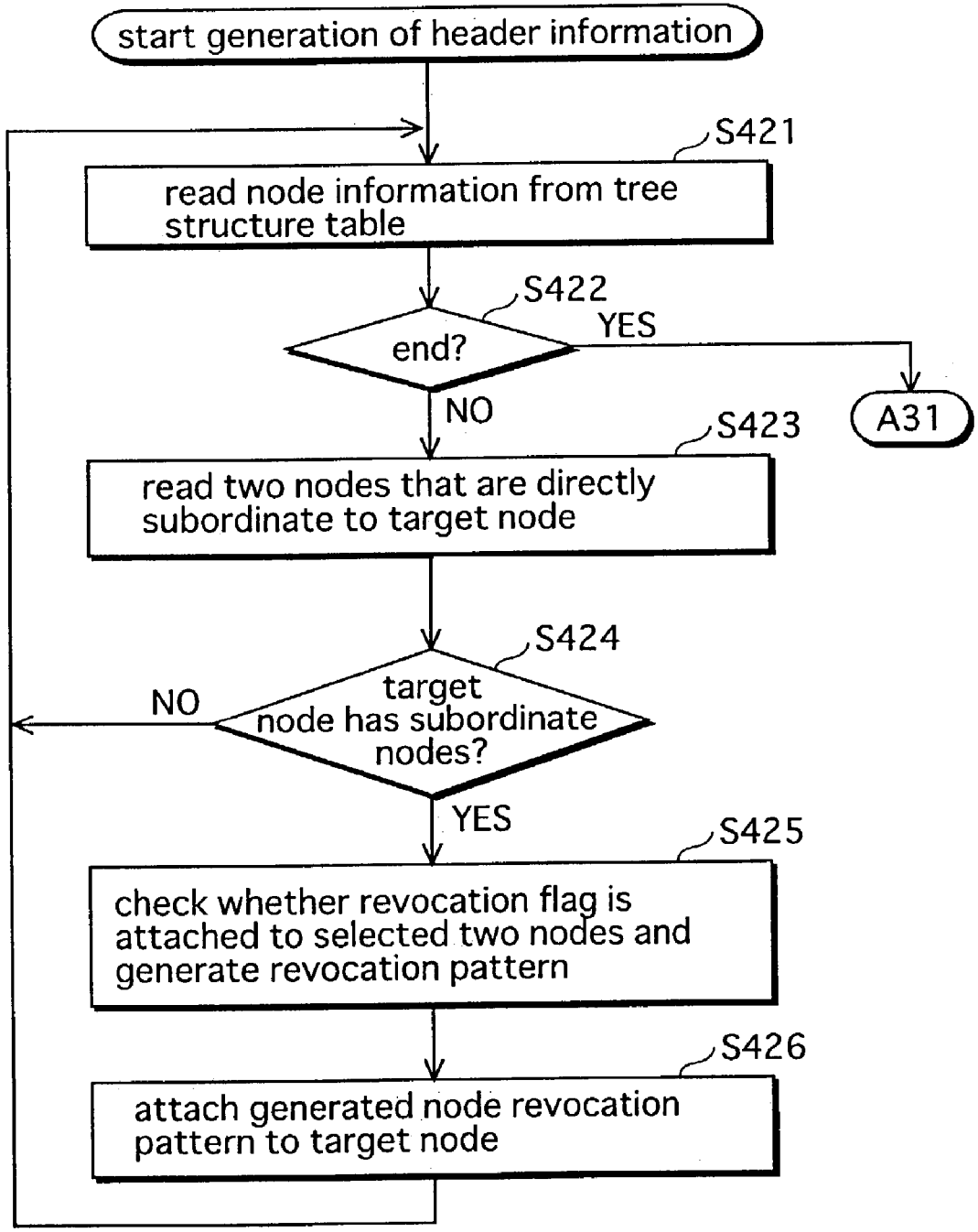
FIG. 40 is a flowchart, which continues in FIG. 41, showing operations by the key information header generation unit 106 for generating header information.
Figure 41:
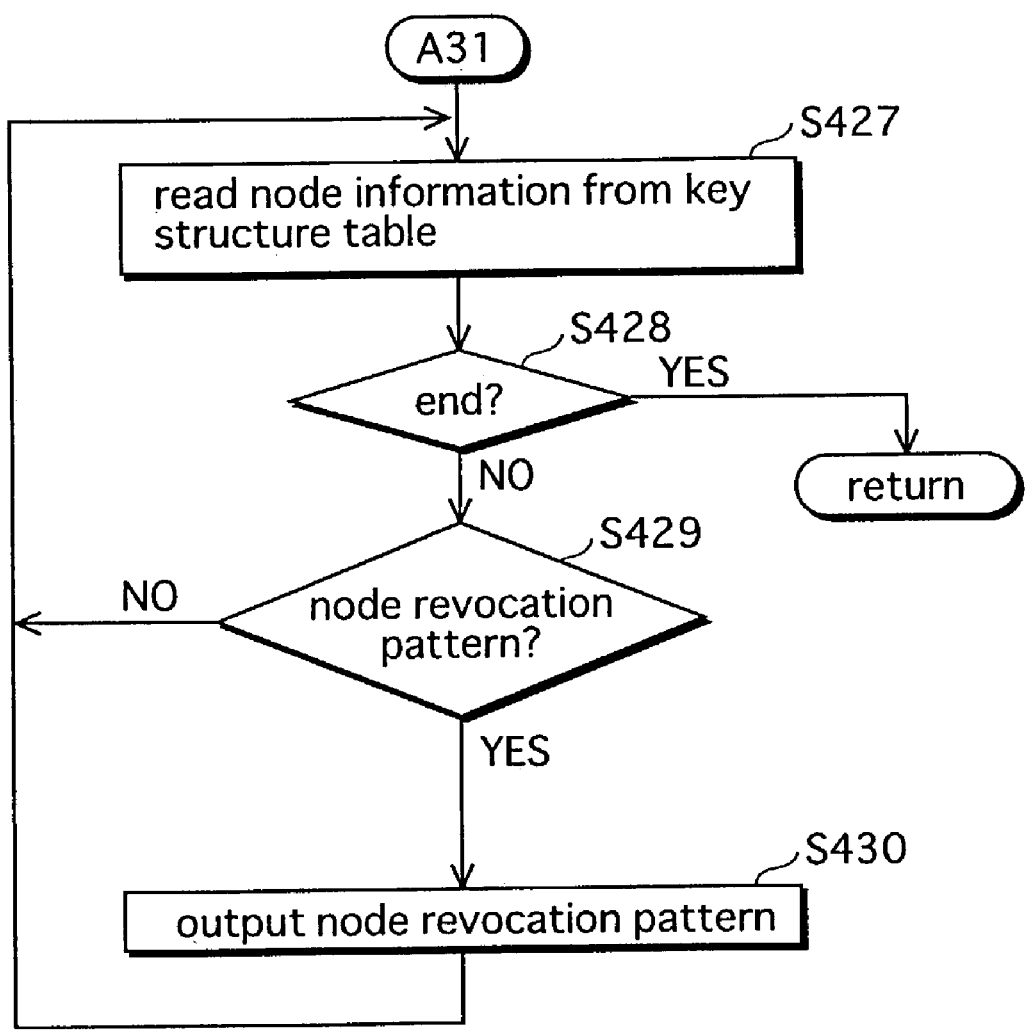
FIG. 41 is a flowchart, which continues from FIG. 40, showing operations by the key information header generation unit 106 for generating header information.

Here, the flowcharts in FIG. 40 and FIG. 41 are used to describe operations by the key information header generation unit 106 for generating header information. Note that the operations described here are the details of step S153 in the flowchart in FIG. 11.

The key information header generation unit 106 tries to read one piece of node information at a time from the tree structure table according to Order Rule 2 (step S421).

On detecting that it has finished reading all the pieces of node information (step S422), the key information header generation unit 106 proceeds to step S427.

When the key information header generation unit 106 does not detect that it has finished reading all the pieces of node information, but instead is able to read a piece of node information (step S422), the key information header generation unit 106 reads the two pieces of node information that correspond to the two subordinate nodes of the target node that corresponds to the read node information (step S423).

When the target node has subordinate nodes (step S424), the key information header generation unit 106 checks whether the read two pieces of node information corresponding to the two subordinate nodes have revocation flags attached thereto, and generates an NRP (step S425). Then, the key information header generation unit 106 adds the generated NRP to the read piece of node information corresponding to the target node (step S426), and returns to step S421 to repeat the processing.

When the target node does not have lower nodes (step S424), the key information header generation unit 106 returns to steps S421 to repeat the processing.

Next, the key information header generation unit 106 tries to read the pieces of node information from the tree structure table in order according to the Order Rule 2 (step S427).

On detecting that it has finished reading all the pieces of node information (step S422), the key information header generation unit 106 ends the processing.

When the key information header generation unit 106 does not detect that it has finished reading all the pieces of node information, but instead is able to read a piece of node information (step S428), the key information header generation unit 106 checks whether the read piece of node information has an NRP attached thereto, and if so (step S429), outputs the attached NRP (step S430). The key information header generation unit 106 then returns to step S427 to repeat the processing.

When the read piece of node information does not have an NRP attached thereto (step S429), the key information header generation unit 106 returns to step S427 to repeat the processing.

4.2.3 Operations for Specifying Key Information

Figure 42:
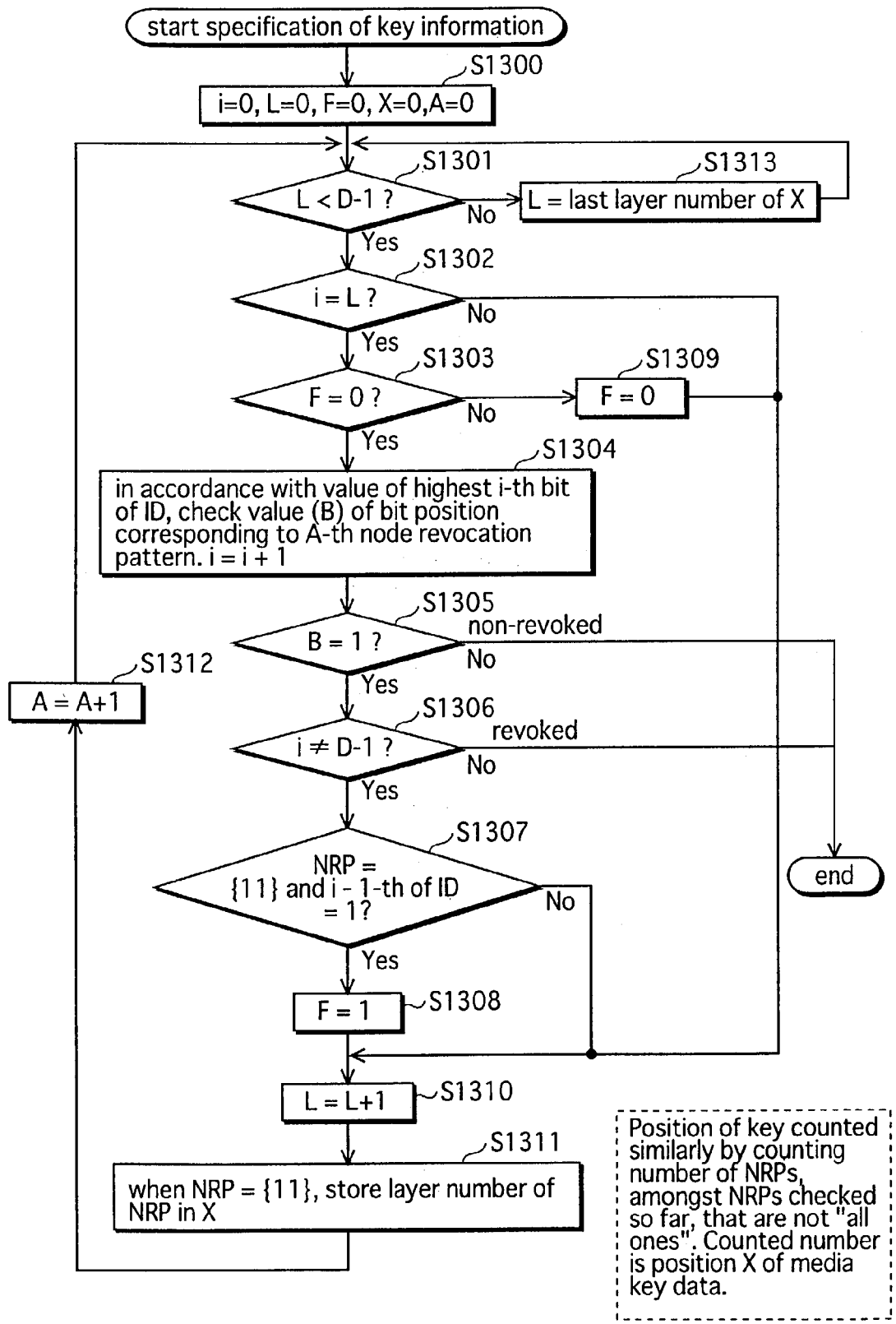
FIG. 42 is a flowchart showing operation by the specification unit 303 in the recording apparatus 300a for designating one encrypted media key from amongst key information stored in the recording medium 500b.
Figure 43:
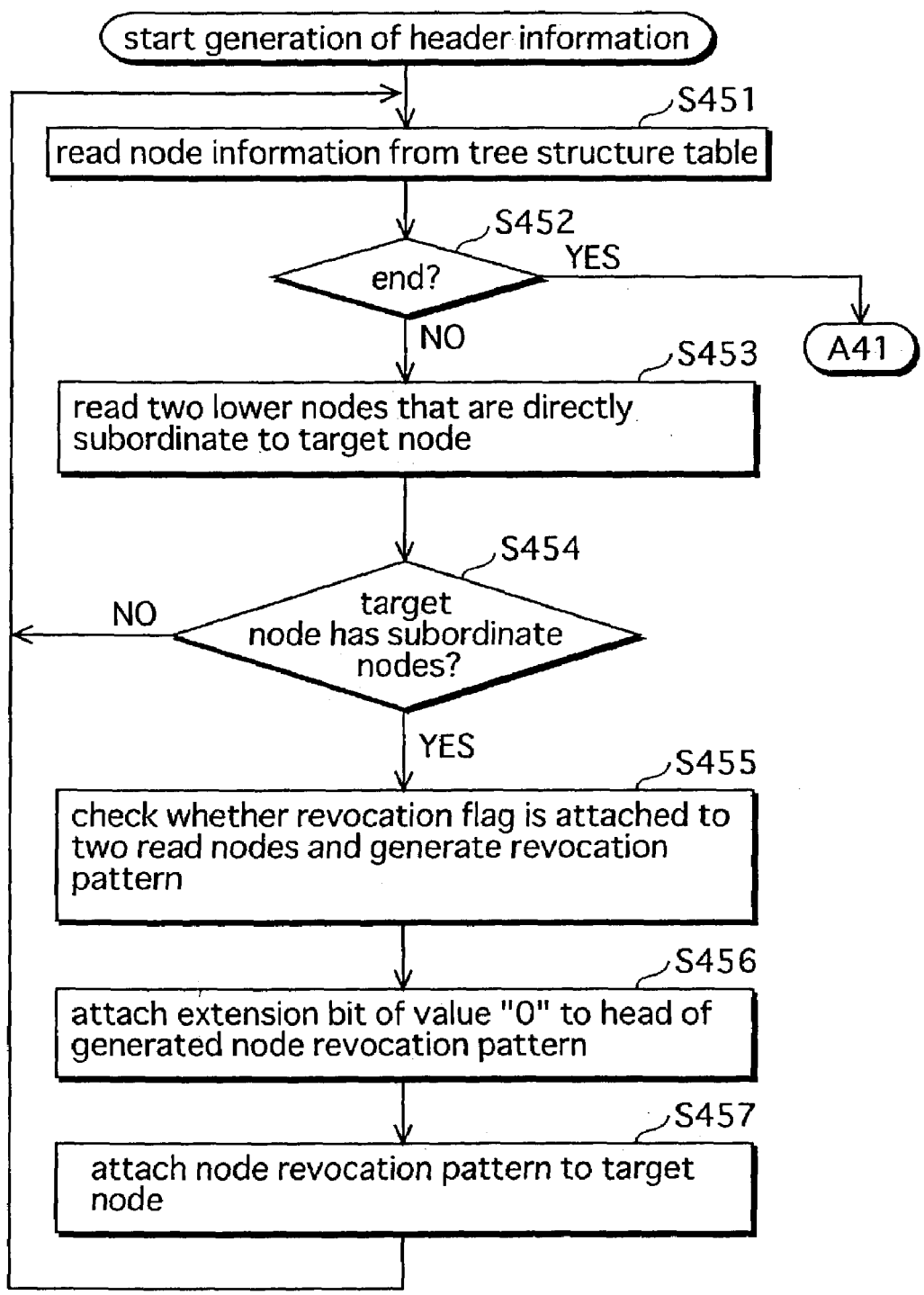
FIG. 43 is a flowchart, which continues in FIG. 44, showing operations by the key information header generation unit 106 for generating header information.
Figure 44:
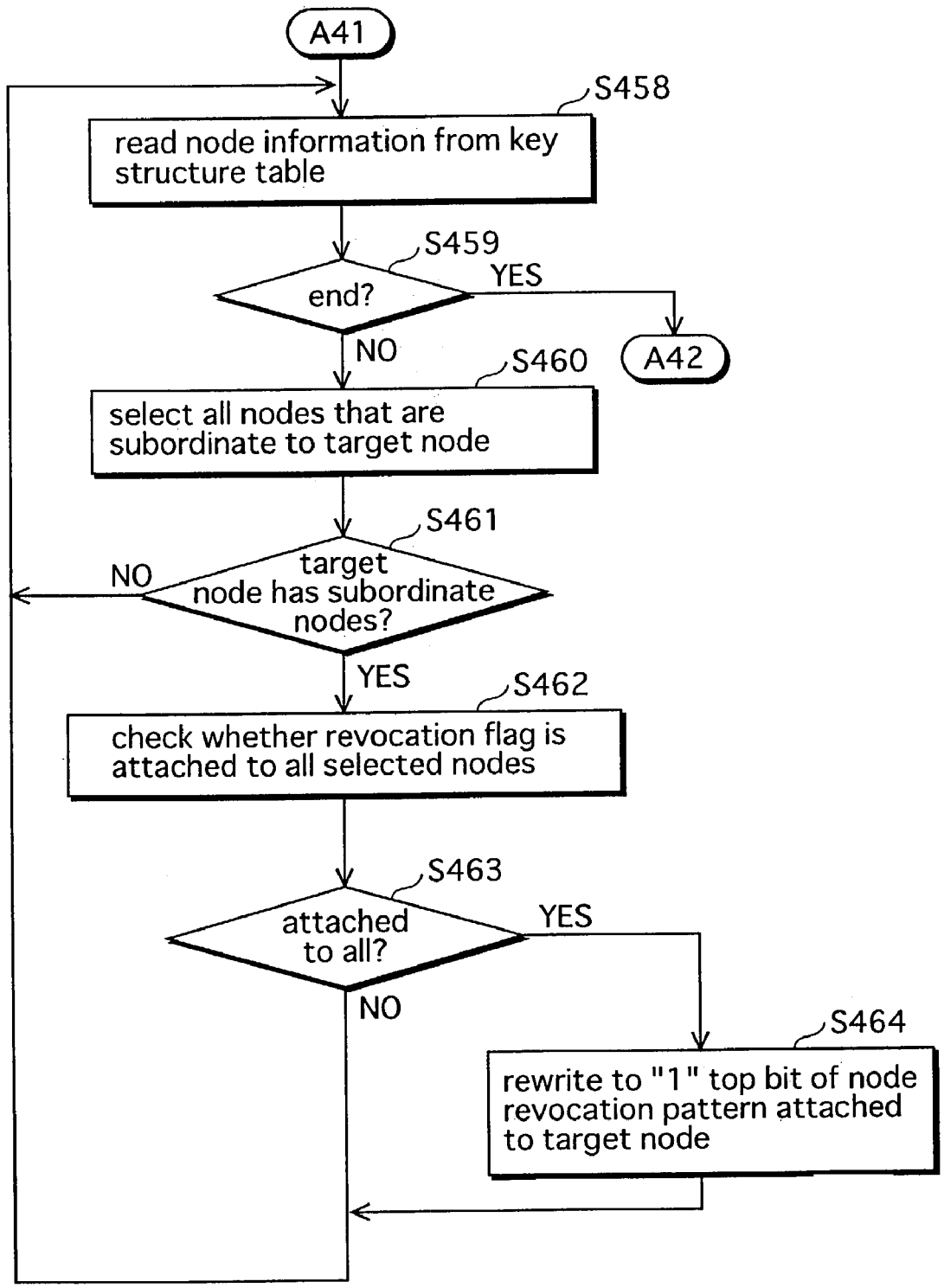
FIG. 44 is a flowchart, which continues in FIG. 45, showing operations by the key information header generation unit 106 for generating header information.
Figure 45:
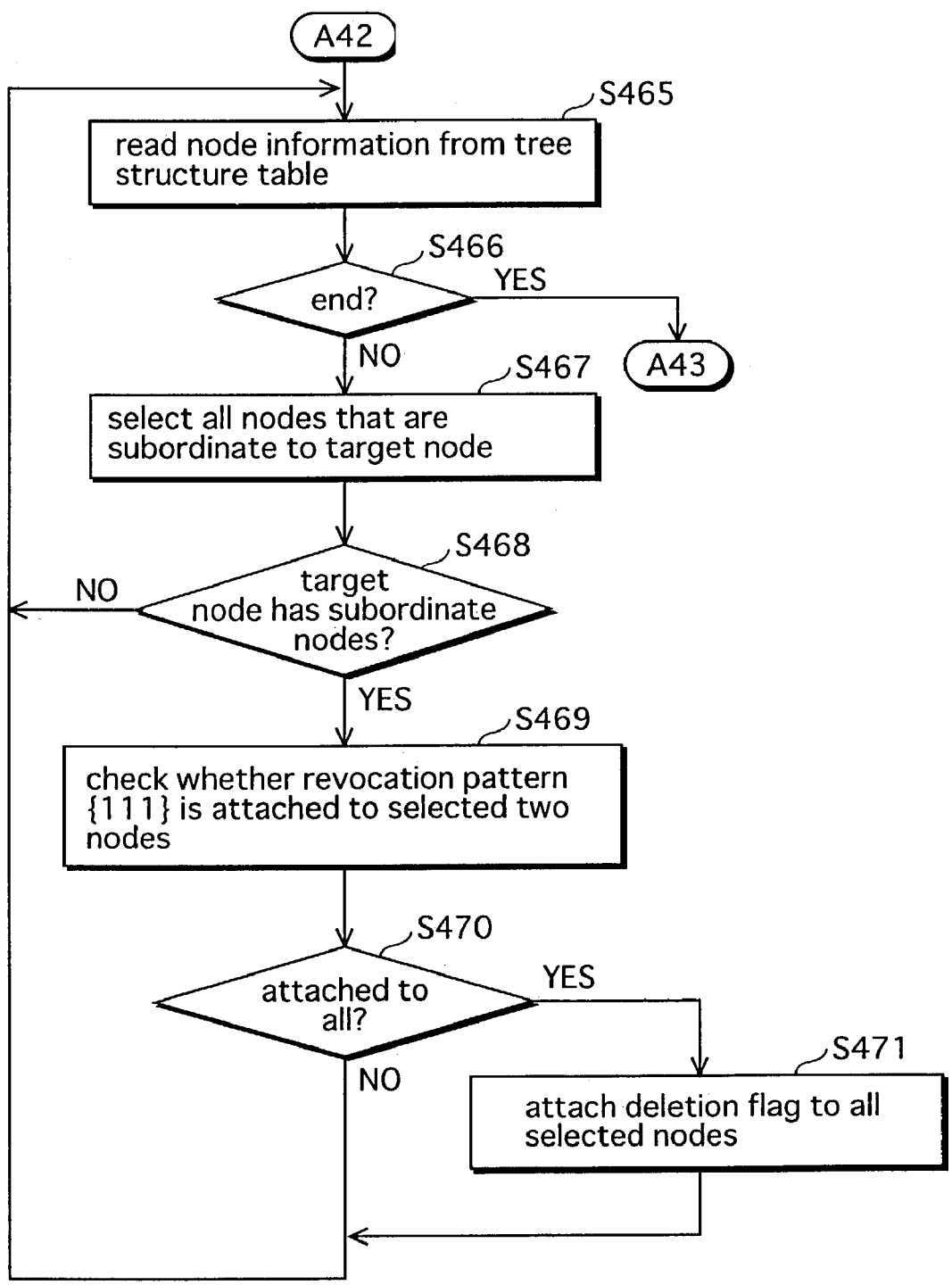
FIG. 45 is a flowchart, which continues in FIG. 46, showing operations by the key information header generation unit 106 for generating header information.
Figure 46:
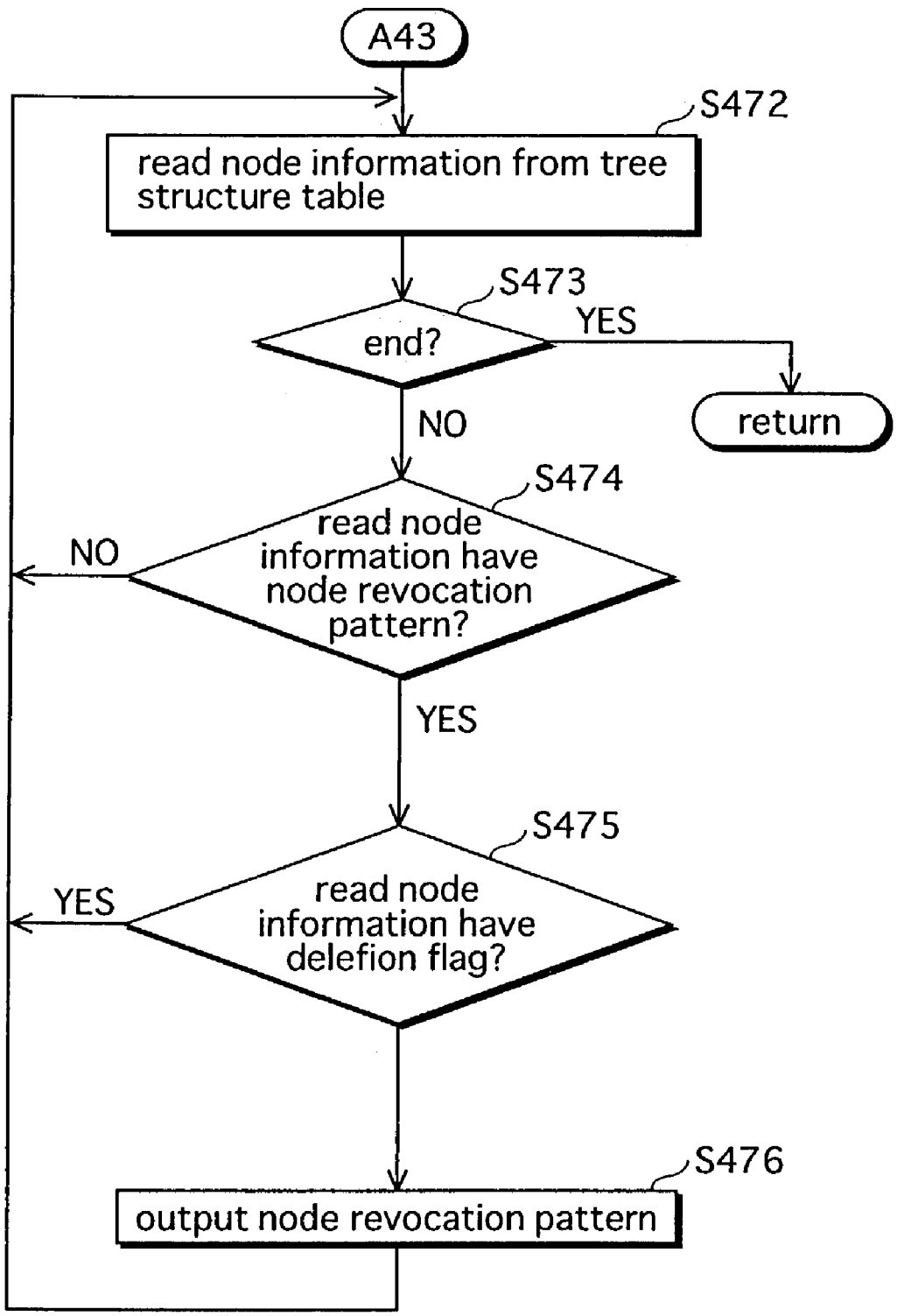
FIG. 46 is a flowchart, which continues from FIG. 45, showing operations by the key information header generation unit 106 for generating header information.

Here, the flowchart in FIG. 42 is used to describe operations by the specification unit 303 of the recording apparatus 300a for specifying an encrypted media key from the key information stored in the recording medium 500b. Note that the operations described here are the details of step S172 in the flowchart in FIG. 11.

Note also that operations performed by the specification unit 402 of the reproduction apparatus 400a are the same as those of the specification unit 303, and therefore a description thereof is omitted.

The specification unit 303 has a variable i, a variable L, a variable X, a flag F, a value D, and a pointer A. The variable i shows the bit position of ID information to be checked. The variable L shows the layer in which NRP currently being checked is included. The variable X stores the layer of the node at the point where paths diverge. The flag F (initial value F=0) is for judging whether to check an NRP. The value D shows the number of layers in the tree structure. The pointer A shows the position of the NRP to be checked.

The specification unit 303 sets variable i=0, variable L=0, flag F=0, variable X=0 and pointer A=0 (step S1300).

Next, the specification unit 303 judges whether the variable L is less than the number of layers D−1. When the variable L is greater than or equal to the number of layers D−1 (step S1301), the specification unit 303 inputs the last layer number of the variable X to the variable L. The variable X is a last-in first-out variable, and a value output therefrom is deleted. In other words, if layer 0, layer 2 and layer 3 are input to the variable X in order, layer 3 is output first and then deleted, and then layer 2 is output (step S1313). The specification unit 303 then returns to step S1301 to repeat the processing.

When the variable L is less than the number of layers D−1 (step S1301), the specification unit 303 judges whether variable i=variable L. When the variable i is not equal to the variable L (step S1302), the specification unit 303 proceeds to step S1310.

When variable i=variable L (step S1302), the specification unit 303 judges whether flag F=0. When the flag F is not equal to 0 (step S1303), the specification unit 303 sets the flag F to 0 (step S1309), and proceeds to step S1310.

When flag F=0 (step S1303), the specification unit 303 checks the value B of the bit position corresponding to the A-th NRP, according to the value of the top i-th bit of the ID information, and sets variable i=i+1 (step S1304).

Next, the specification unit 303 checks whether value B=1, and if not (step S1305), judges that the apparatus to which the ID information is assigned is not revoked, and ends the processing.

When value B=1 (step S1305), the specification unit 303 judges whether variable i≠D−1, and if the variable i is equal to 1 (step S1306), judges that the apparatus to which the ID information is assigned is revoked, and ends the processing.

Next, when variable i≠D−1 (step S1306), the specification unit 303 judges whether the NRP is {11} and the i−1-th value of the ID information is "1". When the judgement is negative (step S1307), the specification unit 303 proceeds to step S1310.

When the judgement is positive (step S1307), the specification unit 303 sets flag F=1 (step S1308), sets L=L+1 (step S1310), and if the NRP is {11}, the specification unit 303 stores the layer number of the NRP in the variable X (step S1311). Then the specification unit 303 sets A=A+1 (step S1312), and returns to step S1310.

5. Fifth Embodiment

In the fourth embodiment, NRPs are arranged according to Order Rule 2.

In the fifth embodiment described hereinafter a digital work protection system 10e (not illustrated) arranges and outputs NRPs according to the Order Rule 2 in the same manner as in the digital work protection system 10d in the fourth embodiment, while reducing the amount of data of the header information in the same manner as in the digital work protection system 10b described in the second embodiment when revoked apparatuses occur one-sidedly around a particular leaf.

5.1 Structure of the Digital Work Protection System 10e

The digital work protection system 10e has a similar structure to the digital work protection system 10d. Here, the features of the digital work protection system 10e that differ from the digital work protection system 10d are described.

5.1.1 Key Management Apparatus 100

The key management apparatus 100 of the digital work protection system 10e has a similar structure to the key management apparatus 100d described in the fourth embodiment. Here the features of the key management apparatus 100 that differ from the key management apparatus 100d are described.

(1) Tree Structure Storage Unit 102

The tree structure storage unit 102 has a tree structure table. The tree structure table in the tree structure storage unit 102 has the same structure as the tree structure table D1000 described in the fourth embodiment, with each piece of node information included in the tree structure table additionally including an NRP.

(2) Key Information Header Generation Unit 106

The key information header generation unit 106 generates a plurality of NRPs, and outputs the generated NRPs to the key information recording apparatus 200 as header information. Each NRP is composed of three bits as described in the second embodiment.

Details of operations for generating NRPs are described later.

5.1.2 Recording Apparatus 300a

The recording apparatus 300a of the digital work protection system 10e has a similar structure to the recording apparatus 300a described in the fourth embodiment. Here the features of recording apparatus 300a that differ from the recording apparatus 300a described in the fourth embodiment are described.

(1) Specification Unit 303

The specification unit 303 specifies the position X of one encrypted media key by checking the pieces of header information sequentially from the top, with use of ID information and header information. Note that details of the operations for specifying the position X of the encrypted media key are described later.

5.2 Operations of the Digital Work Protection System 10e

The following description focuses on the features of the operations of the digital work protection system 10e that differ from the digital work protection system 10d.

5.2.1 Operations for Generating Header Information

Here, the flowcharts in FIG. 43 to FIG. 46 are used to describe operations by the key information header generation unit 106 for generating header information. Note that the operations described here are the details of step S153 in the flowchart in FIG. 11.

The key information header generation unit 106 tries to read one piece of node information at a time from the tree structure table according to Order Rule 2 (step S451).

On detecting that it has finished reading all the pieces of node information (step S452), the key information header generation unit 106 proceeds to step S458.

When the key information header generation unit 106 does not detect that it has finished reading all the pieces of node information, but instead is able to read a piece of node information (step S452), the key information header generation unit 106 reads the two pieces of node information that correspond to the two directly subordinate nodes of the target node that corresponds to the read node information (step S453).

When the target node has subordinate nodes (step S454), the key information header generation unit 106 checks whether the read two pieces of node information corresponding to the two subordinate nodes have revocation flags attached thereto, generates an NRP (step S455), and attaches an extension bit of the value "0" to the head of the generated NRP (step S456). Then, the key information header generation unit 106 adds the NRP that has the extension bit attached thereto to the piece of node information corresponding to the target node (step S457), and returns to step S451 to repeat the processing.

When the target node does not have subordinate nodes (step S454), the key information header generation unit 106 returns to steps S451 to repeat the processing.

Next, the key information header generation unit 106 tries to read the pieces of node information from the tree structure table in order according to Order Rule 2 (step S458).

On detecting that it has finished reading the pieces of node information (step S459), the key information header generation unit 106 proceeds to step S465.

When the key information header generation unit 106 does not detect that it has finished reading the pieces of node information, but instead is able to read a piece of node information (step S459), the key information header generation unit 106 reads all the pieces of node information corresponding to all directly subordinate nodes of the read piece of node information (step S460).

When the target node has subordinate nodes (step S461), the key information header generation unit 106 checks whether all the read pieces of node information corresponding to all the subordinate nodes have revocation flags attached thereto (step S462), and only when all the subordinate nodes have revocation flags attached thereto (step S463), the key information header generation unit 106 rewrites the top bit of the NRP attached to the piece of node information corresponding to the target node with "1" (step S464).

Next, the key information header generation unit 106 returns to step S458 to repeat the processing.

When the target node does not have subordinate nodes (step S461), the key information header generation unit 106 returns to step S458 to repeat the processing.

Next, the key information header generation unit 106 tries to read one piece of node information at a time from the tree structure table according to Order Rule 2 (step S465).

On detecting that it has finished reading all the pieces of node information (step S466), the key information header generation unit 106 proceeds to step S472.

When the key information header generation unit 106 does not detect that it has finished reading all the pieces of node information, but instead is able to read a piece of node information (step S466), the key information header generation unit 106 reads all the pieces of node information that correspond to all the subordinate nodes of the target node that corresponds to the read piece of node information (step S467).

When the target node has subordinate nodes (step S468), the key information header generation unit 106 checks whether all the read pieces of node information corresponding to all the subordinate nodes have NRPs {111} attached thereto (step S469), and only when all the read pieces of node information have NRPs {111} attached thereto (step S470), the key information header generation unit 106 attaches a deletion flag to each of the pieces of node information (step S471).

Next, the key information header generation unit 106 returns to step S465 to repeat the processing.

When the target node does not have subordinate nodes (step S468), the key information header generation unit 106 returns to step S465 to repeat the processing.

Next, the key information header generation unit 106 tries to read the pieces of node information one at a time from the tree structure table according to Order Rule 2 (step S472).

On detecting that it has finished reading the pieces of node information (step S473), the key information header generation unit 106 ends the processing.

When the key information header generation unit 106 does not detect that it has finished reading the pieces of node information, but instead is able to read a piece of node information (step S473), the key information header generation unit 106 checks whether the read piece of node information has an NRP attached thereto, and if so (step S474), checks whether a deletion flag is attached to the read piece of node information. When a deletion flag is not attached thereto (step S475), the key information header generation unit 106 outputs the attached NRP (step S476). The key information header generation unit 106 then returns to step S472 to repeat the processing.

When the read piece of node information does not have an NRP attached thereto (step S474), or when the read piece of node information has a deletion flag attached thereto (step S475), the key information header generation unit 106 returns to step S472 to repeat the processing.

5.2.2 Operations for Specifying Key Information

Figure 47:
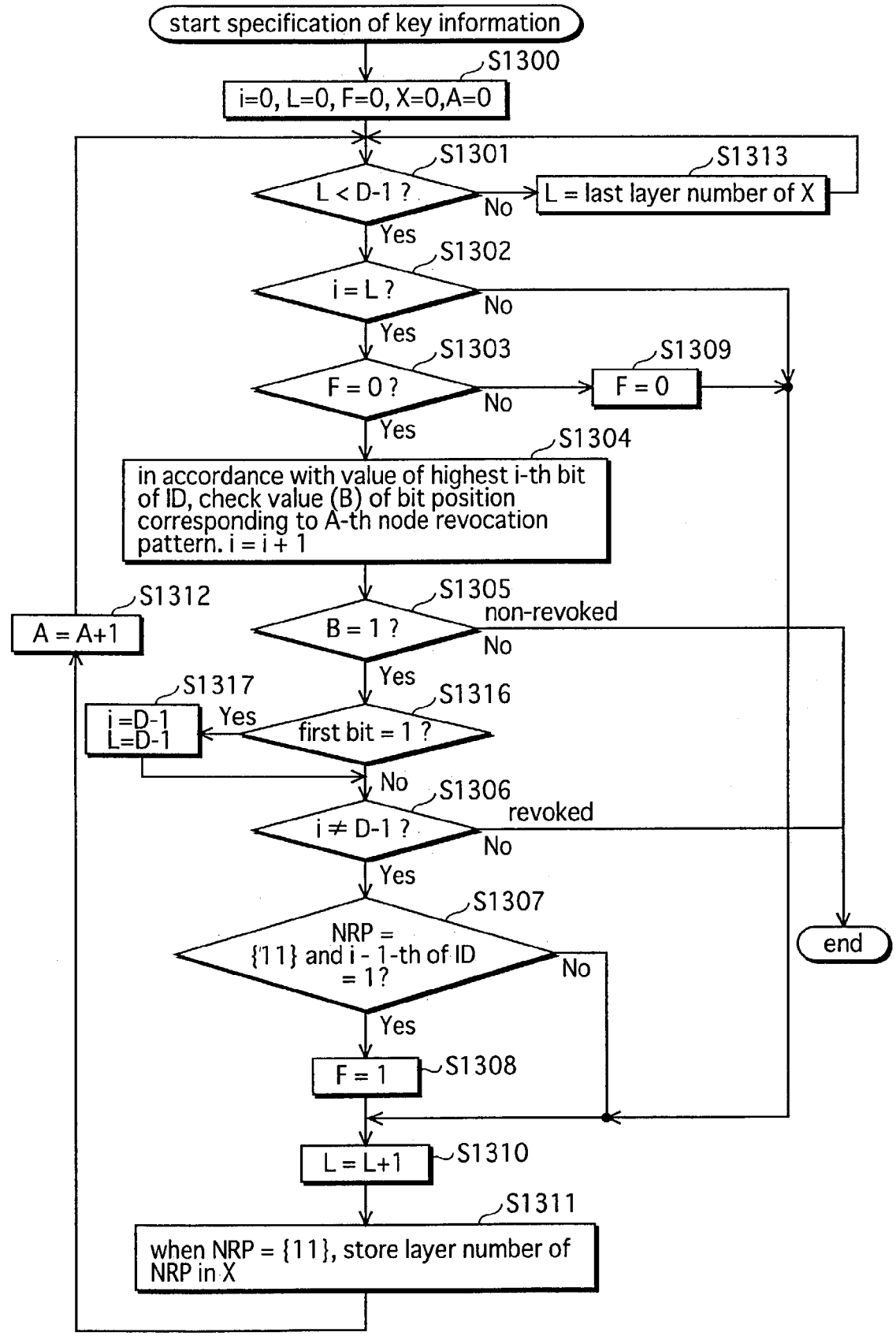
FIG. 47 is a flowchart showing operations by the specification unit 303 in the recording medium 300a for designating one encrypted media key from amongst key information stored in the recording medium 500b.
Figure 48:
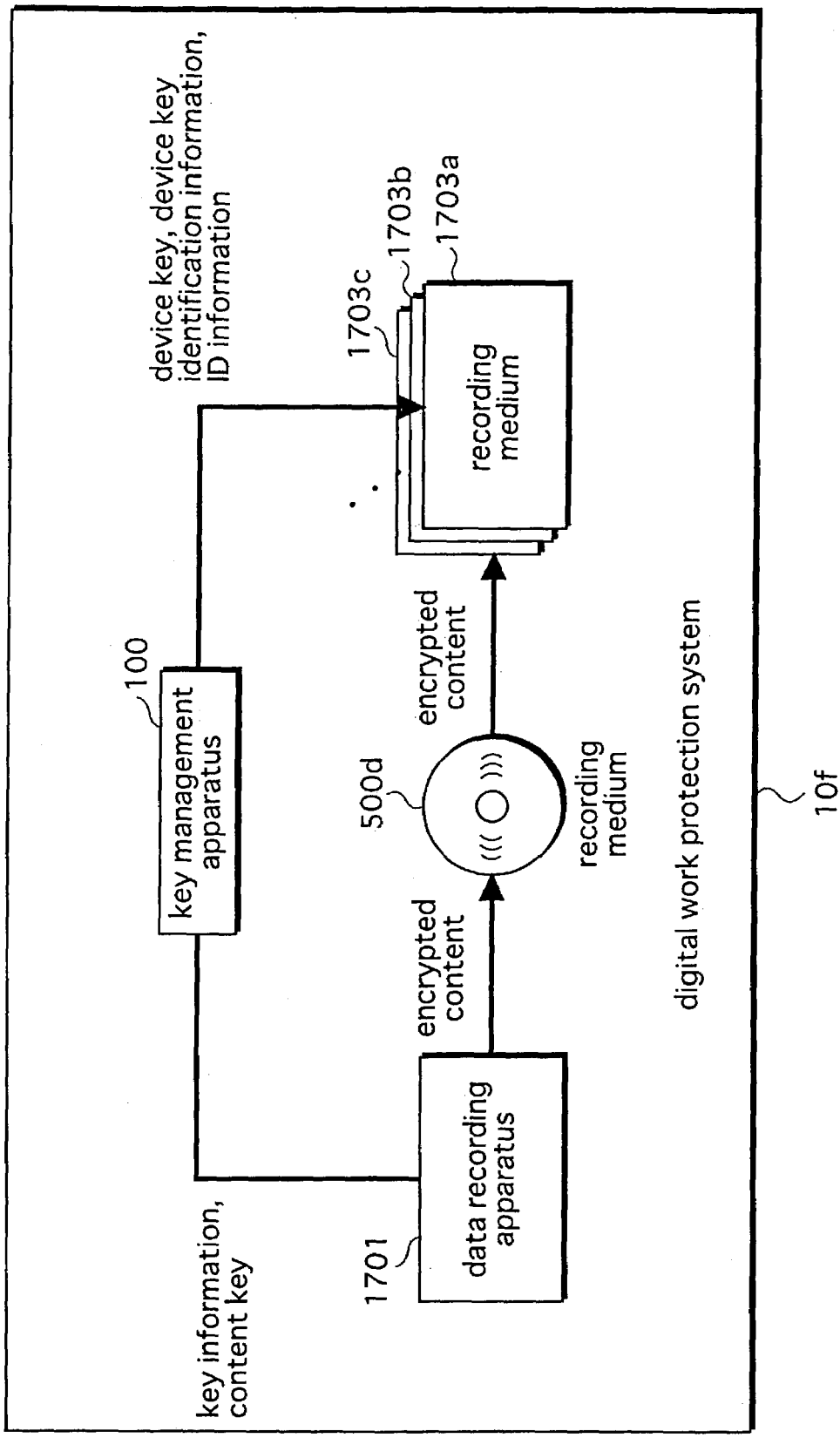
FIG. 48 is a block diagram showing the structure of a digital work protection system 10f.
Figure 49:
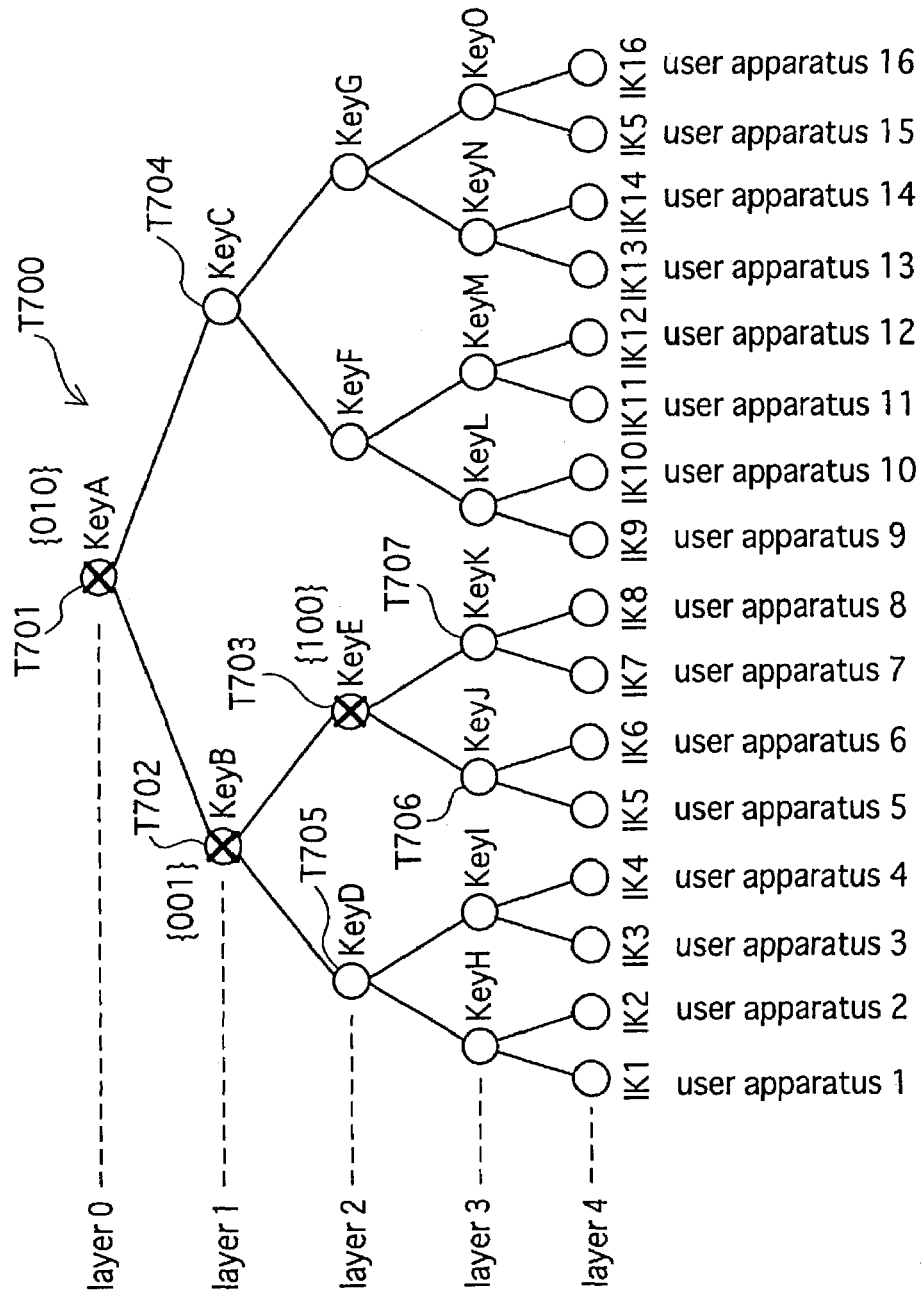
FIG. 49 is an conceptual diagram of a tree structure T700 that includes nodes to which revoked device KeyA, KeyB and KeyE are assigned.
Figure 50:
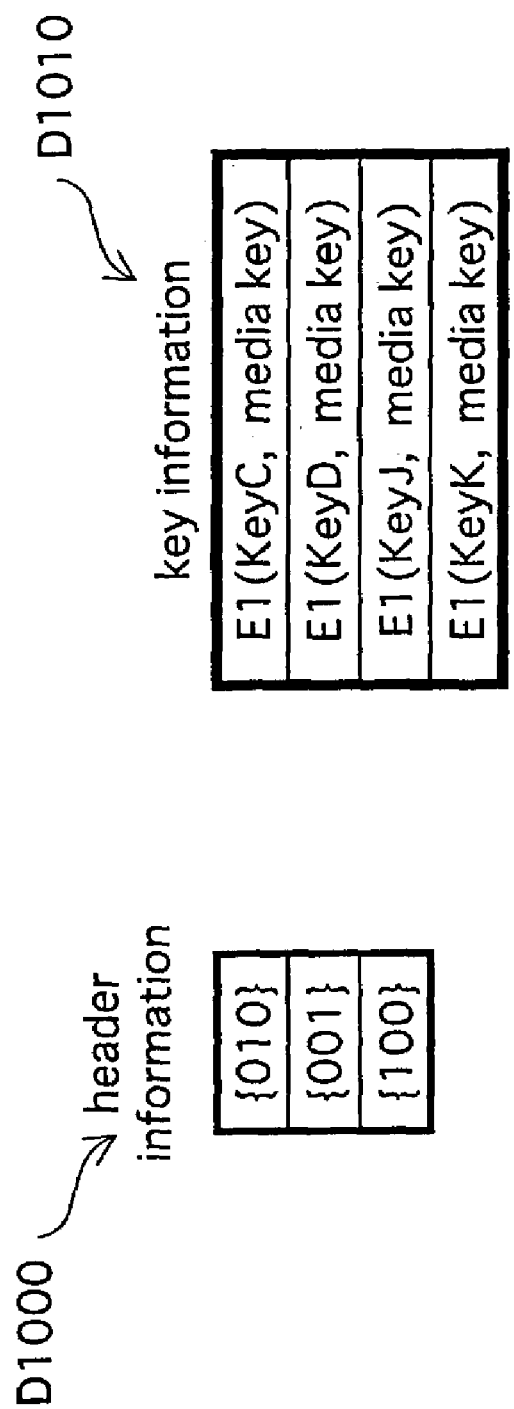
FIG. 50 is a data structure diagram showing header information D1000 and key information D1010.
Figure 51:
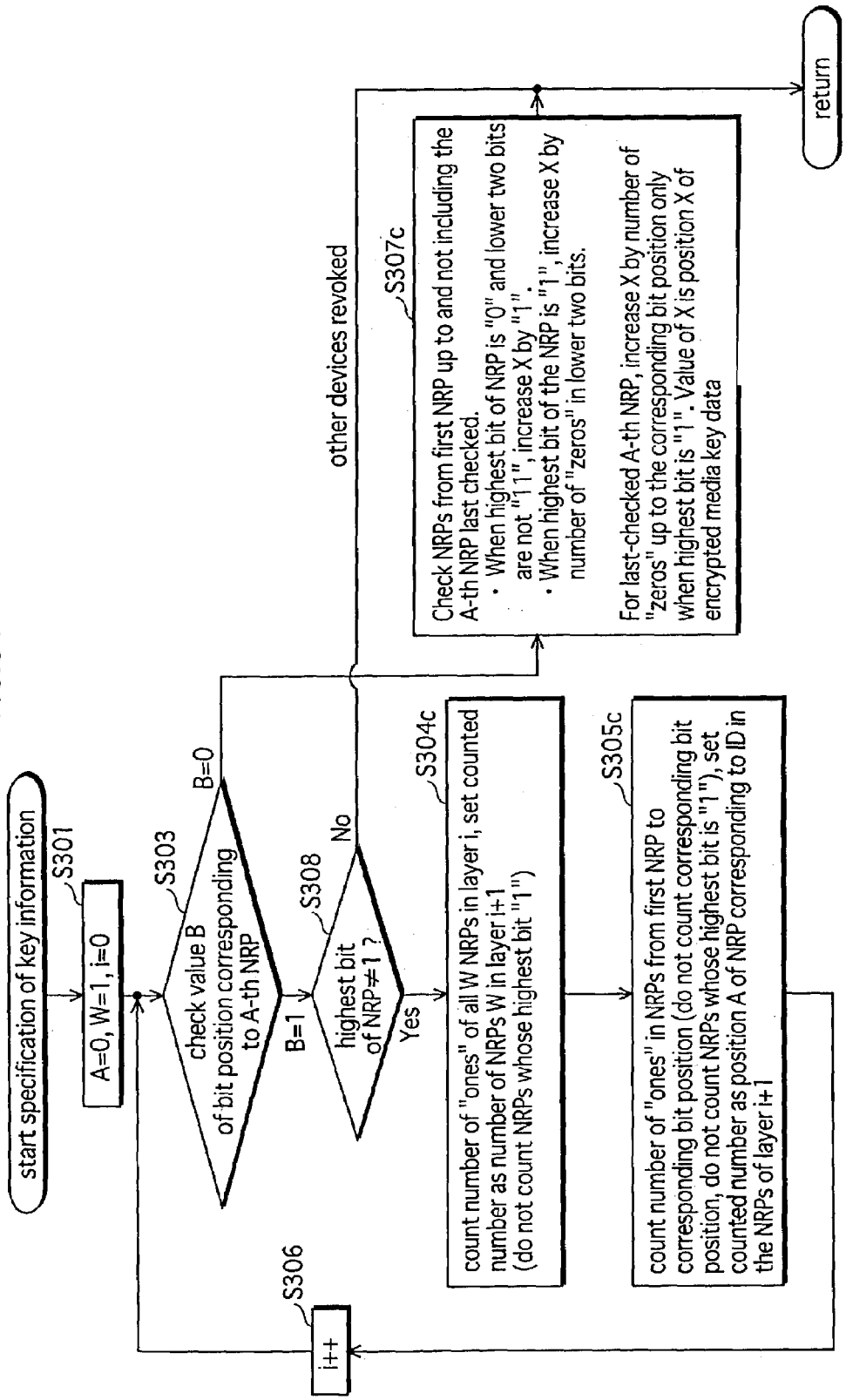
FIG. 51 is a flowchart showing operations by the specification unit 303 of the recording apparatus 300a for specifying an encrypted media key.

Here, the flowchart in FIG. 47 is used to describe operations by the specification unit 303 of the recording apparatus 300a for specifying an encrypted media key from key information stored in the recording medium 500b. Note that the operations described here are the details of step S172 in the flowchart in FIG. 11.

Note also that operations performed by the specification unit 402 of the reproduction apparatus 400a are the same as those by the specification unit 303, and therefore a description thereof is omitted.

Here, the features that differ from the flowchart shown in FIG. 42 are described.

Similar to the fourth embodiment, the specification unit 303 has a variable i, a variable L, a variable X, a flag F, a value D, and a pointer A. The variable i shows the bit position of ID information to be checked. The variable L shows the layer in which NRP currently being checked is included. The variable X stores the layer of the node where the paths branch out. The flag F (initial value F=0) is for judging whether to check an NRP. The value D shows the number of layers in the tree structure. The pointer A shows the position of the NRP to be checked.

When value B=1 (step S1305), only when the highest bit of the NRP is "1" (step S1316), the specification unit 303 sets variable i=D−1 and sets variable L=D−1 (step S1317).

Furthermore, when both the NRP is {11} and the highest bit of the NRP is not "1", the specification unit 303 stores the layer number of the NRP in the variable X (step S1311).

7. Sixth Embodiment

The following describes an authentication system 1000 as yet a further embodiment of the present invention.

Figure 52:
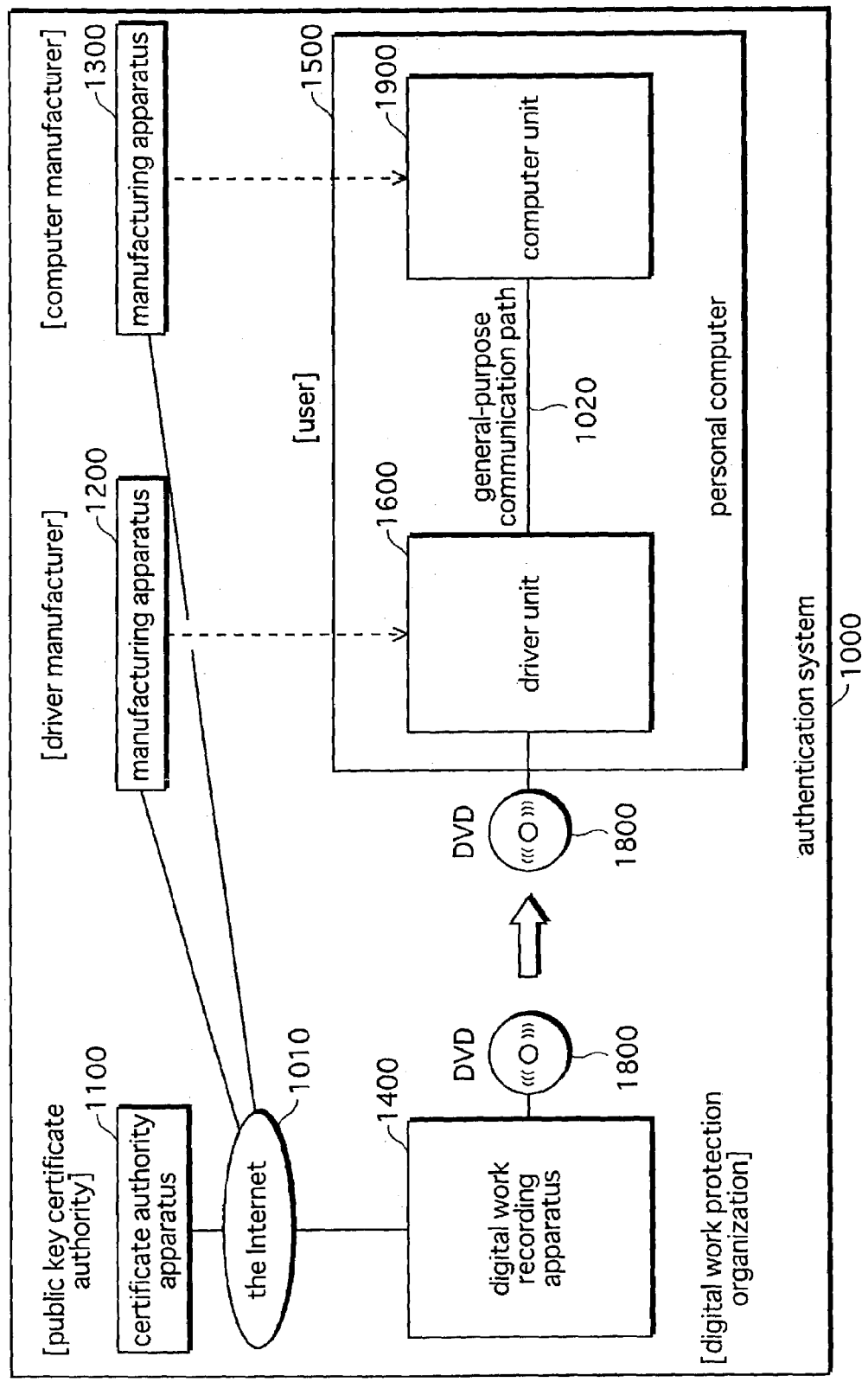
FIG. 52 is a block diagram showing the structure of an authentication system 1000.

As shown in FIG. 52, the authentication system 1000 is composed of a certificate authority apparatus 1100, a manufacturing apparatus 1200, a manufacturing apparatus 1300, a digital work recording apparatus 1400 and a personal computer 1500. The personal computer 1500 is composed of a driver unit 1600 and a computer unit 1900, which are connected by a general-purpose communication path 1020.

A driver manufacturer possesses the manufacturing apparatus 1200, which is connected to the Internet 1010. In the manufacturing process for the driver unit 1600, the manufacturing apparatus 1200 generates a driver secret key and a driver public key that correspond to the driver unit 1600, writes the generated driver secret key in a storage area in the driver unit 1600 that is not accessed from outside the driver unit 1600, and discloses the generated public key via the Internet 1010. Furthermore, the manufacturing apparatus 1200 makes a request via the Internet 1010 to the certificate authority apparatus 1100, which is possessed by a public key certificate authority, to generate a public key certificate. The certificate authority apparatus 1100 generates a public key certificate corresponding to the driver public key, and transmits the generated public key certificate via the Internet 1010 to the manufacturing apparatus 1200. The manufacturing apparatus 1200 obtains public key certificate corresponding to the driver public key from the certificate authority apparatus 1100, and writes the obtained public key certificate to the driver unit 1600. The driver manufacturer supplies the driver unit 1600 to which the driver secret key and the driver public key certificate have been written to a computer manufacturer.

The computer manufacturer possesses the manufacturing apparatus 1300, which is connected to the Internet 1010, and which manufactures the computer unit 1900 of the personal computer 1500. In the process for manufacturing the computer unit 1900, the manufacturing apparatus 1300 obtains the driver public key that has been disclosed via the Internet 1010, and writes the obtained driver public key to the computer unit 1900. Next, the computer manufacturer assembles the provided driver unit 1600 and the computer unit 1900 to which the driver public key has been written, by connecting the driver unit 1600 and the computer unit 1900 with the general-purpose communication path 1020, thereby producing the personal computer 1500.

The produced personal computer 1500 is put on sale via a seller, and subsequently purchased by a user.

Here, suppose that the set of the driver secret key and the driver public key are exposed by an illegal third party. In this case, the corresponding public key certificate must be revoked.

On discovering that the public key certificate is to be revoked, the certificate authority apparatus 1100 generates a CRL that includes a certificate ID that identifies the public key certificate to be revoked, and transmits the generated CRL via the Internet 1010 to the digital work recording apparatus 1400, which is possessed by a digital work seller. The digital work recording apparatus 1400 stores a digital work, and writes the digital work and the received CRL to a DVD 1800. The DVD 1800 to which the digital work and the CRL have been written is put on sale.

The user purchases the DVD 1800, and mounts the DVD 1800 in the personal computer 1500.

The computer unit 1900 of the personal computer 1500 reads the CRL from the DVD 1800 via the driver unit 1600, obtains the public key certificate from the driver unit 1600, and judges, with use of the read CRL, whether the obtained public key certificate is revoked. When the judgement is positive, the computer unit 1900 stops usage of the driver unit 1600. When the judgement is negative, the computer unit 1900 further authenticates the driver unit 1600 using the internally-stored driver public key, and when the driver unit 1600 is authenticated as being legal, reads the digital work from the DVD 1800 via the driver unit 1600. When the driver unit 1600 is authenticated as being illegal, the computer unit 1900 stops reading of the digital work from the DVD 1800 via the driver unit 1600.

7.1 Structure of the Manufacturing Apparatus 1200

Figure 53:
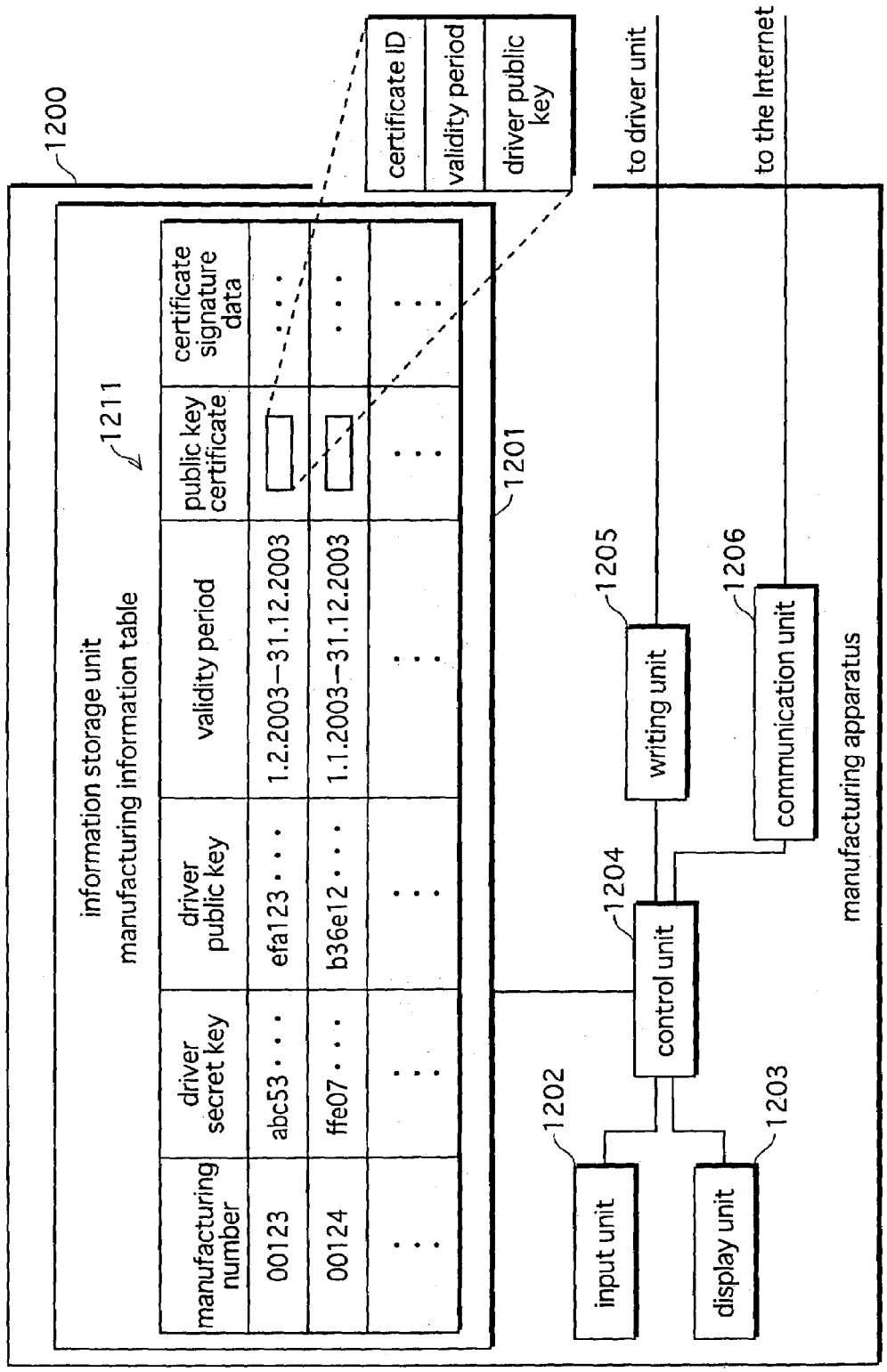
FIG. 53 is a block diagram showing the structure of a manufacturing apparatus 1200.

As shown in FIG. 53, the manufacturing apparatus 1200 is composed of an information storage unit 1201, an input unit 1202, a display unit 1203, a control unit 1204, a writing unit 1205 and communication unit 1206.

The manufacturing apparatus 1200 is, specifically, a computer system that is composed of a microprocessor, a ROM, a RAM, a hard disk unit, a communication unit, a display unit, a keyboard, a mouse, and so on. The hard disk unit stores a computer program. The manufacturing apparatus 1200 achieves its functions by the microprocessor operating according to the computer program.

As described earlier, the manufacturing apparatus 1200 is possessed by a driver manufacturer. In the process for manufacturing the driver unit 1600, the driver manufacturer connects the manufacturing apparatus 1200 and the partially-manufactured driver unit 1600.

(1) Information Storage Unit 1201

The information storage unit 1201 has a manufacturing information table 1211.

As shown as one example in FIG. 53, the manufacturing information table 1211 includes an area for storing a plurality of pieces of manufacturing information, each of which is composed of a manufacturing number, a driver secret key, a driver public key, a validity period, a public key certificate, and certificate signature data.

Here, the manufacturing number is an identification number that uniquely identifies a driver unit manufactured by the driver manufacturer.

The driver secret key is a secret key generated to correspond to the driver unit.

The driver public key is a public key generated to correspond to the driver secret key.

The validity period includes a starting date and an ending data for usage of the driver secret key and the driver public key.

The public key certificate is a certificate generated to correspond to the driver public key, and includes a certificate ID, a validity period and a driver public key. The certificate ID is identification information for identifying the public key certificate. The validity period is identical to that described above. The driver public key is also identical to that described above.

The certificate signature information is signature data generated based on the public key certificate.

(2) Input Unit 1202

The input unit 1202 receives input of the manufacturing number of the driver unit 1600 from an operator of the manufacturing apparatus 1200, further receives input of the validity period, and outputs the received manufacturing number and validity period to the control unit 1204.

(3) Control Unit 1204

The control unit 1204 receives the manufacturing number and the validity period from the input unit 1202. On receiving the manufacturing number and the validity period, the control unit 1204 generates a random number, generates a driver secret key based on the generated random number, and then generates a driver public key based on the generated driver secret key, using an RSA public key encryption technique.

Since the RSA public key encryption technique is commonly known, a description thereof is omitted here.

Next, the control unit 1204 outputs a public key certificate issue request, the received validity period, and the generated public key to the certificate authority apparatus 1100 via the communication unit 1206 and the Internet 1010. The public key certificate issue request shows a request to issue the public key certificate.

Next, the control unit 1204 receives the public key certificate and the certificate signature data from the certificate authority apparatus 1100 via the Internet 1010 and the communication unit 1206, generates manufacturing information made up of the manufacturing number, the driver secret key, the driver public key, the validity period, the public key certificate and the certificate signature data, and writes the generated manufacturing information to the manufacturing information table 1211 in the information storage unit 1200.

Furthermore, the control unit 1204 outputs the manufacturing number, the driver secret key, the public key certificate, and the certificate signature data to the writing unit 1205.

In addition, the control unit 1204 discloses the manufacturing number and the driver public key via the communication unit 1206 and the Internet 1010.

(4) Writing Unit 1205

The writing unit 1205 is connected by the driver manufacturer to an information storage unit 1601 (described later) in the driver unit 1600.

The writing unit 1205 receives the manufacturing number, the driver secret key, the public key certificate and the certificate signature data from the control unit 1204, and writes the received manufacturing number, driver secret key, public key certificate and certificate signature data to the information storage unit 1601 in the driver unit 1600.

(5) Communication Unit 1206

The communication unit 1206 is connected to the Internet 1010, and transmits and receives information between external apparatuses connected to the Internet 1010 and the control unit 1204.

(6) Display Unit 1203

The display unit 1203 displays various types of information under the control of the control unit 1204.

7.2 Structure of the Manufacturing Apparatus 1300

The manufacturing apparatus 1300, similar to the manufacturing apparatus 1200, is a computer system that is composed of a microprocessor, a ROM, a RAM, a hard disk unit, a communication unit, an display unit, a keyboard, a mouse, and so on. The hard disk unit stores a computer program. The manufacturing apparatus 1300 achieves its functions by the microprocessor operating according to the computer program.

The manufacturing apparatus 1300 is connected to the Internet 1010.

As described earlier, the manufacturing apparatus 1300 is possessed by the computer manufacturer. In the manufacturing process for the computer unit 1900, the computer manufacturer connects the manufacturing apparatus 1300 and the computer unit 1900.

The manufacturing apparatus 1300 obtains the disclosed manufacturing number and driver public key via the Internet 1010, and writes the obtained manufacturing number and driver public key to an information storage unit 1901 (described later) in the computer unit 1900.

7.3 Certificate Authority Apparatus 1100

Figure 54:
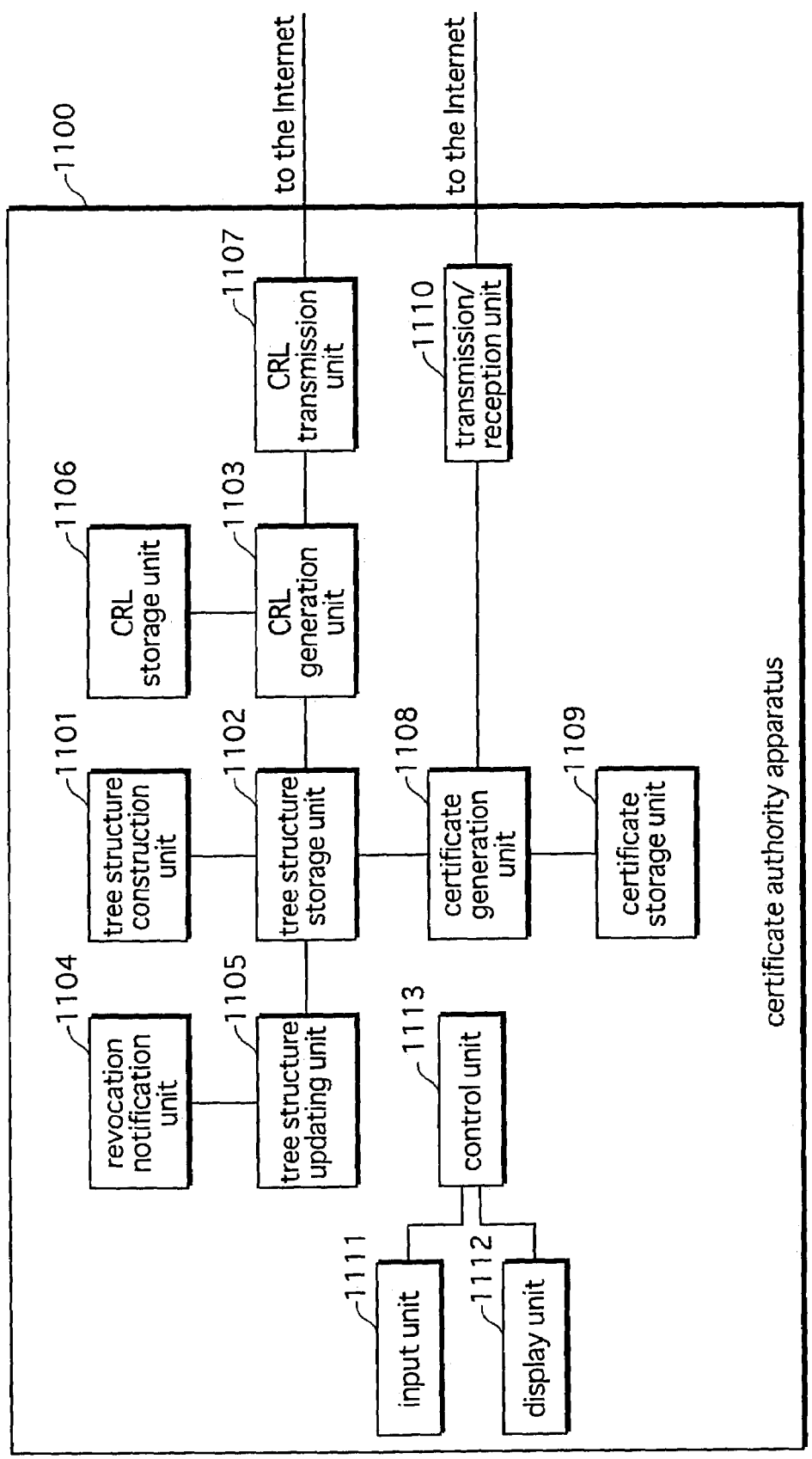
FIG. 54 is a block diagram showing the structure of a certificate authority apparatus 1100.

As shown in FIG. 54, the certificate authority apparatus 1100 is composed of a tree structure construction unit 1101, a tree structure storage unit 1102, a CRL generation unit 1103, a revocation notification unit 1104, a tree structure updating unit 1105, a CRL storage unit 1106, a CRL transmission unit 1107, a certificate generation unit 1108, a certificate storage unit 1109, a transmission/reception unit 1110, an input unit 1111, a display unit 1112, and a control unit 1113.

This apparatus is, specifically, a computer system that is composed of a microprocessor, a ROM, a RAM, and so on. The certificate authority apparatus 1100 achieves its functions by the microprocessor operating according to a computer program.

The certificate authority apparatus 1100 has a similar structure to the key manufacturing apparatus 100. The following description focuses on features of the certificate authority apparatus 1100 that differ from the key manufacturing apparatus 100.

(1) Tree Structure Storage Unit 1102

The tree structure storage unit 1102 has a tree structure table D1100 (not illustrated) that is similar to the tree structure table D100 in the tree structure storage unit 102.

The tree structure table D1100 corresponds to a tree structure T1100 (not illustrated).

<Tree Structure T1100>

The tree structure T1100 is a binary tree that has five layers: layer 0 through to layer 4, and is the same tree structure as the tree structure T100 shown in FIG. 4. The tree structure T1100 is used for managing public key certificate IDs.

On the other hand, the tree structure T100 is used for managing device keys, as described earlier. In this way, the tree structure T1100 and the tree structure T100 differ in purpose of usage. The structure itself of the tree structure T1100 is the same as that of the tree structure T100, and therefore a detailed description is omitted here.

<Tree Structure Table D1100>

The tree structure table D1100 includes an area for storing pieces of node information equal in number to the nodes in the tree structure T1100. Each piece of node information corresponds to one of the nodes in the tree structure T1100.

Each piece of node information that corresponds to a node, other than leaves, in the tree structure table D1100 includes a node name and a revocation flag. Each piece of node information that corresponds to a leaf includes a node name, a driver public key and a revocation flag. Here, the driver public key has been received from the manufacturing apparatus 1200, as described later.

Note that, as described earlier, each piece of node information included in the tree structure table D100 includes a node name, a device key and a revocation flag. On the other hand, each piece of node information included in the tree structure table D1100 includes a node name and a revocation flag, or includes a node name, a driver public key and a revocation flag.

The tree structure table D1100 and the tree structure D100 differ in this regard, but are otherwise identical. Consequently, a detailed description of the tree structure table D1100 is omitted here.

(2) Tree Structure Construction Unit 1101

The tree structure construction unit 1101 has a similar structure to the tree structure construction unit 101.

In the same manner as the tree structure construction unit 101, the tree structure construction unit 1101 constructs an n-ary tree data structure for managing public key certificate IDs, and stores the constructed tree structure in the tree structure storage unit 1102. Specifically, in the same manner as the tree structure construction unit 101, the tree structure construction unit 1101 generates a node name for each piece of node information in the tree structure table D1100, and writes each generated node name in the corresponding piece of node information.

In this way, at the point where the tree structure construction unit 1101 has finished constructing the tree structure, each piece of node information in the tree structure table D1100 includes only the node name.

Note that the difference between the tree structure construction unit 101 and the tree structure construction unit 1101 is that while the tree structure construction unit 101 generates a device key from each node in the tree structure and writes the generated device key in correspondence with the node in the tree structure table, the tree structure construction unit 1101 does not generate device keys or write device keys to the tree structure table.

(3) Certificate Storage Unit 1109

The certificate storage unit 1109 includes an area for storing at least one public key certificate (described later).

(4) Certificate Generation Unit 1108

The certificate generation unit 1108 receives a public key certificate issue request, a driver public key and a validity period from the manufacturing apparatus 1200 via the Internet 1010 and the transmission/reception unit 1110. The public key certificate issue request shows a request to issue a public key certificate.

On receiving the public key certificate issue request, the driver public key and the validity period, the certificate generation unit 1108 selects one piece of node information that corresponds to a leaf in the tree structure table D1100 stored in the tree structure storage unit 1102 and that does not include a driver public key, and writes the received driver public key in the selected piece of node information.

Furthermore, the certificate generation unit 1108 extracts the node name from the selected piece of node information. Here, the extracted node name is made to be the certificate ID that identifies the public key certificate corresponding to the received driver public key.

In this way, the certificate generation unit 1108 generates a certificate ID for the public key corresponding to the received driver public key. Next, the certificate generation unit 1108 generates a public key certificate composed of the generated certificate ID, the received validity period and the received driver public key.

Next, the certificate generation unit 1108 applies a digital signature SIG to the generated public key certificate using a certificate authority secret key held in secret and only by the certificate authority apparatus 1100, to generate certificate signature data.

Here, the digital signature SIG is a digital signature algorithm that uses ElGamal encryption on an elliptic curve. The security of the ElGamal encryption on the elliptic curve is based on a discrete logarithm problem on the elliptic curve.

Next, the certificate generation unit 1108 transmits the generated public key certificate and certificate signature data to the manufacturing apparatus 1200 via the transmission/reception unit 1110 and the Internet 1010. Furthermore, the certificate generation unit 1108 writes the generated public key certificate to the certificate storage unit 1109.

(5) Revocation Notification Unit 1104

Suppose that the set of the driver secret key and the driver public key are exposed illegally by a third party. In this case, the corresponding public key certificate must be revoked.

When the manager of the certificate authority apparatus 1100 discovers the certificate ID of the public key certificate to the revoked, the revocation notification unit 1104 obtains the certificate ID of the public key certificate to the revoked via the input unit 1111 according to an operation by the manager, and outputs the obtained certificate ID to the tree structure updating unit 1105.

(6) Tree Structure Updating Unit 1105

The tree structure updating unit 1105 receives the certificate ID from the revocation notification unit 1104.

On receiving the certificate ID, the tree structure updating unit 1105 updates the tree structure table D1100 in the same manner as the tree structure updating unit 105.

Note that "ID information" in the earlier description of the tree structure updating unit 105 should be read as "certificate ID" in regard to the tree structure updating unit 1105.

In this way, in the same manner as the tree structure updating unit 105, the tree structure updating unit 1105 revokes all nodes on the path from the leaf showing the received certificate ID to the root in the tree structure D1100, based on the certificate ID received from the revocation notification unit 1104.

Supposing that certificate IDs shown by "0000", "1010" and "1011" in the tree structure D1100 are revoked, the tree structure whose nodes are revoked by the tree structure updating unit 1105 in the described manner will be as shown in FIG. 5. In FIG. 5 each node marked with a cross (X) shows a revoked node.

(7) CRL Storage Unit 1106

The CRL storage unit 1106 includes an area for storing at least one CRL.

(8) CRL Generation Unit 1103

The CRL generation unit 1103 operates similarly to the key information header generation unit 106. As a result, the CRL generation unit 1103 generates a plurality of NRPs.

Figure 55:
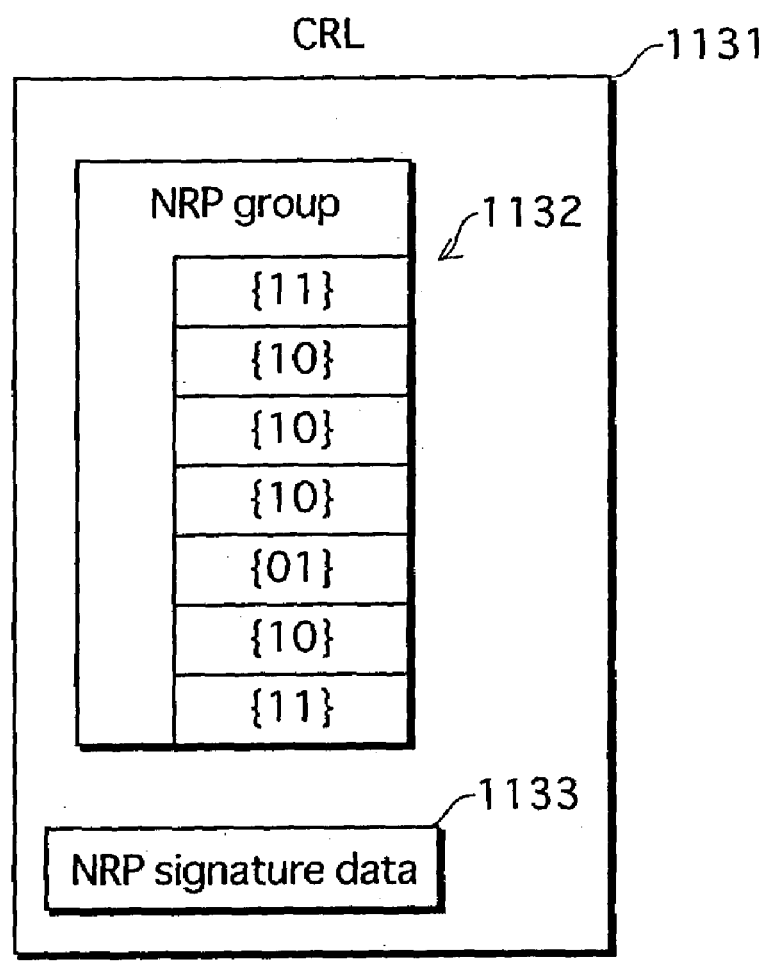
FIG. 55 is a data structure drawing showing one example of a CRL.

One example of the plurality of NRPs (hereinafter called an "NRP group") generated by the CRL generation unit 1103 are shown in FIG. 55. As shown in FIG. 55, the NRP group consists of NRPs {11}, {10}, {10}, {10}, {01}, {10}, and {11} arranged in the stated order.

Here, the contents of generated NRP group are the same as the header information D200 (shown in FIG. 6) generated by the key information header generation unit 106.

The operations of the CRL generation unit 1103 described so far are the same as the key information header generation unit 106.

Consequent operations by the CRL generation unit 1103 differ to the key information header generation unit 106. The CRL generation unit 1103 applies a digital signature SIG to the generated NRP group using the certificate authority key stored in secret and only by the certificate authority apparatus 1100, to generate NRP signature data, and generates a CRL that is made up of the NRP group and the generated NRP signature data.

FIG. 55 shows one example of a CRL. The CRL shown in FIG. 55 is composed of an NRP group 1132 and NRP signature data 1133.

Next, the CRL generation unit 1103 writes the generated CRL to the CRL storage unit 1106. In addition, the CRL generation unit 1103 transmits the generated CRL to the digital work recording apparatus 1400 via the CRL transmission unit 1107 and the Internet 1010.

(9) CRL Transmission Unit 1107

The CRL transmission unit 1107, which is connected to the Internet 1010, receives information from the CRL generation unit 1103, and transmits the received information to an external apparatus via the Internet 1010.

(10) Transmission/Reception Unit 1110

The transmission/reception unit 1110, which is connected to the Internet 1010, transmits and receives information between the certificate generation unit 1108 and an external apparatus connected to the Internet 1010.

(11) Control Unit 1113, Display Unit 1112, and Input Unit 1111

The control unit 1113 controls the various compositional elements of the certificate authority apparatus 1100.

The display unit 1112 displays various information under the control of the control unit 1113.

The input unit 1111 receives inputs from the operator of the certificate authority apparatus 1100.

7.4 Digital Work Recording Apparatus 1400

Figure 56:
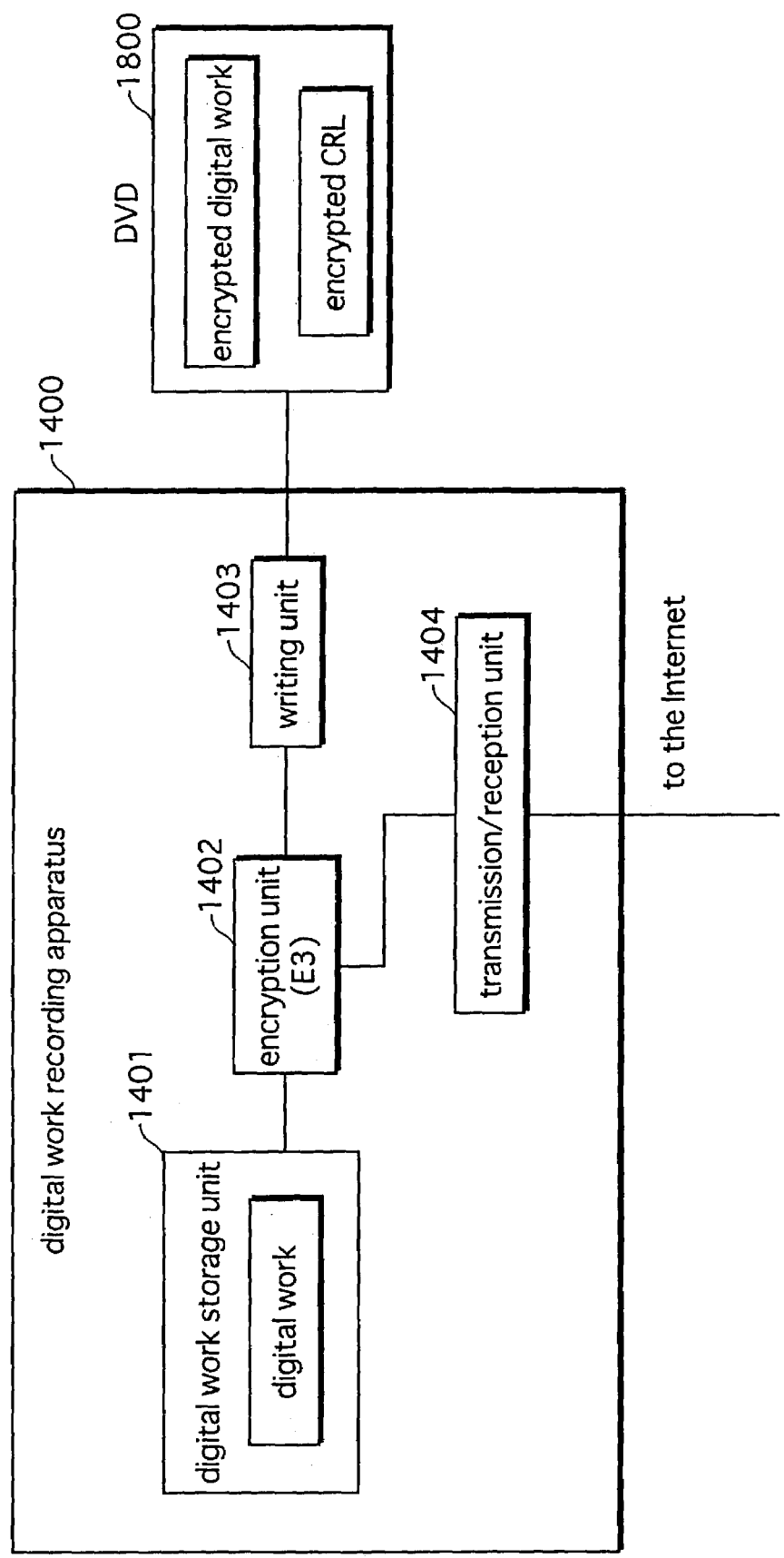
FIG. 56 is a block drawing showing the structure of a digital work recording apparatus 1400.

As shown in FIG. 56, the digital work recording apparatus 1400 is composed of a digital work storage unit 1401, an encryption unit 1402, a writing unit 1403, and a transmission/reception unit 1404. The digital work recording apparatus 1400 is a computer system composed of a microprocessor, a ROM, a RAM, and so on, and achieves its functions by the microprocessor operating according to a computer program.

(1) Digital Work Storage Unit 1401

The digital work storage unit 1401 stores a digital work in advance.

(2) Transmission/Reception Unit 1404

The transmission/reception unit 1404 is connected to the Internet 1010.

The transmission/reception unit 1404 receives a CRL from the certificate authority apparatus 1100 via the Internet 1010, and outputs the received CRL to the encryption unit 1402.

(3) Encryption Unit 1402

The encryption unit 1402 receives the CRL from the transmission/reception unit 1404.

Furthermore, the encryption unit 1402 reads the digital work from the digital work storage unit 1401, according to an operator instruction, and applies an encryption algorithm E3 to the read digital work and the received CRL, respectively, to generate an encrypted digital work and an encrypted CRL.

Here, the encryption algorithm E3 is a DES encryption algorithm.

Next, the encryption unit 1402 outputs the generated encrypted digital work and the encrypted CRL to the writing unit 1403.

(4) Writing Unit 1403

The writing unit 1403 receives the encrypted digital work and encrypted CRL from the encryption unit 1402, and writes the received encrypted digital work and encrypted CRL to the DVD 1800.

(5) Transmission/Reception Unit 1404

The transmission/reception unit 1404 is connected to the Internet 1010.

The transmission/reception unit 1404 receives information via the Internet 1010 from an external apparatus, and outputs the received information to the encryption unit 1402.

7.5 Computer Unit 1900

Figure 57:
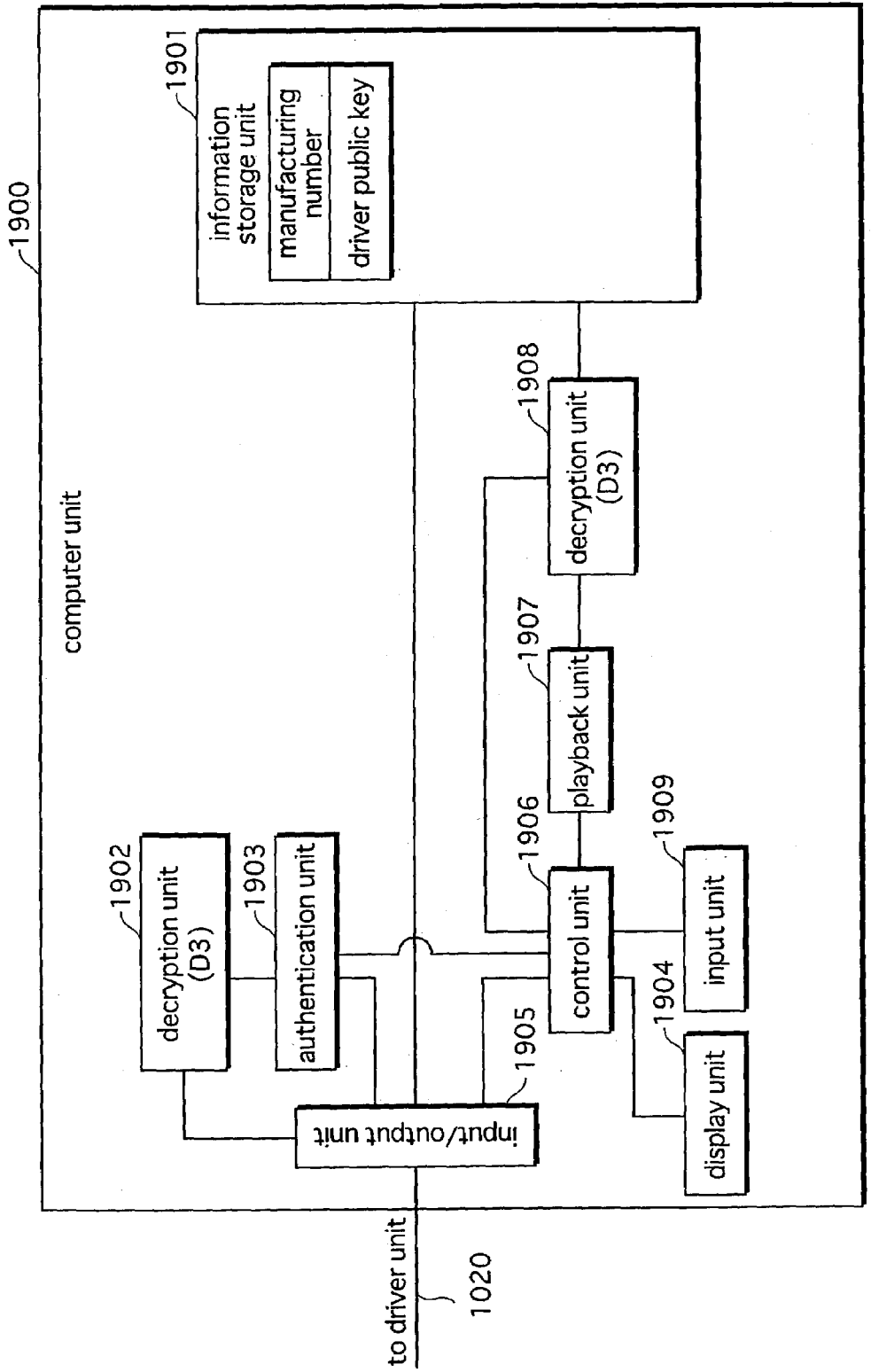
FIG. 57 is a block diagram showing the structure of a computer unit 1900.

As shown in FIG. 57, the computer unit 1900 is composed of an information storage unit 1901, a decryption unit 1902, an authentication unit 1903, a display unit 1904, an input/output unit 1905, a control unit 1906, a playback unit 1907, a decryption unit 1908, and an input unit 1909.

The computer unit 1900 is a computer system composed specifically of a microprocessor, a ROM, a RAM, a hard disk unit, a display unit, keyboard, a mouse and so on. A computer program is stored in the RAM or the hard disk unit. The computer unit 1900 achieves its functions by the microprocessor operating according to the computer program.

(1) Information Storage Unit 1901

As shown as one example in FIG. 57, the information storage unit 1901 includes an area for storing a manufacturing number and a driver public key.

As described earlier, during the process by the computer manufacturer for manufacturing the computer unit 1900, the manufacturing apparatus 1300 and the computer unit 1900 are connected, and the manufacturing apparatus 1300 writes the manufacturing number and the driver public key to the information storage unit 1901.

The manufacturing number is identification information for identifying the driver unit 1600, and the driver public key is a public key generated to correspond to the driver unit 1600.

(2) Control Unit 1906

The control unit 1906 outputs a CRL read instruction showing reading of the CRL to the driver unit 1600 via the input/output unit 1905.

The control unit 1906 receives either success information showing that verification of the NRP group has succeeded, or failure information showing that verification of the NRP group has failed. On receiving success information, the control unit 1906 further receives the NRP group from the authentication unit 1903.

On receiving failure information, the control unit 1906 outputs a message showing verification failure to the display unit 1904, and controls so that the display unit 1904 displays the message. The control unit 1906 then stops access to the DVD by the driver unit 1600.

When the control unit 1906 receives success information, the control unit 1906 requests the public key certificate from the driver unit 1600 via the input/output unit 1905.

<Revocation Judgement>

Next, the control unit 1906 receives the public key certificate from the driver unit 1600, extracts the certificate ID from the received public key information, and judges, in the following manner, whether the public key certificate is revoked, using the extracted certificate ID and the NRP group received from the authentication unit 1903.

The control unit 1906 judges whether the public key certificate is revoked, in a similar manner to the specification unit 303 is the first embodiment. Note that the difference between the specification unit 303 and the control unit 1906 is that while the specification unit 303 operates in order to specify an encrypted media key, the control unit 1906 operates in order to judge whether a public key certificate is revoked.

The following description describes the operations by the control unit 1906 for judging whether a public key certificate is revoked, focusing on the operations that differ from the specification unit 303.

The control unit 1906 judges whether a public key certificate is revoked, according to the operations shown in the flowchart in FIG. 17.

The control unit 1906 has a variable A that shows the position of the NRP relating to a certificate ID, a variable W that shows the number of NRPs in a layer, and a value D that shows the number of layers in the tree structure. Here, an NRP relating to a certificate ID denotes an NRP of a node in the tree structure that is on the path from the leaf assigned to the certificate ID through to the root. Note that unlike the specification unit 303, the control unit 1906 does not have the variable X that shows the position of an encrypted media key.

When the judgement is negative at step S302 in the flowchart in FIG. 17, the control unit 1906 considers the public key certificate to be revoked.

Furthermore, when B is judged to be equal to 0 at step S303 in the flowchart in FIG. 17, the control unit 1906 judges the public key certificate to be valid (i.e., not revoked). Note that the control unit 1906 does nothing at step S307.

In this way, the control unit 1906 judges whether the public key certificate in revoked, and when the judgement is positive, the control unit 1906 outputs a message showing that the public key certificate is revoked to the display unit 1904, and controls so that the display unit 1904 displays the message. The control unit 1906 then stops access to the DVD by the driver unit 1600.

On the other hand, when the public key certificate is judged to be valid, the control unit 1906 generates a random number R, outputs the generated random number R to the driver unit 1600 via the input/output unit 1905, and receives authentication signature data from the driver unit 1600.

The control unit 1906 reads the driver public key from the information storage unit 1901, and applies a verification algorithm VER to the generated random number R and the received authentication signature data, using the read driver public key, to verify the driver unit 1600.

Here, the verification algorithm VER corresponds to the above-described digital signature SIG, and verifies according to the signature data generated by a digital signature SIG.

When verification fails, the control unit 1906 outputs a message showing that the driver unit 1600 is illegal to the display unit 1904, and controls so that the display unit 1904 displays the message. The control unit 1906 then stops access to the DVD by the driver unit 1600.

When verification is successful, the control unit 1906 outputs a digital work read instruction to the driver unit 1600 via the input/output unit 1905.

Next, the control unit 1906 receives the encrypted digital work form the driver unit 1600 via the input/output unit 1905, and outputs the received digital work to the decryption unit 1908.

(3) Decryption Unit 1902

The decryption unit 1902 receives the encrypted CRL from the driver unit 1600 via the input/output unit 1905, applies a decryption algorithm D3 to the received encrypted CRL to generate the NRP group and NRP signature data, and outputs the generated NRP group and NRP signature data to the authentication unit 1903.

(4) Authentication Unit 1903

The authentication unit 1903 stores a certificate authority public key that is distributed in advance by the certificate authority apparatus 1100. The certificate authority public key corresponds to the certificate authority key described earlier, and is generated based on the certificate authority secret key, using a public key encryption method public key generation algorithm.

The authentication unit 1903 receives the NRP group and the NRP signature data from the decryption unit 1902, and verifies the NRP group by applying a digital signature verification algorithm VER to the NRP group and the NRP signature data, using the certificate authority public key.

Here, the verification algorithm VER corresponds to the digital signature SIG described earlier, and verifies according to the signature data generated by the digital signature SIG.

When the result of verification shows the NRP group to be legal, in other words, when the verification is successful, the authentication unit 1903 outputs success information showing that verification has been successful to the control unit 1906. In this case, the authentication unit 1903 further outputs the NRP group to the control unit 1906. On the other hand, when the result of verification shows the NRP group to be illegal, in other words, when the verification fails, the authentication unit 1903 outputs failure information showing that verification has failed to the control unit 1906.

(5) Decryption Unit 1908

The decryption unit 1902 receives the encrypted digital work from the control unit 1906 applies a decryption algorithm D3 to the received encrypted digital work, to generate a digital work, and outputs the generated digital work to the playback unit 1907.

(6) Playback Unit 1907

The playback unit 1907 receives the digital work form the decryption unit 1902, plays back the digital work, and outputs the played back digital work.

(7) Display Unit 1904

The display unit 1904 receives the message from the control unit 1906, and displays the received message under the control of the control unit 1906.

(8) Input Unit 1909

The input unit 1909 receives inputs from an operator.

7.6 Driver Unit 1600

Figure 58:
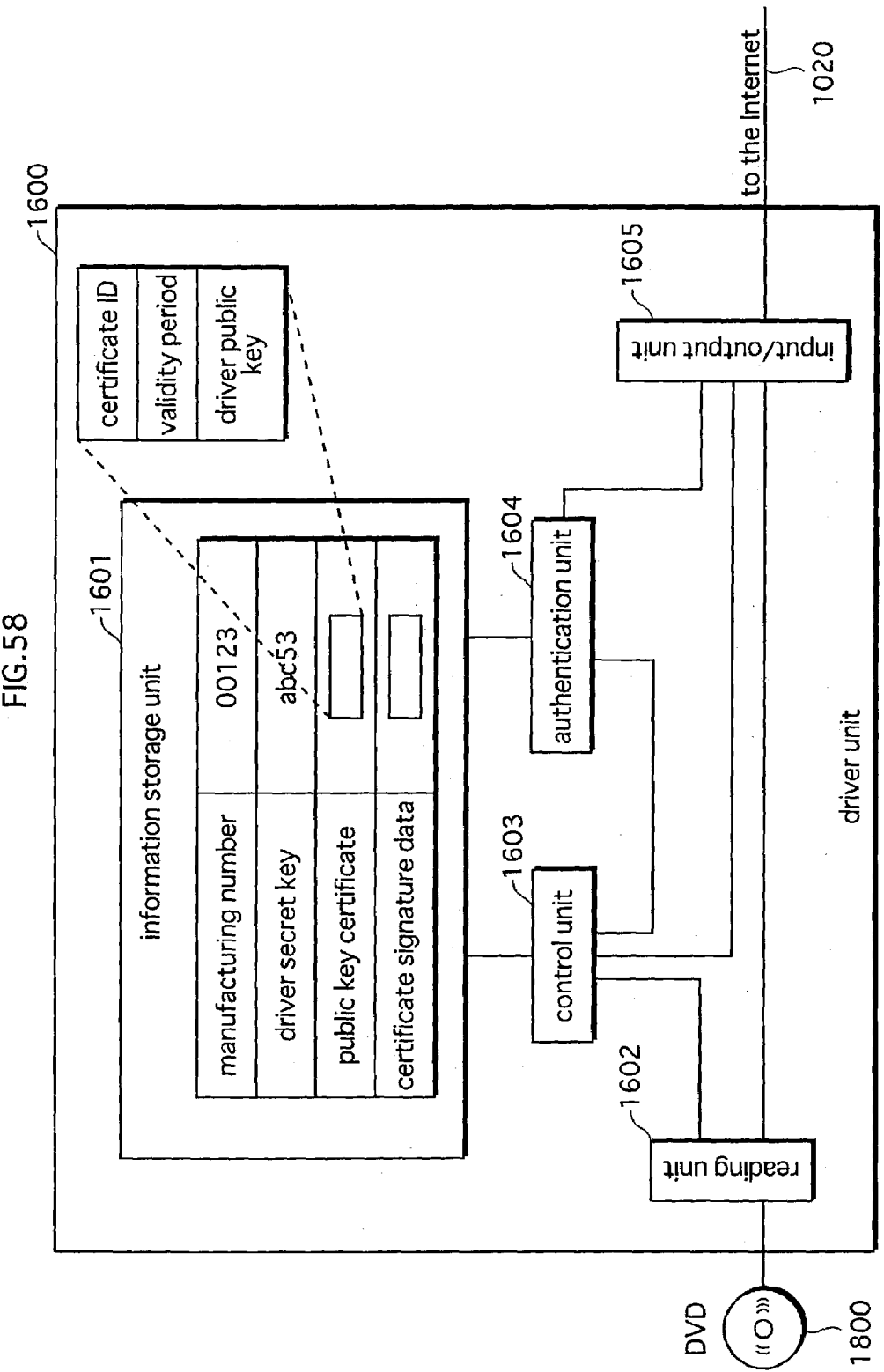
FIG. 58 is a block diagram showing the structure of a driver unit 1600.

As shown in FIG. 58, the driver unit 1600 is composed of an information storage unit 1601, a reading unit 1602, a control unit 1603, an authentication unit 1604, and an input/output unit 1605.

(1) Information Storage Unit 1601

As shown in FIG. 58, the information storage unit 1601 includes an area for storing a manufacturing number, a driver secret key, a public key certificate, and certificate signature data.

As described earlier, during the process by the driver manufacturer for manufacturing the driver unit 1600, the manufacturing apparatus 1200 and the driver unit 1600 are connected, and the manufacturing apparatus 1200 writes the manufacturing number, the driver secret key, the public key certificate, and the certificate signature data to the information storage unit 1601.

The manufacturing number, the driver secret key, the public key certificate, and the certificate signature data are as described earlier, and are therefore not described here.

(2) Control Unit 1603

The control unit 1603 receives a CRL read instruction, a public key certificate request, a random number R, and a digital work read request from the computer unit 1900 via the input/output unit 1605.

On receiving the CRL read request, the control unit 1603 reads the encrypted CRL from the DVD 1800 via the reading unit 1602, and outputs the read encrypted CRL to the computer unit 1900 via the input/output unit 1605.

On receiving the public key certificate request, the control unit 1603 reads the public key certificate from the information storage unit 1601, and outputs the read public key certificate to the computer unit 1900 via the input/output unit 1605.

On receiving the random number R, the control unit 1603 outputs the received random number R to the authentication unit 1604, and controls so that the authentication unit 1604 generates authentication signature data.

On receiving the digital work read request, the control unit 1603 reads the encrypted digital work from the DVD 1800 from the reading unit 1602, and outputs the read encrypted digital work to the computer unit 1900 via the input/output unit 1605.

Next, the control unit 1603 receives the authentication signature data from the authentication unit 1604, and outputs the received authentication signature data to the computer unit 1900 via the input/output unit 1605.

(3) Authentication Unit 1604

The authentication unit 1604 receives the random number R from the control unit 1603. Under the control of the control unit 1603, the authentication unit 1604 reads the driver secret key from the information storage unit 1601, applies the digital signature SIG to the received random number R using the read driver secret key, to generate authentication signature data, and outputs the generated authentication signature data to the control unit 1603.

(4) Reading Unit 1602

The reading unit 1602 reads information from the DVD 1800, and outputs the read information to the control unit 1603, under the control of the control unit 1603.

(5) Input/Output Unit 1605

The input/output unit 1605 transits and receives information between the control unit 1603 and the computer 1900, under the control of the control unit 1603.

7.7 Operations of the Authentication System 1000

(1) Operations by the Manufacturing Apparatus 1200 and the Manufacturing Apparatus 1300

Figure 59:
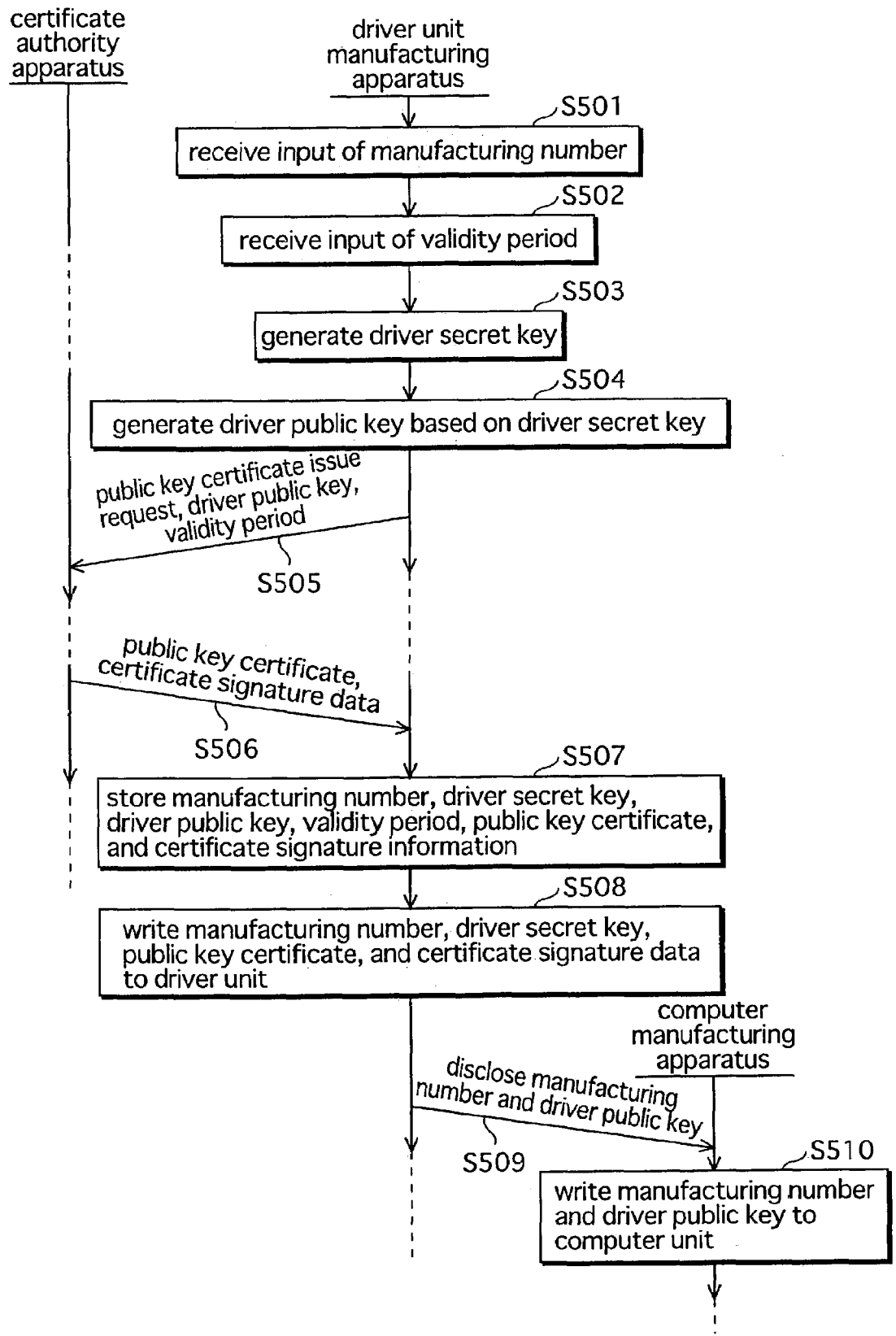
FIG. 59 is a flowchart showing operations of the manufacturing apparatus 1200 and a manufacturing apparatus 1300.

The following describes operations by the manufacturing apparatus 1200 and the manufacturing apparatus 1300 with use of the flowchart in FIG. 59.

The input unit 1202 receives an input of the manufacturing number of the driver unit 1600 from the operator of manufacturing apparatus 1200, and the control unit 1204 receives the manufacturing number from the input unit 1202 (step S501). Next, the input unit 1202 receives an input of a validity period from the operator of the manufacturing apparatus 1200, and outputs the received validity period to the control unit 1204. The control unit 1204 receives the validity period from the input unit 1202 (step S502).

Next, the control unit 1204 generates a random number, and generates a driver secret key based on the generated random number (step S503). The control unit 1204 then generates a driver public key based on the generated driver secret key, using an RSA public key encryption technique (step S504).

Next, the control unit 1204 outputs the generated driver public key, the received validity period, and a public key certificate issue request showing a request to issue a public key certificate to the certificate authority apparatus 1100 via the communication unit 1206 and the Internet 1010 (step S505).

Next, the control unit 1204 receives the public key certificate and the certificate signature data from the certificate authority apparatus 1100 via the Internet 1010 and the communication unit 1206 (step S506), generates manufacturing information made up of the manufacturing number, the driver secret key, the driver public key, the validity period, the public key certificate, and the certificate signature data, and writes the generated manufacturing information to the manufacturing information table 1211 in the information storage unit 1200 (step S507).

Furthermore, the control unit 1204 outputs the manufacturing number., the driver secret key, the public key certificate, and the certificate signature data to the writing unit 1205, and the writing unit 1205 writes the received manufacturing number, driver secret key, public key certificate, and certificate signature data to the information storage unit 1601 in the driver unit 1600 (step S508).

In addition, the control unit 1204 discloses the manufacturing number and the driver public key via the communication unit 1206 and the Internet 1010 (step S509).

The manufacturing apparatus 1300 obtains the disclosed manufacturing apparatus and driver public key via the Internet 1010 (step S509), and writes the obtained manufacturing number and driver public key to the information storage unit 1901 in the computer unit 1900 (step S510).

Figure 60:
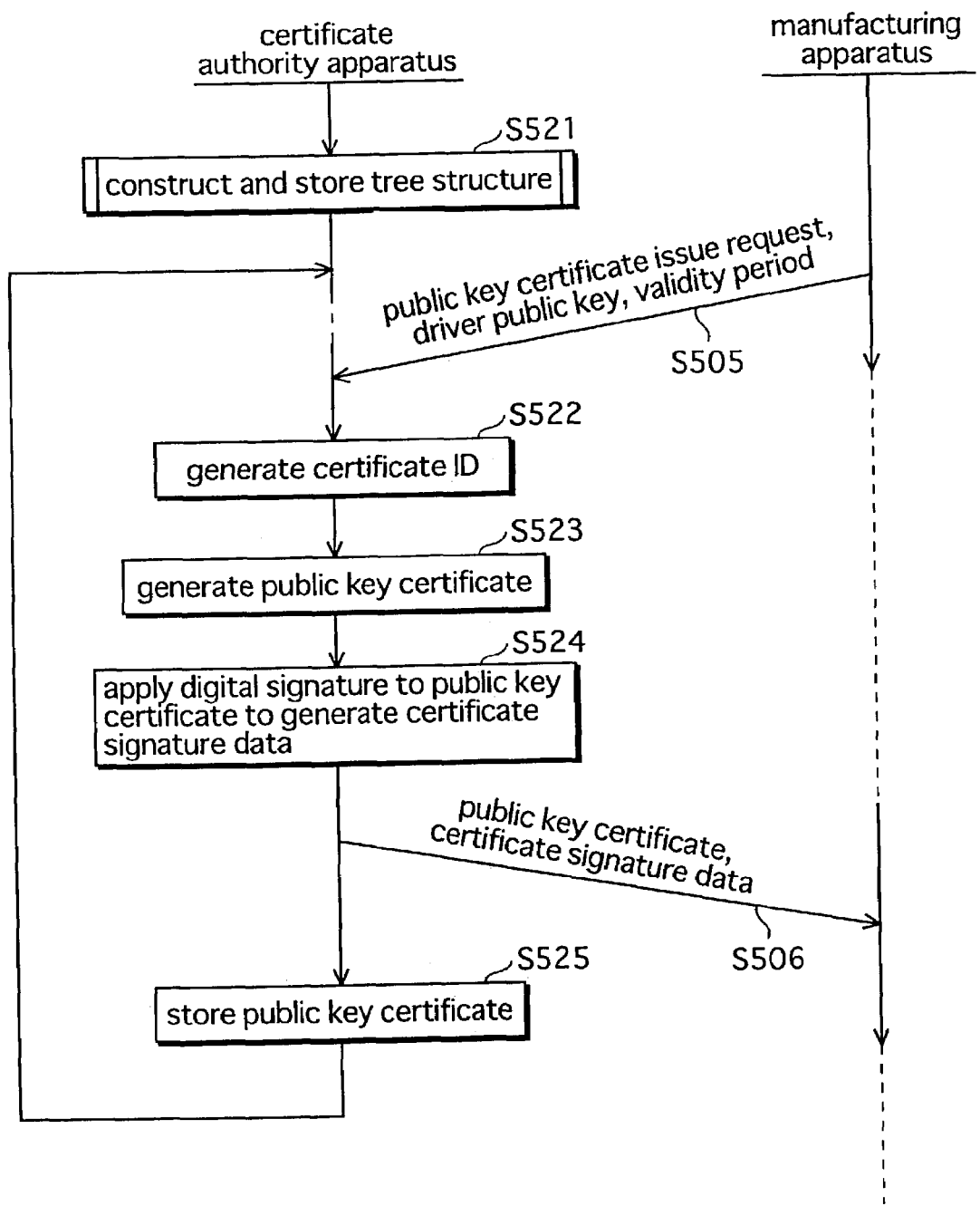
FIG. 60 is a flowchart showing operations by the certificate authority apparatus 1100 for issuing a public key certificate.

(2) Operations by the Certificate Authority Apparatus 1100 for Issuing a Public Key Certificate The following describes operations by the certificate authority apparatus 1100 for issuing a public key certificate, with use of the flowchart in FIG. 60.

The tree structure construction unit 1101 constructs an n-ary tree data structure for managing public key certificate IDs in the same manner as the tree structure construction unit 101, and stores the constructed tree structure in the tree structure storage unit 1102 (step S521).

The certificate generation unit 1108 receives a public key certificate issue request showing a request to issue a public key certificate, a driver public key, and a validity period from the manufacturing apparatus 1200 via the Internet 1010a and the transmission/reception unit 1110 (step S505).

Next, the certificate generation unit 1108 selects one piece of node information that corresponds to a leaf in the tree structure table D1100 stored in the tree structure storage unit 1102 that does not include a driver public key, writes the received driver public key in the selected piece of node information, and extract the node name from the selected piece of node information. Here, the extracted node name is a certificate ID that identifies a public key certificate (step S522). Next, the certificate generation unit 1108 generates a public key certificate made up of the generated certificate ID, the received validity period, and the received driver public key (step S523), and, in addition, applies a digital signature SIG to the generated public key certificate, using the certificate authority secret key held secretly by only the certificate authority apparatus 1100, to generate certificate signature data (step S524).

Next, the certificate generation unit 1108 transmits the generated public key certificate and certificate signature data to the manufacturing apparatus 1200 via the transmission/reception unit 1110 and the Internet 1010 (step S506), and writes the generated public key certificate to the certificate storage unit 1109 (step S525). The certificate generation unit 1108 then returns to step S505 to repeat the processing.

Figure 61:
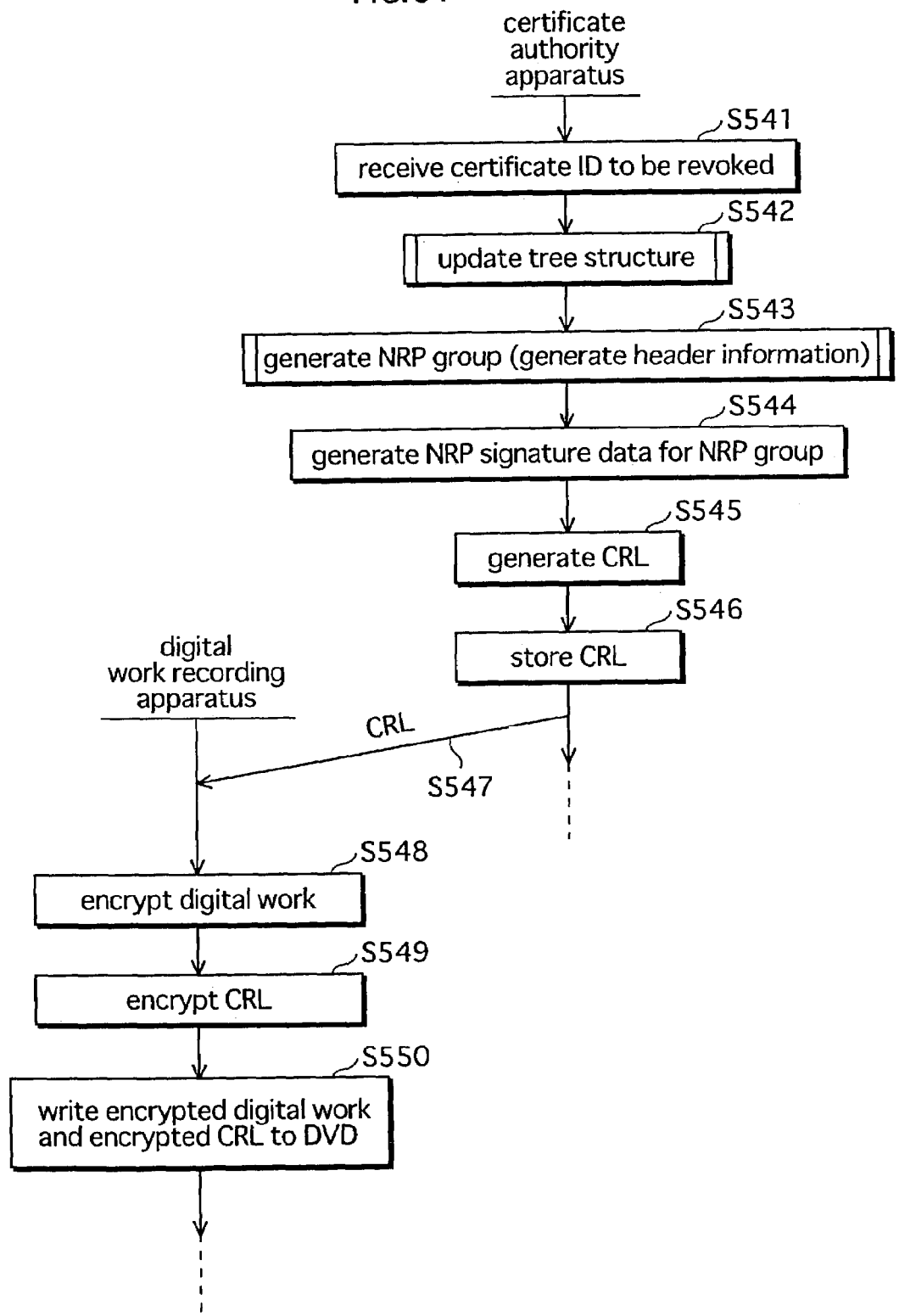
FIG. 61 is a flowchart showing operations by the certificate authority apparatus 1100 for issuing a CRL.

(3) Operations by the Certificate Authority Apparatus 1100 for Issuing a CRL The following describes operations by the certificate authority apparatus 1100 for issuing a CRL, with use of the flowchart in FIG. 61.

On the manager of the certificate authority apparatus 1100 discovering a certificate ID of a public key certificate to be revoked, the revocation notification unit 1104 obtains the certificate ID of the public key certificate to be revoked, via the input unit 1111 according to an operation by the manager, and outputs the obtained certificate ID to the tree structure updating unit 1105 (step S541).

Next, the tree structure updating unit 1105 receives the certificate ID from the revocation notification unit 1104, and updates the tree structure table D1100 in the same manner as the tree structure updating unit 105 (step S542). Next, the CRL generation unit 1103 generates an NRP group in the same manner as the key information header generation unit 106 (step S543).

Next, the CRL generation unit 1103 applies a digital signature SIG to the generated NRP group using the certificate authority secret key that is stored in secret only by the certificate authority apparatus 1100, to generate NRP signature data (step S544), generates a CRL made up of the NRP group and the generated NRP signature data (step S545), and writes the generated CRL to the CRL storage unit 1106 (step S546). Next, the CRL generation unit 1103 transmits the generated CRL to the digital work recording apparatus 1400 via the CRL transmission unit 1107 and the Internet 1010 (step S547).

The transmission/reception unit 1404 in the digital work recording apparatus 1400 receives the CRL from the certificate authority apparatus 1100 via the Internet 1010, outputs the received CRL to the encryption unit 1402, and the encryption unit 1402 receives the CRL from the transmission/reception unit 1404 (step S547).

Next, the encryption unit 1402 reads the digital work form the digital work storage unit 1401 according to an instruction from the operator, and applies the encryption algorithm E3 to the read digital work, to generate an encrypted digital work (step S548). The encryption unit 1402 then applies the encryption algorithm E3 to the received CRL, to generate an encrypted CRL (step S549).

Next, the encryption unit 1402 outputs the generated encrypted work and encrypted CRL to the writing unit 1403 (step S550).

(4) Operations by the Computer Unit 1900 and the Driver Unit 1600

Figure 62:
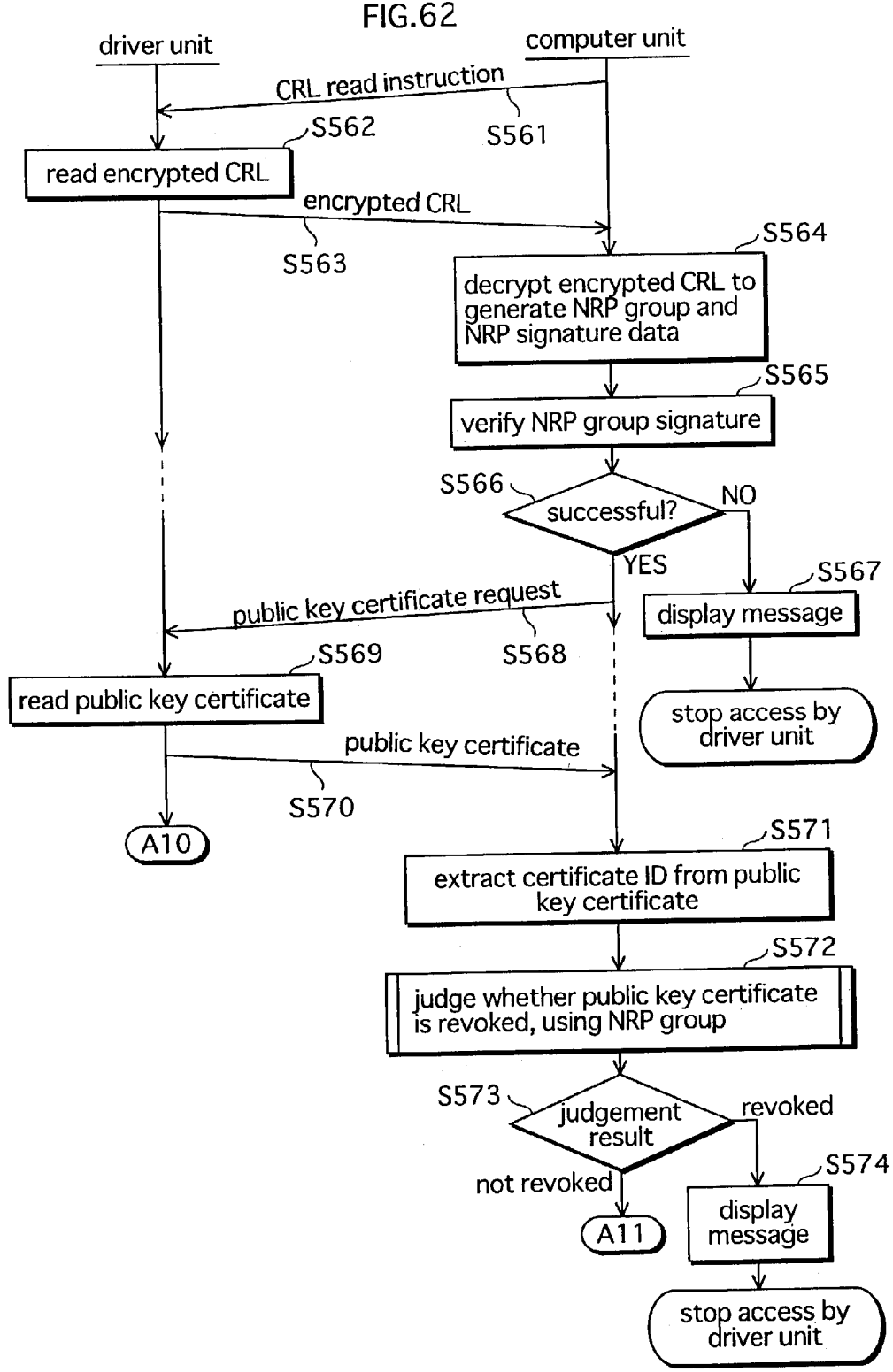
FIG. 62 is a flowchart showing operations by the computer unit 1900 and the driver unit 1600, and continues in FIG. 63.
Figure 63:
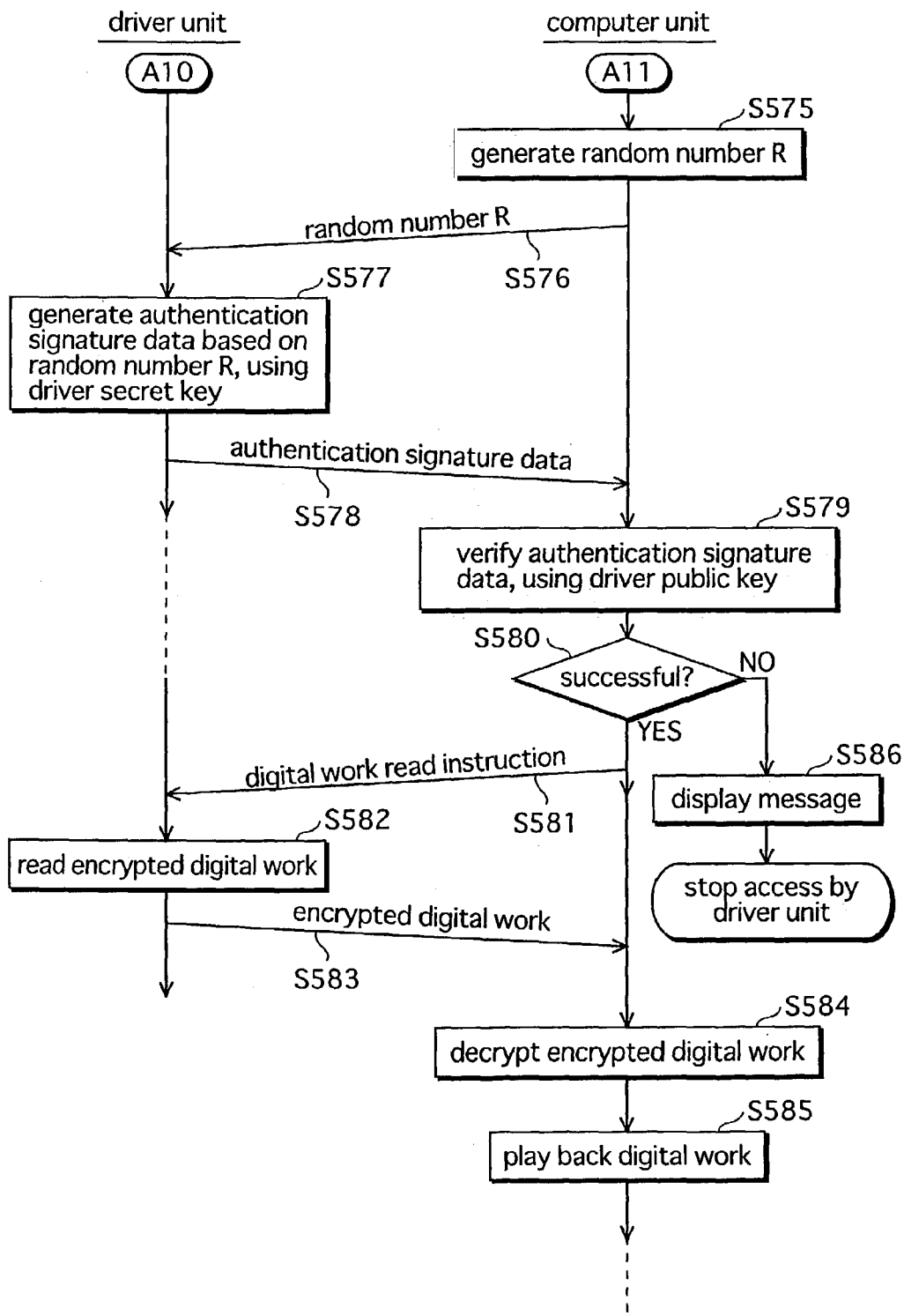
FIG. 63 is a flowchart showing operations by the computer unit 1900 and the driver unit 1600, and continues from FIG. 62.

The following describes operations by the computer unit 1900 and the driver unit 1600, with use of the flowcharts in FIGS. 62 and 63.

The control unit 1906 in the computer unit 1900 outputs a CRL read instruction that shows reading of a CRL to the driver unit 1600, and the control unit 1603 of the driver unit 1600 receives the read instruction from the computer unit 1900 via the input/output unit 1605 (step S561).

Next, the control unit 1603 reads the encrypted CRL from the DVD 1800 via the reading unit 1602 (step S562), and outputs the read encrypted CRL to the computer unit 1900 via the input/output unit 1605 (step S563).

Next, the decryption unit 1902 receives the encrypted CRL from the driver unit 1600 via the input/output unit 1905 (step S563), and applies a decryption algorithm D3 to the received encrypted CRL, to generate an NRP group and NRP signature data, and outputs the generated NRP group and NRP signature data to the authentication unit 1903 (step S564).

The authentication unit 1903 receives the NRP group and the NRP signature data from the decryption unit 1902, applies a digital signature verification algorithm VER to the NRP group and the NRP signature data, using the certificate authority public key, and verifies the NRP group. The authentication unit 1903 then outputs either success information or failure information to the control unit 1906, and in the case of outputting success information, further outputs the NRP group to the control unit 1906 (step S565).

Next, when failure information is received (step S566), the control unit 1906 outputs a message showing verification failure to the display unit 1904, and controls so that the display unit 1904 displays the message (step S567). The control unit 1906 then stops access to the DVD by the driver unit 1600.

When success information is received (step S566), the control unit 1906 further requests the public key certificate from the driver unit 1600 via the input/output unit 1905 (step 568).

The control unit 1603 receives the public key certificate request from the computer unit 1900 via the input/output unit 1605 (step S568), reads the public key certificate form the information storage unit 1601 (step S569), and outputs the read public key certificate to the computer unit 1900 via the input/output unit 1605 (step S570).

Next, the control unit 1906 receives the public key certificate from the driver unit 1600 (step S570), extracts the certificate ID from the received public key information (step S571), and judges whether the public key certificate is revoked, using the NRP group received from the authentication unit 1903 (step S572).

When the judgement is positive (step S573), the control unit 1906 outputs a message showing that the public key certificate is revoked to the display unit 1904, and controls so that the display unit 1904 displays the message (step S574). The control unit 1906 then stops access to the DVD by the driver unit 1600.

On the other hand, when the public key certificate is judged to be valid (step S573), the control unit 1906 generates a random number R (step S575), and outputs the generated random number R to the driver unit 1600 via the input/output unit 1905 (step S576).

The control unit 1603 receives the random number R from the input/output unit 1605 (step S576), outputs the received random number R to the authentication unit 1604, and controls so that the authentication unit 1604 generates authentication signature data. The authentication unit 1604 applies a digital signature SIG to the received random number R, to generate authentication signature data (step S577), and outputs the generated authentication signature data to the control unit 1603 (step S578).

The control unit 1906 receives the authentication signature date from the driver unit 1600 (step S578). Next, the control unit 1906 reads the driver public key from the information storage unit 1901, applies a verification algorithm VER to the generated random number R and the received authentication signature data, using the read driver public key, and verifies the driver unit 1600 (step S579).

On verification failing (step S580), the control unit 1906 outputs a message showing that the driver unit 1600 is illegal to the display unit 1904, and controls so that the display unit 1904 displays the message (step S586). The control unit 1906 then stops access to the DVD by the driver unit 1600.

On verification succeeding (step S580), the control unit 1906 outputs a digital work read instruction to the driver unit 1600 via the input/output unit 1905 (step S581).

The control unit 1603 receives the digital work read request form the computer unit 1900 via the input/output unit 1605 (step S581), reads the encrypted digital work from the DVD 1800 via the reading unit 1602 (step S582), and outputs the read encrypted digital work to the computer unit 1900 via the input/output unit 1605 (step S583).

Next, the control unit 1906 receives the encrypted digital work from the driver unit 1600 via the input/output unit 1905 (step S583), and outputs the received encrypted digital work to the decryption unit 1902. The decryption unit 1902 receives the encrypted digital work, applies a the decryption algorithm D3 to the received encrypted digital work, to generate a digital work, and outputs the generated digital work to the playback unit 1907 (step S584).

The playback unit 1907 receives the digital work from the decryption unit 1902, plays back the received digital work, and outputs the played back digital work (step S585).

7.8 Modifications

The techniques of the first embodiment are applied to the sixth embodiment as has been described. Specifically, the methods for generating header information and specifying an encrypted media key in the first embodiment are applied to CRL generation and public key certificate revocation judgement in the authentication system 1000 in the sixth embodiment.

Note that any of the second to fifth embodiments and modifications thereof may be applied to the sixth embodiment. Specifically, the methods for generating header information and specifying an encrypted media key in any of the second the fifth embodiments, and modifications thereof, may be applied to CRL generation and public key certificate revocation judging in the authentication system 1000 in the sixth embodiment.

When the second embodiment is applied to the sixth embodiment, the NRP of a node whose descendant nodes are all revoked is not limited to being expressed as "00". For example, "0" and "1" may be interchanged so that "11" expresses the aforementioned NRP. Furthermore, it is possible to add one bit to the NRP to express the aforementioned meaning.

Similarly, when the third embodiment is applied to the sixth embodiment, instead of expressing the NRP of a node whose descendants are all revoked as "00", it is possible to add one bit to express the aforementioned meaning.

Furthermore, when there are no revoked public key certificates, the CRL may be generated to include information to that effect.

7.9 Conclusion

The present invention is an authentication system that uses public key encryption, and is composed of a terminal that has a public key encryption algorithm secret key and public key, and certifies its legality to an opposite party with use of the secret key; a public key certificate issuing apparatus that issues and distributes a public key certificate for data composed of at least the public key of the terminal; a revocation list generation apparatus that issues and distributes a public key revocation list that specifies the public key certificate issued by the public key certificate issuing apparatus to the terminal which is to be revoked; a revocation list usage apparatus that receives the public key certificate of an opposite party terminal to be verified and the public key certificate revocation list, and judges whether the public key certificate is registered in the public key certificate revocation list; and a verification apparatus that verifies the certification by the opposite party, with use of a public key judged by the revocation list usage apparatus to be valid.

The revocation list generation apparatus constructs and stores a tree structure composed of a plurality of levels, and allocates unique values that each identify a public key certificate of a different one of the terminals respectively to the leaves in the tree structure. Furthermore, when at least one descendant, which is a leaf, of a particular node in the stored tree corresponds to a unique value of a public key certificate to be revoked, the revocation list generation apparatus makes the node a revoked node, and allocates a node revocation pattern to the node that has at least one revoked child node. The node revocation pattern is generated by concatenating identifiers that each identify whether a different one of the child nodes is respectively revoked or not. The revocation list generation apparatus then generates a public key certificate revocation list in which all node revocation patterns in the tree structure are arranged based on a predetermined rule that traces all nodes in the tree structure.

The revocation list usage apparatus analyzes the public key revocation list based on the predetermined rule, and judges whether the public key certificate of the opposite party terminal to be verified is registered in the revocation list.

Furthermore, the present invention is a public key certificate issuing apparatus that issues and distributes a public key certificate for data that is composed of a public key of a terminal; and a revocation list generation apparatus that issues and distributes a public key certificate revocation list that specifies the public key certificate issued by the public key certificate issuing apparatus to the terminal which is revoked.

The revocation list generation apparatus constructs and stores a tree structure composed of a plurality of levels, and allocates unique values that each identify a public key certificate of a different one of the terminals respectively to the leaves in the tree structure. Furthermore, when at least one descendant, which is a leaf, of a particular node in the stored tree corresponds to a unique value of a public key certificate to be revoked, the revocation list generation apparatus makes the node a revoked node, and allocates a node revocation pattern to the node that has at least one revoked child node. The node revocation pattern is generated by concatenating identifiers that each identify whether a different one of the child nodes is respectively revoked or not. The revocation list generation apparatus then generates a public key certificate revocation list in which all node revocation patterns in the tree structure are arranged based on a predetermined rule that traces all nodes in the tree structure.

Furthermore, the present invention is a revocation list usage apparatus that receives a public key certificate of an opposite party terminal to be verified and a public key certificate revocation list, and judges whether the public key certificate is registered in the public key certificate revocation list.

The revocation list usage apparatus analyzes the public key revocation list based on the predetermined rule, and judges whether the public key certificate of the opposite party terminal to be verified is registered in the revocation list.

Here, the authentication system may use a communication medium as a means for distribution.

Here, the revocation list usage apparatus may use a communication medium as a means for distribution.

Here, the authentication system may use a recording medium as a means for distribution.

Here, the revocation list usage apparatus may use a recording medium as a means for distribution.

Here, the authentication system may assign a node revocation patterns to nodes whose descendant leaves are all revoked that distinguish the nodes from nodes whose descendant leaves are not all revoked.

Here, the revocation list generation apparatus may assign a node revocation patterns to nodes whose descendant leaves are all revoked that distinguish the nodes from nodes whose descendant leaves are not all revoked.

Here, the authentication system may form node revocation patterns by adding information expressing whether all descendants of a revoked node are revoked or not to the node revocation patterns.

Here, the revocation list generation apparatus may form node patterns by adding information expressing whether all descendants of a revoked node are revoked or not to the node revocation patterns.

Here, the authentication system may arrange the node revocation patterns based on a rule that starts from the root of the tree structure, giving priority to higher layers, and giving priority from the left to nodes within a same level.

Here, the revocation list generation apparatus may arrange the node revocation patterns based on a rule that starts from the root of the tree structure, giving priority to higher layers, and giving priority from the left to nodes within a same level.

Here, suppose that all the nodes in the tree structure are revoked. This tree structure is called is processed node collection. The authentication system newly adds unrevoked nodes to the tree structure in the following manner. Note that adding new nodes to the tree structure is referred to as extending. Considering a tree structure made up of a processed node collection as an initial state, child nodes are added to belong to nodes on the lowest layer of the tree structure. When there is a plurality of nodes on the lowest layer, child nodes are added with priority from the left. After extending the tree structure based on this extension rule, public key certificates are allocated to the nodes on the lowest layer, in other words, the leaves.

Here, when a public key certificate is revoked, the revocation list generation apparatus revokes all nodes on the path from the revoked node to the root. The revocation list generation apparatus arranges the node revocation patterns of the revoked nodes based on the extension rule.

Here, the revocation list usage apparatus analyzes the public key revocation list in which the node revocation pattern shave been arranged as described, based on the extension rule, and judges whether the public key certificate of an opposite party to be verified is registered in the revocation list.

8. Other Modifications (1) The present invention may be methods shown by the above. Furthermore, the methods may be a computer program realized by a computer, and may be a digital signal of the computer program.

Furthermore, the present invention may be a computer-readable recording medium apparatus such as a flexible disk, a hard disk, a CD-ROM (compact disk-read only memory), and MO (magneto-optical), a DVD-ROM (digital versatile disk-read only memory), a DVD RAM, or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

(2) The present invention may be any combination of the above-described embodiments and modifications.

9. Overall Conclusion

As has been clearly described, according to the disclosed first embodiment of the invention, arranging NRPs in level order as header information that is prerecorded on the recording medium enables key information and efficient specification by players of the encrypted media key to be decrypted.

Furthermore, according to the disclosed second embodiment, by adding one bit, as header information, to the head of NRPs to show whether the descendants of a node are all revoked apparatuses, the header information can be reduced in size in cases in which the revoked apparatuses occur in a particular part of the tree structure.

Furthermore, according to the disclosed third embodiment, the header information can be further reduced in size by judging according to a particular pattern whether all the descendants of a particular node are revoked apparatuses.

Furthermore, according to the disclosed fourth embodiment and fifth embodiment, it is possible to arrange the NRPs in orders other than that shown in the first to the third embodiments.

Furthermore, according to the invention disclosed in the sixth embodiment, the size of a CRL can be suppressed, even when the number of public key certificates to be revoked increases.

10. Effects of the invention

As has been described, the present invention is an authentication system including a revocation list generation apparatus and a revocation judgement apparatus, the revocation list generation apparatus generating a revocation list showing a revoked public key certificate, and the revocation judgement apparatus judging, with use of the revocation list, whether an obtained public key certificate is revoked, and, on judging that the obtained public key certificate is revoked, preventing use of a public key corresponding to the revoked public key certificate, wherein the revocation list generation apparatus includes: a tree system storage unit that has a plurality of nodes that compose a tree system, each leaf in the tree system being in correspondence with a different public key certificate, an identifier of each leaf identifying the corresponding public key certificate, at least one of the public key certificates being revoked, and all nodes on a path being revoked, the path being from a root to the leaf shown by the leaf identifier that identifies the revoked public key certificate; a revocation list generation unit operable to generate for each revoked node, excluding the leaves, revocation information showing whether each directly subordinate node of the revoked node is revoked or not, thereby obtaining a plurality of pieces of revocation information, and generate the revocation list by arranging the pieces of revocation information in an order relating to the structure of the tree system; and an output unit operable to output the generated revocation list, and the revocation judgement apparatus includes: a certificate obtaining unit operable to obtain a public key certificate identified by one of the leaf identifiers; a list obtaining unit operable to obtain the revocation list; and a judgement unit operable to attempt to construct a path from the root to a leaf identified by the leaf identifier, with use of the pieces of revocation information in the obtained revocation list, and when the leaf is included in the constructed path, judge that the obtained public key certificate is revoked, and when the leaf is not included in the path, judge that the obtained public key certificate is valid.

Furthermore, the present invention is a revocation list generation apparatus that generates a revocation list showing a revoked public key certificate, including: a tree system storage unit that has a plurality of nodes that compose a tree system, each leaf in the tree system being in correspondence with a different public key certificate, an identifier of each leaf identifying the corresponding public key certificate, at least one of the public key certificates being revoked, and all nodes on a path being revoked, the path being from a root to the leaf shown by the leaf identifier that identifies the revoked public key certificate; a revocation list generation unit operable to generate for each revoked node, excluding the leaves, revocation information showing whether each directly subordinate node of the revoked node is revoked or not, thereby obtaining a plurality of pieces of revocation information, and generate the revocation list by arranging the pieces of revocation information in an order relating to the structure of the tree system; and an output unit operable to output the generated revocation list. Furthermore, the present invention is a revocation judgement apparatus that judges whether an obtained public key certificate is revoked, with use of a revocation list that has been generated by a revocation list generation apparatus and that shows a revoked public key certificate, and, on judging that the obtained public key certificate is revoked, prevents use of a public key corresponding to the revoked public key certificate, wherein the revocation list generation apparatus (a) has a plurality of nodes that compose a tree system, each leaf in the tree system being in correspondence with a different public key certificate, an identifier of each leaf identifying the corresponding public key certificate, at least one of the public key certificates being revoked, and all nodes on a path being revoked, the path being from a root to the leaf shown by the leaf identifier that identifies the revoked public key certificate, (b) generates for each revoked node, excluding the leaves, revocation information showing whether each directly subordinate node of the revoked node is revoked or not, thereby obtaining a plurality of pieces of revocation information, and (c) generates the revocation list by arranging the pieces of revocation information in an order relating to the structure of the tree system, the revocation judgement apparatus including: a certificate obtaining unit operable to obtain a public key certificate identified by one of the leaf identifiers; a list obtaining unit operable to obtain the revocation list; and a judgement unit operable to attempt to construct a path from the root to a leaf identified by the leaf identifier, with use of the pieces of revocation information in the obtained revocation list, and when the leaf is included in the constructed path, judge that the obtained public key certificate is revoked, and when the leaf is not included in the path, judge that the obtained public key certificate is valid.

According to the stated structures, the revocation list generation apparatus generates revocation information, for each revoked node other than leaves, showing whether each directly subordinate node is revoked or not. Therefore, the CRL can be suppressed to a relatively small size. Furthermore, the revocation judgement apparatus attempts to construct a path from the root to the leaf, using the revocation information, and when the leaf is able to be included in the path, judges that the public key certificate is revoked. Therefore, the revocation list generation apparatus can judge with certainty whether a public key certificate is revoked.

Here, in the revocation list generation apparatus the tree system may include a plurality of layers, and the order in which the revocation list generation unit arranges the obtained pieces of revocation information may be an order of the layers from a root-side layer to a leaf-side layer, the root being a starting point. Furthermore, in the revocation judgement apparatus, the tree system may be composed of a plurality of layers, the pieces of revocation information may be arranged in an order of the layers from a root-side layer to a leaf-side layer, the root being a starting point, and the judgement unit may construct the path with use of the pieces of revocation information arranged in the order, and judge whether the obtained public key certificate is revoked.

According to the stated construction, the revocation list generation apparatus arranges the plurality of pieces of revocation information in an order of the layers from a root-side layer to a leaf-side layer, with the root as a starting point. Therefore, the revocation judgement apparatus can construct the path with certainty.

Here, in the revocation list generation apparatus, the order in which the revocation list generation unit arranges the obtained pieces of revocation information may be an order in which the nodes are positioned on paths from the root to the leaves, the root being a starting point and each node being included only once in the order. Furthermore, in the revocation judgement apparatus, the order in which the pieces of revocation information are arranged may be an order in which the nodes are positioned on the paths from the root to the leaves, the root being a starting point and each node being included only once in the order, and the judgement unit may construct the path with use of the pieces of revocation information arranged in the order, and judge whether the obtained public key certificate is revoked.

According to the stated structures, the revocation list generation apparatus arranges the plurality of pieces of revocation information in an order in which the nodes are positioned on the paths from the root to the leaves, with the root as a starting point, and including each node only once in the order. Therefore, the revocation judgement apparatus can construct the path with certainty.

Here, in the revocation list generation apparatus, the revocation list generation unit may generate the revocation information for all revoked nodes excluding the leaves. Furthermore, in the revocation judgement apparatus, the revocation information may be generated for all revoked nodes excluding the leaves, and the judgement unit may judge whether the obtained public key certificate is revoked, with use of the pieces of revocation information.

According to the stated structures, the revocation list generation apparatus generates a piece of revocation information for each revoked node excluding the leaves. Therefore, no piece of revocation information is omitted from the revocation list.

Here, in the revocation list generation apparatus, the revocation list generation unit may generate special revocation information for each revoked node, excluding the leaves, whose subordinate nodes are all revoked, the special revocation information showing that the subordinate nodes are all revoked, suppress generation of revocation information for the revoked subordinate nodes, and generate the revocation information for each revoked node, excluding the leaves, for which special revocation information is not generated, the revocation information showing whether each directly subordinate node of the revoked node is revoked or not. Furthermore, in the revocation judgement apparatus, special revocation information may be generated for each revoked node, excluding the leaves, whose subordinate nodes are all revoked, the special revocation information showing that the subordinate nodes are all revoked, generation of revocation information may be suppressed for the revoked subordinate nodes, the revocation information may be generated for each revoked node, excluding the leaves, for which special revocation information is not generated, the revocation information showing whether each of n directly subordinate nodes of the revoked node is revoked or not, and the judgement unit may judge whether the obtained public key certificate is revoked, with use of the pieces of special revocation information and the pieces of revocation information.

According to the stated structures, the revocation list generation apparatus generates a piece of special revocation information for each revoked node, excluding the leaves, whose subordinate nodes are all revoked, showing that the subordinate nodes are all revoked. Therefore, the size of the revocation list can be made even smaller.

Here, in the revocation list generation apparatus, the tree system may be an n-ary tree, n being an integer no less than 2, and the revocation information generation unit may generate the special revocation information for each revoked node, excluding the leaves, whose subordinate nodes are all revoked, the special revocation information being composed of first attached information showing that all the subordinate nodes are revoked and n-digit information showing that each of n directly subordinate nodes is revoked, suppress generation of revocation information for the revoked subordinate nodes, and generate the revocation information for each revoked node, excluding the leaves, for which special revocation information is not generated, the revocation information being composed of second attached information showing that not all the subordinate nodes are revoked and n-digit information showing whether each of n directly subordinate nodes of the revoked node is revoked or not. Furthermore, in the revocation judgement apparatus, the special revocation information may be generated for each revoked node, excluding the leaves, whose subordinate nodes are all revoked is composed of first attached information that shows that all the subordinate nodes are revoked, and n-digit information showing that each of n directly subordinate nodes is revoked, generation of revocation information may be suppressed for the revoked subordinate nodes, the revocation information generated for each node, excluding the leaves, for which special revocation information is not generated may be composed of second attached information showing that the subordinate nodes are not all revoked and n-bit information showing whether each of n directly subordinate nodes of the revoked nodes is revoked or not, and the judgement unit may judge whether the obtained public key certificate is revoked, with use of the pieces of special revocation information and the pieces of revocation information.

According to the stated structure, the revocation list generation apparatus generates the special revocation information for each revoked node, excluding the leaves, whose subordinate nodes are all revoked, which is composed of first attached information showing that all the subordinate nodes are revoked and n-digit information showing that each of n directly subordinate nodes is revoked, and does not generate revocation information for all the revoked subordinate nodes. Therefore, the size of the revocation list can be made smaller.

Here, in the revocation list generation apparatus, the tree system may be an n-ary tree, n being an integer no less than 2, and the revocation information generation unit may generate the special revocation information for each revoked node, excluding the leaves, whose subordinate nodes are all revoked, the special revocation information being composed of an n-digit special value showing that each of n directly subordinate nodes of the revoked node is revoked, suppress generation of revocation information for the revoked subordinate nodes, and generate the revocation information for each revoked nodes, other than leaves, for which special revocation information is not generated, the revocation information being composed of n-digits showing whether each of n directly subordinate nodes of the revoked node is revoked or not. Furthermore, in the revocation judgement apparatus, the special revocation information generated for each revoked node, excluding the leaves, whose subordinate nodes are all revoked may be composed of a special n-digit value that shows whether each of n directly subordinate nodes of the revoked node is revoked or not, generation of revocation information may be suppressed for the revoked subordinate nodes, the revocation information generated for each node, excluding the leaves, for which special revocation information is not generated may be n-digit revocation information showing whether each of n directly subordinate nodes of the revoked node is revoked or not, and the judgement unit may judge whether the obtained public key certificate is revoked, with use of the pieces of special revocation information and the pieces of revocation information.

According to the stated structure, the revocation list generation apparatus generates the special revocation information which is composed of an n-digit special value showing that each of n directly subordinate nodes is revoked, and does not generate revocation information for all the revoked subordinate nodes. Therefore, the size of the revocation list can be made smaller.

Here, in revocation list generation apparatus, all nodes in the tree system storage unit may be revoked, each leaf in the tree system may further have at least one subordinate extension node in accordance with an extension rule relating to extending the tree system, each lowest extension node being an extension leaf and corresponding to a different extension public key certificate, an extension leaf identifier identifying the corresponding extension public key certificate, at least one of the extension public key certificates being revoked, and all nodes from the root to the extension leaf whose identifier identifies the revoked extension public key certificate being revoked, the revocation list generation unit may further generate for each revoked extension node, excluding the extension leaves, extension revocation information showing whether each directly subordinate extension node of the revoked extension node is revoked or not, thereby obtaining a plurality of pieces of extension revocation information, and add the pieces of extension revocation information to the revocation list in accordance with the extension rule, and the output unit may output the revocation list to which the extension revocation information has been added. Furthermore, in the revocation judgement apparatus, all nodes in the revocation list generation apparatus may be revoked, each leaf in the tree system may further have at least one subordinate extension node in accordance with an extension rule relating to extending the tree system, each lowest extension node being an extension leaf and corresponding to a different extension public key certificate, an extension leaf identifier identifying the corresponding extension public key certificate, at least one of the extension public key certificates being revoked, and all nodes from the root to the extension leaf whose identifier identifies the revoked extension public key certificate being revoked, the revocation list generation apparatus may further generate for each revoked extension node, excluding the extension leaves, extension revocation information showing whether each directly subordinate extension node of the revoked extension node is revoked or not, thereby obtaining a plurality of pieces of extension revocation information, add the pieces of extension revocation information to the revocation list in accordance with the extension rule, and output the revocation list to which the extension revocation information has been added, the certificate obtaining unit may further obtain an extension public key certificate identified by an extension leaf identifier showing one of the extension leaves, the list obtaining unit may obtain the revocation list to which the extension revocation information has been added, and the judgement unit may further attempt to construct a path from the root to the extension leaf identified by the extension leaf identifier, with use of the pieces of extension revocation information in the obtained extension revocation list, and when the extension leaf is included in the constructed path, judge that the obtained extension public key certificate is revoked, and when the leaf is not included in the path, judge that the extension obtained public key certificate is valid.

According to the stated structures, the revocation list generation apparatus generates, for each revoked extension node excluding extension leaves, extension revocation information showing whether each directly subordinate extension node of the revoked extension node has been revoked or not. Therefore, a CRL that is small in size can be generated even when the tree structure is extended. Furthermore, the revocation judgement apparatus attempts to construct a path from the root to the extension leaf, using the extension revocation information, and when the extension leaf is included in the constructed path, judges that the obtained extension public key certificate is revoked. Therefore the revocation list generation apparatus can judge with certainty whether an extension public key certificate is revoked.

Furthermore, the present invention is a revocation list generation apparatus that generates a revocation list showing a revoked public key certificate, including: a tree system storage unit that has a plurality of nodes that compose a tree system, each leaf in the tree system being in correspondence with a different public key certificate, an identifier of each leaf identifying the corresponding public key certificate, none of the public key certificates being revoked, and none of the nodes being revoked; a revocation list generation unit operable to judge that none of the nodes is revoked, and generate a node revocation list showing that no revoked public key certificate exists; and an output unit operable to output the generated revocation list. In addition, the present invention is a revocation judgement apparatus that judges whether an obtained public key certificate is revoked, with use of a revocation list that has been generated by a revocation list generation apparatus and that shows a revoked public key certificate, and, on judging that the obtained public key certificate is revoked, prevents use of a public key corresponding to the revoked public key certificate, wherein the revocation list generation apparatus (a) has a plurality of nodes that compose a tree system, each leaf in the tree system being in correspondence with a different public key certificate, an identifier of each leaf identifying the corresponding public key certificate, and none of the public key certificates being revoked, none of the nodes having been revoked, (b) judges that all the nodes that compose the tree system are not revoked, (c) generates a revocation list showing that no revoked public key certificates exist, and (d) outputs the generated revocation list, the revocation judgement apparatus including: a certificate obtaining unit operable to obtain a public key certificate identified by one of the leaf identifiers; a list obtaining unit operable to obtain the revocation list; and a judgement unit operable to judge, with use of the obtained revocation list, that the public key certificate is revoked.

According to the stated structures, when no revoked public key certificates exist, the revocation list generation apparatus generates a revocation list showing that no revoked public key certificates exist, and outputs the generated revocation list, thus making known the fact that no revoked public key certificates exist. Furthermore, the revocation judgement apparatus judges, with use of the obtained revocation list, that a particular public key certificate is revoked. Therefore, the public key corresponding to a particular public key certificate can be used when no revoked public key certificates exist.

The above described authentication system for judging whether public key certificates are revoked may be applied when judging whether public key certificates are valid in secret message transfer, opposite party confirmation, non-repudiation, key sharing, coin flipping, secret sharing, and the like, that use a public key encryption method. For example, the present invention may be applied to authentication of a driver unit, as shown in the sixth embodiment. The present invention may also be applied to authenticating trade partners in electronic trading of goods over the Internet.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An authentication system comprising a revocation list generation apparatus and a revocation judgement apparatus,
   wherein the revocation list generation apparatus includes:
      a tree system storage unit having a plurality of nodes that compose a tree system and a plurality of node flags that correspond to the plurality of nodes, the plurality of nodes including a root node and a plurality of leaf nodes, each leaf node in the tree system being in correspondence with a different public key certificate, each leaf node having a leaf identifier for identifying the corresponding public key certificate, at least one of the public key certificates being revoked, all nodes on a path being revoked, the path being from the root node to the leaf node shown by the leaf identifier that identifies the revoked public key certificate, and each one of the node flags showing whether the corresponding node is revoked or not;
      a revocation list generation unit operable to, for each revoked node excluding the leaf nodes, read node flags corresponding to each directly subordinate node of the revoked node from the tree system storage unit, generate node revocation information from the read node flags, thereby obtaining a plurality of pieces of revocation information equal in number to the revoked nodes excluding the leaf nodes, and generate the revocation list by placing the obtained pieces of node revocation information in an order determined according to placement positions of the revoked nodes in the tree system, the root node being a starting point of the order; and
      an output unit operable to output the generated node revocation list, and
   wherein the revocation judgement apparatus includes:
      a certificate obtaining unit operable to obtain a public key certificate identified by one of the leaf identifiers;
      a list obtaining unit operable to obtain the node revocation list;
      a judgement unit operable to judge that the obtained public key certificate is revoked when, in the acquired node revocation list, a piece of node revocation information exists that includes a node flag showing revocation of a node on a path from the root node to the leaf node having the leaf node identifier identifying the obtained public key certificate, and judge that the obtained public key certificate is valid when the piece of node revocation information does not exist; and
      a prohibition unit operable to, upon a judgment that the obtained public key certificate is revoked, prohibit use of the corresponding public key.

2. A revocation list generation apparatus comprising:
   a tree system storage unit having a plurality of nodes that compose a tree system and a plurality of node flags that correspond to the plurality of nodes, the plurality of nodes including a root node and a plurality of leaf nodes, each leaf node in the tree system being in correspondence with a different public key certificate, each leaf node having a leaf identifier for identifying the corresponding public key certificate, at least one of the public key certificates being revoked, all nodes on a path being revoked, the path being from the root node to the leaf node shown by the leaf identifier that identifies the revoked public key certificate, and each one of the node flags showing whether the corresponding node is revoked or not;
   a revocation list generation unit operable to, for each revoked node excluding the leaf nodes, read node flags corresponding to each directly subordinate node of the revoked node from the tree system storage unit, generate node revocation information from the read node flags, thereby obtaining a plurality of pieces of revocation information equal in number to the revoked nodes excluding the leaf nodes, and generate the revocation list by placing the obtained pieces of node revocation information in an order determined according to placement positions of the revoked nodes in the tree system, the root node being a starting point of the order; and
   an output unit operable to output the generated node revocation list.

3. The revocation list generation apparatus of claim 2, wherein
   the tree system includes a plurality of layers, and
   the order in which the revocation list generation unit places the obtained pieces of node revocation information is an order of the layers from a root-side layer corresponding to the root node to a leaf-side layer corresponding to the leaf nodes, the root node being a starting point of the order.

4. The revocation list generation apparatus of claim 2, wherein
the order in which the revocation list generation unit places the obtained pieces of node revocation information is an order in which the nodes are positioned on paths from the root node to the leaf nodes, the root node being a starting point of the order and each node of the tree system being included only once in the order.

5. The revocation list generation apparatus of claim 2, wherein
the revocation list generation unit is operable to generate the node revocation information for all revoked nodes excluding the leaf nodes.

6. The revocation list generation apparatus of claim 2, wherein
the revocation list generation unit is operable to:
generate special revocation information for each revoked node, excluding the leaf nodes, whose subordinate nodes are all revoked, the special revocation information showing that the subordinate nodes are all revoked,
suppress generation of node revocation information for the revoked subordinate nodes, and
generate the revocation information for each revoked node, excluding the leaf nodes, for which special revocation information is not generated, the node revocation information showing whether each directly subordinate node of the revoked node is revoked or not.

7. The revocation list generation apparatus of claim 6, wherein
the tree system is an n-ary tree, n being an integer no less than 2, and
the revocation information generation unit is operable to:
generate the special revocation information for each revoked node, excluding the leaf nodes, whose subordinate nodes are all revoked, the special revocation information being composed of first attached information showing that all the subordinate nodes are revoked and n node flags showing that each of n directly subordinate nodes is revoked or not,
suppress generation of node revocation information for the revoked subordinate nodes, and
generate the node revocation information for each revoked node, excluding the leaf nodes, for which special revocation information is not generated, the revocation information being composed of second attached information showing that not all the subordinate nodes are revoked and n node flags showing whether each of the n directly subordinate nodes of the revoked node is revoked or not.

8. The revocation list generation apparatus of claim 6, wherein
the tree system is an n-ary tree, n being an integer no less than 2, and
the revocation information generation unit is operable to:
generate the special revocation information for each revoked node, excluding the leaf nodes, whose subordinate nodes are all revoked, the special revocation information being composed of an n-digit special value showing that each of n directly subordinate nodes of the revoked node is revoked,
suppress generation of node revocation information for the revoked subordinate nodes, and
generate the node revocation information for each revoked nodes, other than leaves, for which special revocation information is not generated, the node revocation information including n node flags showing whether each of the n directly subordinate nodes of the revoked node is revoked or not.

9. The revocation list generation apparatus of claim 2, wherein
all nodes in the tree system storage unit are revoked,
each leaf node in the tree system further has at least one subordinate extension node and at least one extension node flag corresponding to the at least one extension node, in accordance with an extension rule relating to extending the tree system, each lowest extension node being an extension leaf node and corresponding to a different extension public key certificate, an extension leaf identifier identifying the corresponding extension public key certificate, at least one of the extension public key certificates being revoked, all nodes from the root node to the extension leaf node whose identifier identifies the revoked extension public key certificate being revoked, and each extension node flag showing whether the corresponding extension node is revoked or not,
the revocation list generation unit is further operable to, for each revoked extension node excluding the extension leaf nodes, read extension node flags corresponding to each directly subordinate extension node of the revoked extension node from the tree system storage unit, generate extension node revocation information from the read extension node flags, thereby obtaining a plurality of pieces of extension node revocation information equal in number to the revoked extension nodes excluding the extension leaf nodes, and add the pieces of extension revocation node information to the revocation list by placing the obtained pieces of extension node revocation information in an order determined according to placement positions of the revoked extension nodes in the tree system, the root node being a starting point of the order, and
the output unit is operable to output the node revocation list to which the extension node revocation information has been added.

10. A revocation judgement apparatus,
wherein a revocation list generation apparatus includes (a) a tree system storage unit having a plurality of nodes that compose a tree system and a plurality of node flags that correspond to the plurality of nodes, the plurality of nodes including a root node and a plurality of leaf nodes, each leaf node in the tree system being in correspondence with a different public key certificate, each leaf node having a leaf identifier for identifying the corresponding public key certificate, at least one of the public key certificates being revoked, all nodes on a path being revoked, the path being from the root node to the leaf node shown by the leaf identifier that identifies the revoked public key certificate, and each one of the node flags showing whether the corresponding node is revoked or not, (b) a revocation list generation unit operable to, for each revoked node excluding the leaf nodes, read node flags corresponding to each directly subordinate node of the revoked node from the tree system storage unit, generate revocation information from the read node flags, thereby obtaining a plurality of pieces of revocation information equal in number to the revoked nodes excluding the leaf nodes, and (c) an output unit operable to generate the revocation list by placing the obtained pieces of node revocation information in an order determined according to placement positions of the revoked nodes in the tree system, the root node being a starting point of the order, the revocation judgement apparatus comprising:

a certificate obtaining unit operable to obtain a public key certificate identified by one of the leaf identifiers;

a list obtaining unit operable to obtain the node revocation list;

a judgement unit operable to judge that the obtained public key certificate is revoked when, in the acquired node revocation list, a piece of node revocation information exists that includes a node flag showing revocation of the leaf node among pieces of node revocation information corresponding to nodes on a path from the root node to the leaf node identified by the leaf node identifier, and judge that the obtained public key certificate is valid when said piece of node revocation information does not exist; and a prohibition unit operable to, upon a judgment that the obtained public key certificate is revoked, prohibit use of the corresponding public key.

11. The revocation judgement apparatus of claim 10, wherein the tree system is composed of a plurality of layers, the pieces of node revocation information are placed in an order of the layers from a root-side layer corresponding to the root node to a leaf-side layer corresponding to the leaf nodes, the root node being a starting point of the order, and the judgement unit is operable to judge whether the obtained public key certificate is revoked, with use of the pieces of node revocation information placed in the order.

12. The revocation judgement apparatus of claim 10, wherein the order in which the pieces of node revocation information are placed is an order in which the nodes are positioned on the paths from the root node to the leaf nodes, the root node being a starting point of the order and each node being included only once in the order, and the judgement unit is operable to judge whether the obtained public key certificate is revoked, with the use of the pieces of node revocation information placed in the order.

13. The revocation judgement apparatus of claim 10, wherein the node revocation information is generated for all revoked nodes excluding the leaf nodes, and the judgement unit is operable to judge whether the obtained public key certificate is revoked, with use of the pieces of node revocation information.

14. The revocation judgement apparatus of claim 10, wherein special revocation information is generated for each revoked node, excluding the leaf nodes, whose subordinate nodes are all revoked, the special revocation information showing that the subordinate nodes are all revoked, generation of node revocation information is suppressed for the revoked subordinate nodes, the node revocation information is generated for each revoked node, excluding the leaf nodes, for which special revocation information is not generated, the revocation information including n node flags showing whether each of n directly subordinate nodes of the revoked node is revoked or not, and the judgement unit is operable to judge whether the obtained public key certificate is revoked, with use of the pieces of special revocation information and the pieces of node revocation information.

15. The revocation judgement apparatus of claim 14, wherein the special revocation information generated for each revoked node, excluding the leaf nodes, whose subordinate nodes are all revoked is composed of first attached information that shows that all the subordinate nodes are revoked, and n node flags showing that each of n directly subordinate nodes is revoked or not, generation of node revocation information is suppressed for the revoked subordinate nodes, the node revocation information generated for each node, excluding the leaf nodes, for which special revocation information is not generated is composed of second attached information showing that the subordinate nodes are not all revoked and n node flags showing whether each of n directly subordinate nodes of the revoked nodes is revoked or not, and the judgement unit is operable to judge whether the obtained public key certificate is revoked, with use of the pieces of special revocation information and the pieces of node revocation information.

16. The revocation judgement apparatus of claim 14, wherein the special revocation information generated for each revoked node, excluding the leaf nodes, whose subordinate nodes are all revoked is composed of a special n-digit value that shows whether each of n directly subordinate nodes of the revoked node is revoked or not, generation of node revocation information is suppressed for the revoked subordinate nodes, the node revocation information generated for each node, excluding the leaf nodes, for which special revocation information is not generated includes n node flags showing whether each of n directly subordinate nodes of the revoked node is revoked or not, and the judgement unit is operable to judge whether the obtained public key certificate is revoked, with use of the pieces of special revocation information and the pieces of node revocation information.

17. The revocation judgement apparatus of claim 10, wherein all nodes in the revocation list generation apparatus are revoked, each leaf node in the tree system further has at least one subordinate extension node and at least one extension node flag corresponding to the at least one extension node, in accordance with an extension rule relating to extending the tree system, each lowest extension node being an extension leaf node and corresponding to a different extension public key certificate, an extension leaf identifier identifying the corresponding extension public key certificate, at least one of the extension public key certificates being revoked, all nodes from the root node to the extension leaf node whose identifier identifies the revoked extension public key certificate being revoked, and each extension node flag showing whether the corresponding extension node is revoked or not, the revocation list generation apparatus is further operable to, for each revoked extension node excluding the extension leaf nodes, read extension node flags corresponding to each directly subordinate extension node of the revoked extension node from the tree system storage unit, generate extension node revocation information from the read extension node flags, thereby obtaining a plurality of pieces of extension node revocation information equal in number to the revoked extension nodes excluding the extension leaf nodes, add the pieces of extension revocation node information to the revocation list by placing the obtained pieces of extension node revocation information in an order determined according to placement positions of the revoked extension nodes in the tree system, the root node being a starting point of the order, and output the node revocation list to which the extension node revocation information has been added, the certificate obtaining unit is further operable to obtain an extension public key certificate identified by an extension leaf identifier showing one of the extension leaf nodes, the list obtaining unit is operable to obtain the node revocation list to which the extension node revocation information has been added, and the judgement unit is further operable to, judge that the obtained extension public key certificate is revoked when, in the acquired node revocation list, a piece of extension node revocation information exists that includes a node flag showing revocation of an extension leaf node on a path from the root node to the extension leaf node having the extension leaf node identifier identifying the obtained extension public key certificate, and judge that the obtained extension public key certificate is valid when the piece of extension node revocation information does not exist.

18. A revocation list generation method used in a revocation list generation apparatus, the revocation list generation apparatus including:

a tree system storage unit having a plurality of nodes that compose a tree system and a plurality of node flags that correspond to the plurality of nodes, the plurality of nodes including a root node and a plurality of leaf nodes, each leaf node in the tree system being in correspondence with a different public key certificate, each leaf node having a leaf identifier for identifying the corresponding public key certificate, at least one of the public key certificates being revoked, all nodes on a path being revoked, the path being from the root node to the leaf node shown by the leaf identifier that identifies the revoked public key certificate, and each one of the node flags showing whether the corresponding node is revoked or not, and the revocation list generation method comprising:

a revocation list generation step of, for each revoked node excluding the leaf nodes, reading node flags corresponding to each directly subordinate node of the revoked node from the tree system storage unit, generating node revocation information from the read node flags, thereby obtaining a plurality of pieces of revocation information equal in number to the revoked nodes excluding the leaf nodes, and generating the revocation list by placing the obtained pieces of node revocation information in an order determined according to the placement positions of the revoked nodes in the tree system, the root node being a starting point of the order; and an output step of outputting the generated revocation list.

19. A revocation list generation program stored on a computer readable medium and used in a revocation list generation apparatus, the revocation list generation apparatus including:

a tree system storage unit having a plurality of nodes that compose a tree system and a plurality of node flags that correspond to the plurality of nodes, the plurality of nodes including a root node and a plurality of leaf nodes, each leaf node in the tree system being in correspondence with a different public key certificate, each leaf node having a leaf identifier for identifying the corresponding public key certificate, at least one of the public key certificates being revoked, all nodes on a path being revoked, the path being from the root node to the leaf node shown by the leaf identifier that identifies the revoked public key certificate, and each one of the node flags showing whether the corresponding node is revoked or not, and the revocation list generation program causing the revocation list generation apparatus to perform a method comprising:

a revocation list generation step of, for each revoked node excluding the leaf nodes, reading node flags corresponding to each directly subordinate node of the revoked node from the tree system storage unit, generating node revocation information from the read node flags, thereby obtaining a plurality of pieces of revocation information equal in number to the revoked nodes excluding the leaf nodes, and generating the revocation list by placing the obtained pieces of node revocation information in an order determined according to the placement positions of the revoked nodes in the tree system, the root node being a starting point of the order; and an output step of outputting the generated revocation list.

20. A computer-readable recording medium having recorded thereon a revocation list generation program used in a revocation list generation apparatus, the revocation list generation apparatus including:

a tree system storage unit having a plurality of nodes that compose a tree system and a plurality of node flags that correspond to the plurality of nodes, the plurality of nodes including a root node and a plurality of leaf nodes, each leaf node in the tree system being in correspondence with a different public key certificate, each leaf node having a leaf identifier for identifying the corresponding public key certificate, at least one of the public key certificates being revoked, all nodes on a path being revoked, the path being from the root node to the leaf node shown by the leaf identifier that identifies the revoked public key certificate, and each one of the node flags showing whether the corresponding node is revoked or not, and the revocation list generation program causing the revocation list generating apparatus to perform a method comprising:

a revocation list generation step of, for each revoked node excluding the leaf nodes, reading node flags corresponding to each directly subordinate node of the revoked node from the tree system storage unit, generating node revocation information from the read node flags, thereby obtaining a plurality of pieces of revocation information equal in number to the revoked nodes excluding the leaf nodes, and generating the revocation list by placing the obtained pieces of node revocation information in an order determined according to the placement positions of the revoked nodes in the tree system, the root node being a starting point of the order; and an output step of outputting the generated revocation list.

21. A revocation judgement method used in a revocation judgement apparatus,
wherein a revocation list generation apparatus includes (a) a tree system storage unit having a plurality of nodes that compose a tree system and a plurality of node flags that correspond to the plurality of nodes, the plurality of nodes including a root node and a plurality of leaf nodes, each leaf node in the tree system being in correspondence with a different public key certificate, each leaf node having a leaf identifier for identifying the corresponding public key certificate, at least one of the public key certificates being revoked, all nodes on a path being revoked, the path being from the root node to the leaf node shown by the leaf identifier that identifies the revoked public key certificate, and each one of the node flags showing whether the corresponding node is revoked or not, (b) a revocation list generation unit operable to, for each revoked node excluding the leaf nodes, read node flags corresponding to each directly subordinate node of the revoked node from the tree system storage unit, and generate node revocation information from the read node flags, thereby obtaining a plurality of pieces of revocation information equal in number to the revoked nodes excluding the leaf nodes, and (c) an output unit operable to generate the revocation list by placing the obtained pieces of node revocation information in an order determined according to placement positions of the revoked nodes in the tree system, the root node being a starting point of the order, the revocation judgement method comprising:
a certificate obtaining step of obtaining a public key certificate identified by one of the leaf identifiers;
a list obtaining step of obtaining the revocation list;
a judgement step of judging that the obtained public key certificate is revoked when, in the acquired node revocation list, a piece of node revocation information exists that includes a node flag showing revocation of a leaf node on a path from the root node to the leaf node having the leaf node identifier identifying the obtained public key certificate, and judging that the obtained public key certificate is valid when the piece of node revocation information does not exist; and
prohibiting, upon a judgment that the obtained public key certificate is revoked, use of the corresponding public prohibit key.

22. A revocation judgement program stored on a computer readable medium and used in a revocation judgement apparatus,
wherein a revocation list generation apparatus includes (a) a tree system storage unit having a plurality of nodes that compose a tree system and a plurality of node flags that correspond to the plurality of nodes, the plurality of nodes including a root node and a plurality of leaf nodes, each leaf node in the tree system being in correspondence with a different public key certificate, each leaf node having a leaf identifier for identifying the corresponding public key certificate, at least one of the public key certificates being revoked, all nodes on a path being revoked, the path being from the root node to the leaf node shown by the leaf identifier that identifies the revoked public key certificate, and each one of the node flags showing whether the corresponding node is revoked or not, (b) a revocation list generation unit operable to, for each revoked node excluding the leaf nodes, read node flags corresponding to each directly subordinate node of the revoked node from the tree system storage unit, and generate node revocation information from the read node flags, thereby obtaining a plurality of pieces of revocation information equal in number to the revoked nodes excluding the leaf nodes, and (c) an output unit operable to generate the revocation list by placing the obtained pieces of node revocation information in an order determined according to placement positions of the revoked nodes in the tree system, the root node being a starting point of the order, the revocation judgement program causing the revocation judgement apparatus to perform a method comprising:
a certificate obtaining step of obtaining a public key certificate identified by one of the leaf identifiers;
a list obtaining step of obtaining the revocation list;
a judgement step of judging that the obtained public key certificate is revoked when, in the acquired node revocation list, a piece of node revocation information exists that includes a node flag showing revocation of a leaf node on a path from the root node to the leaf node having the leaf node identifier identifying the obtained public key certificate, and judging that the obtained public key certificate is valid when the piece of node revocation information does not exist; and
prohibiting, upon a judgment that the obtained public key certificate is revoked, use of the corresponding public prohibit key.

23. A computer-readable recording medium having stored thereon a revocation judgement program used in a revocation judgement apparatus,
wherein a revocation list generation apparatus includes (a) a tree system storage unit having a plurality of nodes that compose a tree system and a plurality of node flags that correspond to the plurality of nodes, the plurality of nodes including a root node and a plurality of leaf nodes, each leaf node in the tree system being in correspondence with a different public key certificate, each leaf node having a leaf identifier for identifying the corresponding public key certificate, at least one of the public key certificates being revoked, all nodes on a path being revoked, the path being from the root node to the leaf node shown by the leaf identifier that identifies the revoked public key certificate, and each one of the node flags showing whether the corresponding node is revoked or not, (b) a revocation list generation unit operable to, for each revoked node excluding the leaf nodes, read node flags corresponding to each directly subordinate node of the revoked node from the tree system storage unit, and generate node revocation information from the read node flags, thereby obtaining a plurality of pieces of revocation information equal in number to the revoked nodes excluding the leaf nodes, and (c) an output unit operable to generate the revocation list by placing the obtained pieces of node revocation information in an order determined according to placement positions of the revoked nodes in the tree system, the root node being a starting point of the order, the revocation judgement program causing the revocation list generation apparatus to perform a method comprising:
a certificate obtaining step of obtaining a public key certificate identified by one of the leaf identifiers;
a list obtaining step of obtaining the revocation list;
a judgement step of judging that the obtained public key certificate is revoked when, in the acquired node revocation list, a piece of node revocation information exists that includes a node flag showing revocation of a leaf node on a path from the root node to the leaf node having the leaf node identifier identifying the obtained public key certificate, and judging that the obtained public key certificate is valid when the piece of node revocation information does not exist; and prohibiting, upon a judgment that the obtained public key certificate is revoked, use of the corresponding public prohibit key.

24. An authentication system comprising:

a revocation list generation apparatus comprising:

a tree system storage unit storing a data tree structure of a plurality of nodes that compose a tree system and a plurality of node flags that correspond to the plurality of nodes, among which are a root node and a plurality of leaf nodes, arranged in hierarchical levels, the tree structure having a plurality of node paths from the root node to the leaf nodes through the hierarchical levels, each one of the node flags showing whether the corresponding node is revoked or not, each leaf node corresponding to a different public key certificate and including identification information that identifies the corresponding public key certificate, wherein when a leaf node is revoked, every node along a path from the root node to the revoked leaf node is also revoked;

a revocation list generation unit operable to, for each revoked node excluding the leaf nodes, read node flags corresponding to each directly subordinate node of the revoked node from the tree system storage unit, generate node revocation information from the read node flags, and generate a revocation list by placing the obtain pieces of node revocation information in an order determined according to placement positions of the revoked nodes in the tree structure, the root node being a starting point of the order; and an output unit operable to output the generated node revocation list; and a revocation judgement apparatus comprising:

a certificate obtaining unit operable to obtain a public key certificate identified by the identification information of one of the leaf nodes;

a list obtaining unit operable to obtain the node revocation list; and a judgement unit operable to:

judge that the obtained public key certificate is revoked when, in the acquired node revocation list, a piece of node revocation information exists that includes a node flag showing revocation of a leaf node on a path from the root node to the leaf node having the leaf node identifier identifying the obtained public key certificate; and judge that the obtained public key certificate is not revoked when the piece of node revocation information does not exist.

* * * * *